(12) United States Patent
Wang et al.

(10) Patent No.: US 10,382,243 B2
(45) Date of Patent: Aug. 13, 2019

(54) OFDM SUBFRAME TRANSMISSION METHOD AND DEVICE USING DETERMINED TRANSPORT BLOCK SIZES

(71) Applicant: Huawei Technologies Co., Ltd., Shenzhen, Guangdong (CN)

(72) Inventors: Da Wang, Beijing (CN); Jian Wang, Beijing (CN); Juan Zheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/559,009

(22) PCT Filed: Mar. 18, 2015

(86) PCT No.: PCT/CN2015/074509
§ 371 (c)(1),
(2) Date: Sep. 15, 2017

(87) PCT Pub. No.: WO2016/145637
PCT Pub. Date: Sep. 22, 2016

(65) Prior Publication Data
US 2018/0102930 A1    Apr. 12, 2018

(51) Int. Cl.
*H04W 4/00* (2018.01)
*H04L 27/26* (2006.01)
(Continued)

(52) U.S. Cl.
CPC ........ *H04L 27/2656* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2011/0194523 A1* 8/2011 Chung ............... H04L 5/0007
370/329
2013/0308504 A1* 11/2013 Nimbalker ............ H04L 5/001
370/281
(Continued)

FOREIGN PATENT DOCUMENTS

CN    103580776 A    2/2014
CN    104106231 A    10/2014
(Continued)

OTHER PUBLICATIONS

Panasonic; "Discussion on flexible transmission time in LAA"; 3GPP TSG RAN WG1 Meeting #80; R1-150318; Athens, Greece; Feb. 9-13, 2015; 4 pages.
(Continued)

*Primary Examiner* — Farah Faroul

(57) ABSTRACT

Embodiments of the present invention disclose a data transmission method, including: obtaining, by a first device, N orthogonal frequency division multiplexing (OFDM) symbols, where the N OFDM symbols are used to carry control information and data; and sending, by the first device, a first subframe and a second subframe to a second device, where the first subframe or the second subframe carries the control information, the first subframe includes M OFDM symbols of the N OFDM symbols, the second subframe includes K OFDM symbols of the N OFDM symbols, N is , a positive integer, M or K is zero or a positive integer, M is not greater than N, and K is not greater than N. The embodiments of the present invention further provide a first data transmission device.

20 Claims, 19 Drawing Sheets

(51) Int. Cl.
  *H04L 5/00* (2006.01)
  *H04L 27/00* (2006.01)
  *H04W 16/14* (2009.01)
  *H04W 72/04* (2009.01)
  *H04L 1/16* (2006.01)

(52) U.S. Cl.
  CPC .......... *H04L 5/0064* (2013.01); *H04L 5/0092* (2013.01); *H04L 27/0006* (2013.01); *H04L 27/26* (2013.01); *H04L 27/2662* (2013.01); *H04L 27/2666* (2013.01); *H04W 16/14* (2013.01); *H04W 72/0446* (2013.01); *H04L 1/16* (2013.01); *H04L 5/001* (2013.01)

(56) References Cited

U.S. PATENT DOCUMENTS

| | | | |
|---|---|---|---|
| 2014/0064204 A1* | 3/2014 | Seo | H04L 5/0035 370/329 |
| 2014/0086112 A1* | 3/2014 | Stern-Berkowitz | H04W 72/1289 370/280 |
| 2014/0112289 A1 | 4/2014 | Kim et al. | |
| 2015/0009927 A1 | 1/2015 | Larsson et al. | |
| 2015/0063280 A1* | 3/2015 | Nan | H04L 1/0006 370/329 |
| 2015/0065152 A1 | 3/2015 | Sadek et al. | |
| 2015/0078222 A1* | 3/2015 | Yang | H04B 7/2656 370/280 |
| 2015/0085767 A1* | 3/2015 | Einhaus | H04L 1/0001 370/329 |
| 2015/0334653 A1* | 11/2015 | Ang | H04W 28/0221 370/311 |
| 2017/0280331 A1 | 9/2017 | Gou et al. | |

FOREIGN PATENT DOCUMENTS

| | | |
|---|---|---|
| CN | 104301273 A | 1/2015 |
| EP | 3240349 A1 | 11/2017 |
| WO | 2016122756 A1 | 8/2016 |

OTHER PUBLICATIONS

Huawei et al.; "On data transmission not starting from the subframe boundary"; 3GPP TSG RAN WG1 Ad-hoc Meeting; R1-151124; Paris, France; Mar. 24-26, 2015; 4 pages.

"3rd Generation Partnership Project; Technical Specification Group Radio Access Network; Evolved Universal Terrestrial Radio Access (E-UTRA); Physical layer procedures (Release 9)", 3GPP TS 36.213 V9.3.0 (Sep. 2010), Sep. 2010, 80 pages.

"3rd Generation Partnership Project; Technical Specification Group Radio Access Network; Evolved Universal Terrestrial Radio Access (E-UTRA); Physical layer procedures(Release 12)", 3GPP TS 36.213 V12.4.0 (Dec. 2014), Dec. 2014, 225 pages.

Intel Corporation, "Extended Subframes and (e)PDCCH for LAA downlink," R1-150090, 3GPP TSG RAN WG1 Meeting #80, Athens, Greece, Feb. 9-13, 2015, 7 pages.

CMCC, "Fractional Subframe Transmission for LBE-based LAA," R1-150440, 3GPP TSG-RAN WG1 #80, Athens, Greece, Feb. 9-13, 2015, 4 pages.

\* cited by examiner

OFDM SUBFRAME TRANSMISSION METHOD AND DEVICE USING DETERMINED TRANSPORT BLOCK SIZES

CROSS-REFERENCE TO RELATED APPLICATIONS

This application is a national stage of International Application No. PCT/CN2015/074509, filed on Mar. 18, 2015, which is hereby incorporated by reference in its entirety.

TECHNICAL FIELD

The present invention relates to the communications field, and in particular, to a data transmission method and device.

BACKGROUND

A licensed-assisted access using Long Term Evolution (LAA-LTE, Licensed-Assisted Access Using Long Term Evolution) system may also be referred to as a Long Term Evolution unlicensed spectrum (LTE-U, Long Term Evolution Unlicensed spectrum) system. In the system, a device first detects, according to a listen-before-talk (LBT, Listen Before Talk) rule, that a channel resource in an unlicensed spectrum is idle, and then transmits data by using the channel resource in the unlicensed spectrum. The unlicensed spectrum is a common frequency resource in a wireless communications network. A licensed spectrum is a frequency resource dedicated to some operators.

Referring to FIG. 1, in the prior art, a sending device cannot learn when an unlicensed carrier can be preempted. Therefore, a time at which an unlicensed spectrum is successfully preempted may be not the start of a complete subframe. Starting from the moment at which the unlicensed carrier is preempted for data sending, an incomplete subframe A is first sent. A time of the subframe A lasts and ends at the start of a next subframe in a time on a corresponding licensed carrier. Then multiple complete subframes B are sent. Because resource waste is caused when duration in which the sending device preempts the unlicensed carrier ends at the end of a complete subframe, there is another incomplete subframe C when transmission ends. Therefore, how to set control information for the incomplete subframe A and the incomplete subframe C becomes a problem that urgently needs to be resolved.

SUMMARY

Embodiments of the present invention provide a data transmission method and device, to resolve a problem of how to set control information for an incomplete subframe A at the start of a transmission and an incomplete subframe C at the end of a transmission, and to reduce control signaling load, enable a channel to transmit a larger proportion of valid data, and improve data transmission efficiency. In view of this, a first aspect of the present invention provides a data transmission method, including:

obtaining, by a first device, N orthogonal frequency division multiplexing OFDM symbols, where the N OFDM symbols are used to carry control information and data; and sending, by the first device, a first subframe and a second subframe to the second device, where the first subframe or the second subframe carries the control information, the first subframe includes M OFDM symbols of the N OFDM symbols, the second subframe includes K OFDM symbols of the N OFDM symbols, N is a positive integer, M or K is zero or a positive integer, M is not greater than N, and K is not greater than N.

With reference to the first aspect, in a first possible implementation, the first subframe and the second subframe are subframes on an unlicensed carrier; or the first subframe or the second subframe is a subframe on a licensed carrier.

With reference to the first possible implementation of the first aspect, in a second possible implementation, when M is not less than a first preset threshold, the first subframe carries the control information; or when M is less than the first preset threshold, the second subframe carries the control information; or when K is not less than a second preset threshold, the second subframe carries the control information; or when K is less than the second preset threshold, the first subframe carries the control information.

With reference to the first aspect or the first or the second possible implementation of the first aspect, in a third possible implementation, the method further includes:

sending, by the first device, an identifier of an unlicensed carrier occupied by the first device to the second device, where the identifier is used to indicate a start location from which the first device occupies the unlicensed carrier and an occupation duration, or used to indicate a quantity of OFDM symbols included in the first subframe and/or the second subframe and locations of the OFDM symbols.

With reference to any one of the first aspect or the first to the third possible implementations of the first aspect, in a fourth possible implementation, the method further includes:

receiving, by the first device, feedback information sent by the second device, where the feedback information is used to indicate whether the first subframe and the second subframe are correctly received.

A second aspect of the present invention provides another data transmission method, including:

obtaining, by a first device, a quantity of physical resource blocks PRBs occupied by first data carried in a first subframe, where the first data is data to be sent by the first device to a second device;

determining, by the first device, a first transport block size TBS or a second TBS according to the quantity of the PRBs occupied by the first data carried in the first subframe, where the second TBS includes a TBS of the first subframe and a TBS of a second subframe;

performing, by the first device according to the first TBS or the second TBS, modulation and coding on the first data carried in the first subframe and the first data carried in the second subframe, where the first subframe and the second subframe are adjacent subframes; and sending, by the first device, the first subframe and the second subframe to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

With reference to the second aspect, in a first possible implementation, when K is equal to 1, the method further includes:

determining, by the first device, a third TBS according to the quantity of the PRBs occupied by the first data carried in the first subframe, where the third TBS includes the TBS of the first subframe, the TBS of the second subframe, and a TBS of a third subframe;

performing, by the first device according to the third TBS, modulation and coding on the first data carried in the first subframe, the first data carried in the second subframe, and the first data carried in the third subframe, where the first subframe and the third subframe are adjacent subframes, and the first subframe and the second subframe are adjacent subframes; and sending, by the first device, the first subframe, the second subframe, and the third subframe to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

With reference to the second aspect, in a second possible implementation, the determining, by the first device, a first TBS according to the quantity of the PRBs occupied by the first data carried in the first subframe includes:

determining, by the first device according to a first formula $S=F(s \times a)$, a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and determining, by the first device, the first transport block size TBS according to the quantity of the physical resource blocks PRBs occupied by both of the first data carried in the first subframe and the first data carried in the second subframe.

With reference to the second aspect, in a third possible implementation, the determining, by the first device, a first transport block size TBS according to the quantity of the physical resource blocks PRBs occupied by the first data carried in the first subframe includes:

determining, by the first device, a first transport block size TBS T according to a second formula $T=F(t \times a)$, where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the second or the third possible implementation of the second aspect, in a fourth possible implementation, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the second aspect, in a fifth possible implementation, the determining, by the first device, a second TBS according to the quantity of the PRBs occupied by the first data carried in the first subframe includes:

determining, by the first device according to a third formula $L=F(l \times a)$, a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

determining, by the first device, the transport block size TBS of the second subframe according to the quantity of the physical resource blocks PRBs occupied by the first data carried in the second subframe; and determining, by the first device, the transport block size TBS of the first subframe according to the quantity of the physical resource blocks PRBs occupied by the first data carried in the first subframe.

With reference to the second aspect, in a sixth possible implementation, the determining, by the first device, a second TBS according to the quantity of the PRBs occupied by the first data carried in the first subframe includes:

determining, by the first device, a transport block size TBS P of the second subframe according to a fourth formula $P=F(p \times a)$, where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the fifth or the sixth possible implementation of the second aspect, in a seventh possible implementation, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the first possible implementation of the second aspect, in an eighth possible implementation, the determining, by the first device, a third TBS according to the quantity of the PRBs occupied by the first data carried in the first subframe includes:

determining, by the first device according to a fifth formula $W=F(s \times a)$, a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and determining, by the first device, the third transport block size TBS according to the quantity of the physical resource blocks PRBs occupied by all of the first data carried in the first subframe, the first data carried in the second subframe, and the first data carried in the third subframe.

With reference to the first possible implementation of the second aspect, in a ninth possible implementation, the determining, by the first device, a third TBS according to the quantity of the PRBs occupied by the first data carried in the first subframe includes:

determining, by the first device, a third transport block size TBS V according to a sixth formula $V=F(t \times a)$, where t is the transport block size TBS of the first subframe, the transport block size TBS of the first subframe is a transport block size corresponding to the quantity of the physical resource blocks PRBs occupied by the first data carried in the first subframe, the function F( ) is a round-up, round-down, or round-off function, and a is a real number not less than 1.

With reference to the eighth or the ninth possible implementation of the second aspect, in a tenth possible implementation, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

With reference to any one of the second aspect or the first to the tenth possible implementations of the second aspect, in an eleventh possible implementation, the determining, by the first device, a first TBS, a second TBS, or a third TBS according to the quantity of the physical resource blocks PRBs occupied by the first data carried in the first subframe includes:

creating, by the first device, a first list for the transport block size TBS of the first subframe and the transport block size TBS of the second subframe according to a, or creating, by the first device, a first list for the transport block size TBS of the first subframe and the first transport block size TBS according to a, or creating, by the first device, a first list for the transport block size TBS of the first subframe and the third transport block size TBS according to a, or creating, by the first device according to a, a first list for the quantity of the physical resource blocks PRBs occupied by the first data carried in the first subframe and the quantity of the physical resource blocks PRBs occupied by the first data carried in the second subframe, or creating, by the first device according to a, a first list for the quantity of the physical resource blocks PRBs occupied by the first data carried in the first subframe and the quantity of the physical resource blocks PRBs occupied by both of the first data carried in the first subframe and the first data carried in the second subframe, or creating, by the first device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and determining, by the first device, the first TBS, the second TBS, or the third TBS according to the first list.

With reference to any one of the second aspect or the first to the eleventh possible implementations of the second aspect, in a twelfth possible implementation, the method further includes:

receiving, by the first device, feedback information sent by the second device, where the feedback information is used to indicate whether the second device correctly receives the first subframe and the second subframe, or the feedback information is used to indicate whether the second device correctly receives the first subframe, the second subframe, and the third subframe.

A third aspect of the present invention further provides a data transmission method, including:

receiving, by a second device, a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

obtaining, by the second device, a quantity of physical resource blocks PRBs occupied by first data carried in the first subframe, where the first data is data sent by the first device to the second device;

determining, by the second device, a first transport block size TBS or a second TBS according to the quantity of the PRBs occupied by the first data carried in the first subframe, where the second TBS includes a TBS of the first subframe and a TBS of the second subframe; and performing, by the second device according to the first TBS or the second TBS, demodulation and decoding on the first data carried in the first subframe and the first data carried in the second subframe.

With reference to the third aspect, in a first possible implementation, when K is equal to 1, the method further includes:

receiving, by the second device, the first subframe, the second subframe, and a third subframe that are sent by the first device, where the third subframe is sent before the first subframe, the second subframe is sent after the first subframe, the first subframe and the third subframe are adjacent subframes, the first subframe and the second subframe are adjacent subframes, the first subframe includes N OFDM symbols, the second subframe includes M OFDM symbols, the third subframe includes P OFDM symbols, N is a positive integer, M and P are zero or positive integers, P≤N, and M≤N;

determining, by the second device, a third TBS according to the quantity of the PRBs occupied by the first data carried in the first subframe, where the third TBS includes the TBS of the first subframe, the TBS of the second subframe, and a TBS of the third subframe; and performing, by the second device according to the third TBS, demodulation and decoding on the first data carried in the first subframe, the first data carried in the second subframe, and the first data carried in the third subframe.

With reference to the third aspect, in a second possible implementation, the determining, by the second device, a first TBS according to the quantity of the PRBs occupied by the first data carried in the first subframe includes:

determining, by the second device according to a first formula S=F(s×a), a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and determining, by the second device, the first transport block size TBS according to the quantity of the physical resource blocks PRBs occupied by both of the first data carried in the first subframe and the first data carried in the second subframe.

With reference to the third aspect, in a third possible implementation, the determining, by the second device, a first TBS according to the quantity of the PRBs occupied by the first data carried in the first subframe includes:

determining, by the second device, a first transport block size TBS T according to a second formula T=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the second or the third possible implementation of the third aspect, in a fourth possible implementation, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the third aspect, in a fifth possible implementation, the determining, by the second device, a second TBS according to the quantity of the PRBs occupied by the first data carried in the first subframe includes:

determining, by the second device according to a third formula $L=F(l\times a)$, a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

determining, by the second device, the transport block size TBS of the second subframe according to the quantity of the physical resource blocks PRBs occupied by the first data carried in the second subframe; and determining, by the second device, the transport block size TBS of the first subframe according to the quantity of the physical resource blocks PRBs occupied by the first data carried in the first subframe.

With reference to the third aspect, in a sixth possible implementation, the determining, by the second device, a second TBS according to the quantity of the PRBs occupied by the first data carried in the first subframe includes:

determining, by the second device, a transport block size TBS P of the second subframe according to a fourth formula $P=F(p\times a)$, where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the fifth or the sixth possible implementation of the third aspect, in a seventh possible implementation, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the first possible implementation of the third aspect, in an eighth possible implementation, the determining, by the second device, a third TBS according to the quantity of the PRBs occupied by the first data carried in the first subframe includes:

determining, by the second device according to a first formula $W=F(s\times a)$, a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and determining, by the second device, the third transport block size TBS according to the quantity of the physical resource blocks PRBs occupied by all of the first data carried in the first subframe, the first data carried in the second subframe, and the first data carried in the third subframe.

With reference to the first possible implementation of the third aspect, in a ninth possible implementation, the determining, by the second device, a third TBS according to the quantity of the PRBs occupied by the first data carried in the first subframe includes: determining, by the second device, a third transport block size TBS V according to a second formula $V=F(t\times a)$, where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the eighth or the ninth possible implementation of the third aspect, in a tenth possible implementation, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

With reference to any one of the third aspect or the first to the tenth possible implementations of the third aspect, in an eleventh possible implementation, the determining, by the second device, a first TBS, a second TBS, or a third TBS according to the quantity of the physical resource blocks PRBs occupied by the first data carried in the first subframe includes:

creating, by the second device, a first list for the transport block size TBS of the first subframe and the transport block size TBS of the second subframe according to a, or creating, by the second device, a first list for the transport block size TBS of the first subframe and the first transport block size TBS according to a, or creating, by the second device, a first list for the transport block size TBS of the first subframe and the third transport block size TBS according to a, or creating, by the second device according to a, a first list for the quantity of the physical resource blocks PRBs occupied by the first data carried in the first subframe and the quantity of the physical resource blocks PRBs occupied by the first data carried in the second subframe, or creating, by the second device according to a, a first list for the quantity of the physical resource blocks PRBs occupied by the first data carried in the first subframe and the quantity of the physical resource blocks PRBs occupied by both of the first data carried in the first subframe and the first data carried in the second subframe, or creating, by the second device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and determining, by the second device, the first TBS, the second TBS, or the third TBS according to the first list.

With reference to any one of the third aspect or the first to the eleventh possible implementations of the third aspect, in a twelfth possible implementation, the method further includes:

sending, by the second device, feedback information to the first device, where the feedback information is used to indicate whether the second device correctly receives the first subframe and the second subframe, or the feedback information is used to indicate whether the second device correctly receives the first subframe, the second subframe, and the third subframe.

A fourth aspect of the present invention provides a first data transmission device, including:

an obtaining module, configured to obtain N orthogonal frequency division multiplexing OFDM symbols, where the N OFDM symbols are used to carry control information and data; and a first sending module, configured to send a first subframe and a second subframe to the second device, where the first subframe or the second subframe carries the control information, the first subframe includes M OFDM symbols of the N OFDM symbols obtained by the obtaining module, the second subframe includes K OFDM symbols of the N OFDM symbols obtained by the obtaining module, N is a positive integer, M or K is zero or a positive integer, M is not greater than N, and K is not greater than N.

With reference to the fourth aspect, in a first possible implementation, the first subframe and the second subframe are subframes on an unlicensed carrier; or the first subframe or the second subframe is a subframe on a licensed carrier.

With reference to the first possible implementation of the fourth aspect, in a second possible implementation, when M is not less than a first preset threshold, the first subframe carries the control information; or when M is less than the first preset threshold, the second subframe carries the control information; or when K is not less than a second preset threshold, the second subframe carries the control information; or when K is less than the second preset threshold, the first subframe carries the control information.

With reference to the fourth aspect or the first or second possible implementation of the fourth aspect, in a third possible implementation, the first device further includes:

a second sending module, configured to send an identifier of an unlicensed carrier occupied by the first device to the second device, where the identifier is used to indicate a start location from which the first device occupies the unlicensed carrier and an occupation duration, or used to indicate a quantity of OFDM symbols included in the first subframe and/or the second subframe and locations of the OFDM symbols.

With reference to any one of the fourth aspect or the first to the third possible implementations of the fourth aspect, in a fourth possible implementation, the first device further includes:

a receiving module, configured to receive feedback information sent by the second device, where the feedback information is used to indicate whether the first subframe and the second subframe are correctly received.

A fifth aspect of the present invention provides another first data transmission device, including:

an obtaining module, configured to obtain a quantity of physical resource blocks PRBs occupied by first data carried in a first subframe, where the first data is data to be sent by the first device to a second device;

a first determining module, configured to determine a first transport block size TBS or a second TBS according to the quantity, obtained by the obtaining module, of the PRBs occupied by the first data carried in the first subframe, where the second TBS includes a TBS of the first subframe and a TBS of the second subframe;

a first modulation and coding module, configured to perform, according to the first TBS or the second TBS that is determined by the first determining module, modulation and coding on the first data carried in the first subframe and the first data carried in the second subframe, where the first subframe and the second subframe are adjacent subframes; and a first sending module, configured to send the first subframe and the second subframe after the modulation and coding of the first modulation and coding module to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

With reference to the fifth aspect, in a first possible implementation, when K is equal to 1, the first device further includes:

a second determining module, configured to determine a third TBS according to the quantity of the PRBs occupied by the first data carried in the first subframe, where the third TBS includes the TBS of the first subframe, the TBS of the second subframe, and a TBS of a third subframe; and a second modulation and coding module, configured to perform, according to the third TBS determined by the second determining module, modulation and coding on the first data carried in the first subframe, the first data carried in the second subframe, and the first data carried in the third subframe, where the first subframe and the third subframe are adjacent subframes, and the first subframe and the second subframe are adjacent subframes; and a second sending module, configured to send the first subframe, the second subframe, and the third subframe after the modulation and coding of the second modulation and coding module to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

With reference to the fifth aspect, in a second possible implementation, the first determining module includes:

a first determining unit, configured to determine, according to a first formula S=F(s×a), a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and a second determining unit, configured to determine the first transport block size TBS according to the quantity, determined by the first determining unit, of the physical resource blocks PRBs occupied by both of the first data carried in the first subframe and the first data carried in the second subframe.

With reference to the fifth aspect, in a third possible implementation, the first determining module includes:

a third determining unit, configured to determine a first transport block size TBS T according to a second formula T=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the second or the third possible implementation of the fifth aspect, in a fourth possible implementation, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the fifth aspect, in a fifth possible implementation, the first determining module includes:

a fourth determining unit, configured to determine, according to a third formula L=F(l×a), a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

a fifth determining unit, configured to determine the transport block size TBS of the second subframe according to the quantity, determined by the fourth determining unit, of the physical resource blocks PRBs occupied by the first data carried in the second subframe; and a sixth determining unit, configured to determine the transport block size TBS of the first subframe according to the quantity, determined by the fourth determining unit, of the physical resource blocks PRBs occupied by the first data carried in the first subframe.

With reference to the fifth aspect, in a sixth possible implementation, the first determining module includes:

a seventh determining unit, configured to determine a transport block size TBS P of the second subframe according to a fourth formula P=F(p×a), where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the fifth or the sixth possible implementation of the fifth aspect, in a seventh possible implementation, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the first possible implementation of the fifth aspect, in an eighth possible implementation, the second determining module includes:

an eighth determining unit, configured to determine, according to a fifth formula W=F(s×a), a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and a ninth determining unit, configured to determine the third transport block size TBS according to the quantity, determined by the eighth determining unit, of the physical resource blocks PRBs occupied by all of the first data carried in the first subframe, the first data carried in the second subframe, and the first data carried in the third subframe.

With reference to the first possible implementation of the fifth aspect, in a ninth possible implementation, the second determining module includes:

a tenth determining unit, configured to determine a third transport block size TBS V according to a sixth formula V=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the eighth or the ninth possible implementation of the fifth aspect, in a tenth possible implementation, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

With reference to any one of the fifth aspect or the first to the tenth possible implementations of the fifth aspect, in an eleventh possible implementation, the first determining module includes:

a creation unit, configured to create a first list for the transport block size TBS of the first subframe and the transport block size TBS of the second subframe according to a, or create a first list for the transport block size TBS of the first subframe and the first transport block size TBS according to a, or create a first list for the transport block size TBS of the first subframe and the third transport block size TBS according to a, or create, according to a, a first list for the quantity of the physical resource blocks PRBs occupied by the first data carried in the first subframe and the quantity of the physical resource blocks PRBs occupied by the first data carried in the second subframe, or create, according to a, a first list for the quantity of the physical resource blocks PRBs occupied by the first data carried in the first subframe and the quantity of the physical resource blocks PRBs occupied by both of the first data carried in the first subframe and the first data carried in the second subframe, or create, according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and an eleventh determining unit, configured to determine the first TBS, the second TBS, or the third TBS according to the first list created by the creation unit.

With reference to any one of the fifth aspect or the first to the eleventh possible implementations of the fifth aspect, in a twelfth possible implementation, the first device further includes:

a receiving module, configured to: after the first sending module sends the first subframe and the second subframe after the modulation and coding of the first modulation and coding module to the second device, receive feedback information sent by the second device, where the feedback information is used to indicate whether the second device correctly receives the first subframe and the second subframe, or the feedback information is used to indicate whether the second device correctly receives the first subframe, the second subframe, and the third subframe.

A sixth aspect of the present invention further provides a second data transmission device, including:

a first receiving module, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module, configured to obtain a quantity of physical resource blocks PRBs occupied by first data carried in the first subframe received by the first receiving module, where the first data is data sent by the first device to the second device;

a first determining module, configured to determine a first transport block size TBS or a second TBS according to the quantity, obtained by the obtaining module, of the PRBs occupied by the first data carried in the first subframe, where the second TBS includes a TBS of the first subframe and a TBS of the second subframe; and a first demodulation and decoding module, configured to perform, according to the first TBS or the second TBS that is determined by the first determining module, demodulation and decoding on the first data carried in the first subframe and the first data carried in the second subframe.

With reference to the sixth aspect, in a first possible implementation, when K is equal to 1, the second device further includes:

a second receiving module, configured to receive the first subframe, the second subframe, and a third subframe that are sent by the first device, where the third subframe is sent before the first subframe, the second subframe is sent after the first subframe, the first subframe and the third subframe are adjacent subframes, the first subframe and the second subframe are adjacent subframes, the first subframe includes N OFDM symbols, the second subframe includes M OFDM symbols, the third subframe includes P OFDM symbols, N is a positive integer, M and P are zero or positive integers, P≤N, and M≤N;

a second determining module, configured to determine a third TBS according to the quantity, obtained by the obtaining module, of the PRBs occupied by the first data carried in the first subframe, where the third TBS includes the TBS of the first subframe, the TBS of the second subframe, and a TBS of the third subframe; and a second demodulation and decoding module, configured to perform, according to the third TBS determined by the second determining module, demodulation and decoding on the first data carried in the first subframe, the first data carried in the second subframe, and the first data carried in the third subframe.

With reference to the sixth aspect, in a second possible implementation, the first determining module includes:

a first determining unit, configured to determine, according to a first formula $S=F(s \times a)$, a quantity S of physical resource blocks PRBs occupied by both of the first data carried in the first subframe and the first data carried in the second subframe, where s is the quantity of the physical resource blocks PRBs occupied by the first data carried in the first subframe, the function $F(\ )$ is a round-up, round-down, or round-off function, and a is a real number not less than 1; and a second determining unit, configured to determine the first transport block size TBS according to the quantity, determined by the first determining unit, of the physical resource blocks PRBs occupied by both of the first data carried in the first subframe and the first data carried in the second subframe.

With reference to the third aspect, in a third possible implementation, the first determining module includes:

a third determining unit, configured to determine first transport block size TBS T according to a second formula $T=F(t \times a)$, where t is the transport block size TBS of the first subframe, the transport block size TBS of the first subframe is a transport block size TBS corresponding to the quantity of the physical resource blocks PRBs occupied by the first data carried in the first subframe, the function $F(\ )$ is a round-up, round-down, or round-off function, and a is a real number not less than 1.

With reference to the second or third possible implementation of the sixth aspect, in a fourth possible implementation, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the sixth aspect, in a fifth possible implementation, the first determining module includes:

a fourth determining unit, configured to determine, according to a third formula $L=F(l \times a)$, a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

a fifth determining unit, configured to determine the transport block size TBS of the second subframe according to the quantity, determined by the fourth determining unit, of the physical resource blocks PRBs occupied by the first data carried in the second subframe; and a sixth determining unit, configured to determine the transport block size TBS of the first subframe according to the quantity, determined by the fourth determining unit, of the physical resource blocks PRBs occupied by the first data carried in the first subframe.

With reference to the sixth aspect, in a sixth possible implementation, the first determining module includes:

a seventh determining unit, configured to determine a transport block size TBS P of the second subframe according to a fourth formula P≤F(p×a), where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the fifth or the sixth possible implementation of the sixth aspect, in a seventh possible implementation, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

With reference to the first possible implementation of the sixth aspect, in an eighth possible implementation, the second determining module includes:

an eighth determining unit, configured to determine, according to a fifth formula W=F(s×a), a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and a ninth determining unit, configured to determine the third transport block size TBS according to the quantity, determined by the eighth determining unit, of the physical resource blocks PRBs occupied by all of the first data carried in the first subframe, the first data carried in the second subframe, and the first data carried in the third subframe.

With reference to the first possible implementation of the sixth aspect, in a ninth possible implementation, the second determining module includes:

a tenth determining unit, configured to determine a third transport block size TBS V according to a sixth formula V=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

With reference to the eighth or the ninth possible implementation of the sixth aspect, in a tenth possible implementation, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

With reference to any one of the sixth aspect or the first to the tenth possible implementations of the sixth aspect, in an eleventh possible implementation, the first determining module includes:

a creation unit, configured to create a first list for the transport block size TBS of the first subframe and the transport block size TBS of the second subframe according to a, or create a first list for the transport block size TBS of the first subframe and the first transport block size TBS according to a, or create a first list for the transport block size TBS of the first subframe and the third transport block size TBS according to a, or create, according to a, a first list for the quantity of the physical resource blocks PRBs occupied by the first data carried in the first subframe and the quantity of the physical resource blocks PRBs occupied by the first data carried in the second subframe, or create, according to a, a first list for the quantity of the physical resource blocks PRBs occupied by the first data carried in the first subframe and the quantity of the physical resource blocks PRBs occupied by both of the first data carried in the first subframe and the first data carried in the second subframe, or create, by the second device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and an eleventh determining unit, configured to determine the first TBS, the second TBS, or the third TBS according to the first list created by the creation unit.

With reference to the sixth aspect or the first to the eleventh possible implementations of the sixth aspect, in a twelfth possible implementation, the second device further includes:

a sending module, configured to: after the first receiving module receives the first subframe and the second subframe that are sent by the first device, send, by the second device, feedback information to the first device, where the feedback information is used to indicate whether the second device correctly receives the first subframe and the second subframe, or the feedback information is used to indicate whether the second device correctly receives the first subframe, the second subframe, and the third subframe.

A seventh aspect of the present invention further provides a data transmission device, including:

an input device, an output device, a processor, and a memory, where the processor executes the following procedure:

obtaining N orthogonal frequency division multiplexing OFDM symbols, where the N OFDM symbols are used to carry control information and data; and the output device executes the following procedure:

sending a first subframe and a second subframe to the second device, where the first subframe or the second subframe carries the control information, the first subframe includes M OFDM symbols of the N OFDM symbols, the second subframe includes K OFDM symbols of the N OFDM symbols, N is a positive integer, M or K is zero or a positive integer, M is not greater than N, and K is not greater than N.

An eighth aspect of the present invention further provides a data transmission device, including:

an input device, an output device, a processor, and a memory, where the processor executes the following procedure:

obtaining a quantity of physical resource blocks PRBs occupied by first data carried in a first subframe, where the first data is data to be sent by the first device to a second device;

determining a first transport block size TBS or a second TBS according to the quantity of the PRBs occupied by the first data carried in the first subframe, where the second TBS includes a TBS of the first subframe and a TBS of a second subframe; and performing, according to the first TBS or the second TBS, modulation and coding on the first data carried in the first subframe and the first data carried in the second subframe, where the first subframe and the second subframe are adjacent subframes; and the output device executes the following procedure:

sending the first subframe and the second subframe to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

A ninth aspect of the present invention further provides a data transmission device, including:

an input device, an output device, a processor, and a memory, where the input device executes the following procedure:

receiving a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N; and the processor executes the following procedure:

obtaining a quantity of physical resource blocks PRBs occupied by first data carried in the first subframe, where the first data is data sent by the first device to the second device;

determining a first transport block size TBS or a second TBS according to the quantity of the PRBs occupied by the first data carried in the first subframe, where the second TBS includes a TBS of the first subframe and a TBS of the second subframe; and performing, according to the first TBS or the second TBS, demodulation and decoding on the first data carried in the first subframe and the first data carried in the second subframe.

It can be seen from the foregoing technical solutions that, the embodiments of the present invention have the following advantages:

In the embodiments of the present invention, a first subframe at the start of a transmission and a second subframe at the end of the transmission are jointly scheduled by using control signaling, so that control signaling is saved in the first subframe and the second subframe. This can reduce control signaling load for the first subframe and the second subframe, enable a channel to transmit a larger proportion of valid data, and improve data transmission efficiency. In addition, subframes prepared by a first device may be normally sent in the first subframe and the second subframe, and are not discarded, which facilitates implementation of the first device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Figure 1:
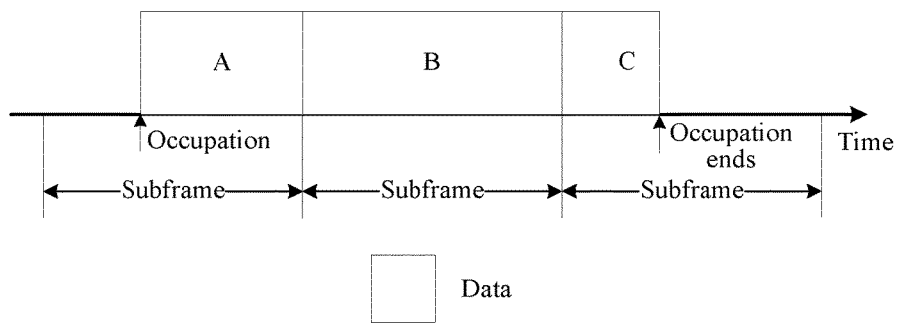
FIG. 1 shows a channel occupation status in an LAA-LTE system in the prior art according to the embodiments of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), Universal Mobile Telecommunications System (Universal Mobile Telecommunications System, UMTS), and a Worldwide Interoperability for Microwave Access (Worldwide Interoperability for Microwave Access, WiMAX) communications system.

It should be understood that in the embodiments of the present invention, a first device or a second device includes but is not limited to user equipment (English full name: User Equipment, UE for short), a mobile station (English full name: Mobile Station, MS for short), a mobile terminal (Mobile Terminal), a mobile telephone (Mobile Telephone), a handset (handset), a portable equipment (portable equipment), and the like. The user equipment may communicate with one or more core networks by using a radio access network (English full name: Radio Access Network, RAN for short). For example, the user equipment may be a mobile telephone (or referred to as a "cellular" phone), or a computer having a wireless communication function; the user equipment may further be a portable, pocket-sized, handheld, computer built-in, or in-vehicle mobile apparatus.

In the embodiments of the present invention, the first device or the second device may be a base station (English full name: Base Transceiver Station, BTS for short) in GSM or CDMA, or may be a base station (NodeB) in WCDMA, or may be an evolved NodeB (English full name: evolved Node B, eNB or e-NodeB for short) in LTE, and this is not limited in the embodiments of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that, a data transmission method provided in the embodiments of the present invention provide is applicable to a wireless communications system, and is analyzed and described in the embodiments of the present invention by using an example in which the method is applied to an LTE/LTE-A wireless communications system. The present invention is not limited thereto.

In the embodiments of the present invention, when the first device is abase station (BTS, Base Transceiver Station) in the Global System for Mobile Communications (GSM, Global System for Mobile Communications) system or the Code Division Multiple Access (CDMA, Code Division Multiple Access) system, abase station in the Wideband Code Division Multiple Access (WCDMA, Wideband Code Division Multiple Access) system, or a base station in the LAA-LTE system, the second device may be user equipment (UE, User Equipment), including but not limited to: a mobile station (MS, Mobile Station), a mobile terminal (Mobile Terminal), a mobile telephone (Mobile Telephone), a handset (handset), portable equipment (portable equipment), and the like. The first device may communicate with one or more core networks by using a radio access network (RAN, Radio Access Network). For example, the second device may be a mobile telephone (or referred to as a "cellular" phone), or a computer having a wireless communication function. Alternatively, the second device may be a portable, pocket-sized, handheld, computer built-in, or in-vehicle mobile device. When the first device is user equipment, and the second device may be a base station. When the first device is user equipment, the second device may be user equipment, and may be a receiving device that receives data sent by the first device.

Figure 2:
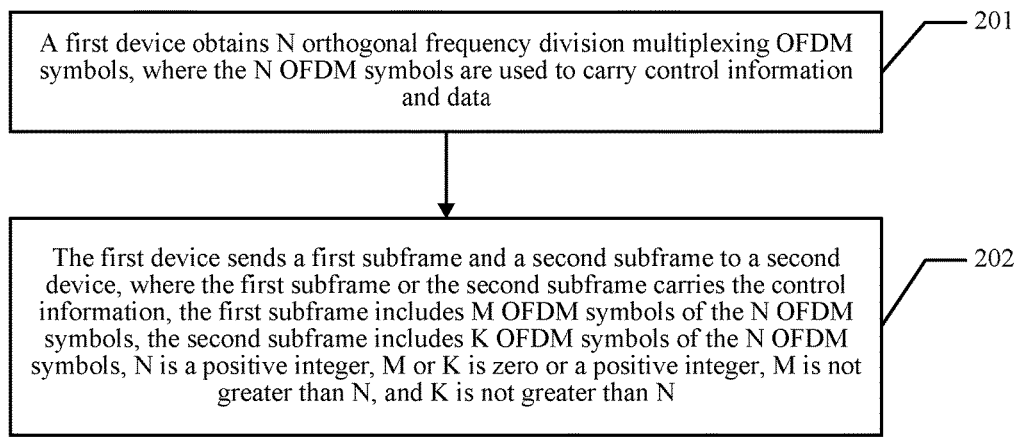
FIG. 2 is a schematic diagram of an embodiment of a data transmission method according to the embodiments of the present invention.

Referring to FIG. 2, FIG. 2 is a schematic flowchart of the data transmission method according to the embodiments of the present invention. The data transmission method may include the following steps.

201: A first device obtains N orthogonal frequency division multiplexing OFDM symbols, where the N OFDM symbols are used to carry control information and data.

In this embodiment, the first device obtains N orthogonal frequency division multiplexing (OFDM, Orthogonal Frequency Division Multiplexing) symbols. N is a positive integer. N may be equal to, greater than, or less than a quantity of OFDM symbols of a complete subframe. The N OFDM symbols are generated by the first device in a scheduling process.

In this embodiment of the present invention, the N OFDM symbols include an OFDM symbol occupied by control information. The control information may be carried on a physical downlink control channel (PDCCH, Physical Downlink Control Channel) or a physical uplink control channel (PUCCH, Physical Uplink Control Channel), and usually needs to occupy one to three OFDM symbols. The PDCCH and the PUCCH each are a set of physical resource elements, and respectively carry downlink and uplink control information. Information carried on the PDCCH and that carried on the PUCCH may be classified into common control information and dedicated control information because they are functioning in different scopes.

In addition to carrying the control information occupying one to three OFDM symbols, the N OFDM symbols further carry data that needs to be transmitted. The data may be transmitted by using a complete transport block size (TBS, Transport Block Size). It may be understood that, the complete TBS herein means a complete transport block rather than necessarily means a size of a complete subframe. Alternatively, it may be understood that, the complete TBS is not necessarily mapped to 12 or 14 OFDM symbols.

It should be noted that, whether the control information is loaded in a first subframe or a second subframe depends on quantities of OFDM symbols of the first subframe and the second subframe. A location of the control information may be flexibly configured. The control information may be loaded in a shorter subframe, or may be loaded in a longer subframe. After scheduling by a base station, a specific loading location of the control information is negotiated and determined by sending and receiving parties. Therefore, the location of the control information is not limited herein.

202: The first device sends a first subframe and a second subframe to a second device, where the first subframe or the second subframe carries the control information, the first subframe includes M OFDM symbols of the N OFDM symbols, the second subframe includes K OFDM symbols of the N OFDM symbols, N is a positive integer, M or K is zero or a positive integer, M is not greater than N, and K is not greater than N.

In this embodiment, the first device sends the first subframe and the second subframe to the second device. The first device transmits the M OFDM symbols in the first subframe, and transmits the K OFDM symbols in the second subframe. M may be zero or a positive integer. When M is zero, it indicates that the first subframe is a complete subframe or a zero subframe, that is, the first device preempts a channel at a subframe boundary. K may also be zero or a positive integer. When K is zero, it indicates that the second subframe is a complete subframe or a zero subframe, that is, first device sends the last subframe at a subframe boundary. Moreover, it may be understood that, M is not greater than N, and K is not greater than N.

It should be understood that, when a value of (M+K) is equal to N, it indicates that the N OFDM symbols obtained by the first device are all transmitted in the first subframe and the second subframe exactly. When a value of (M+K) is less than N, it indicates that some OFDM symbols are not transmitted in the first subframe and the second subframe, and may need to be transmitted in a next subframe. When a value of (M+K) is greater than N, it indicates that some symbols may be repeatedly transmitted in the first subframe and the second subframe.

In this embodiment of the present invention, a first subframe at the start of a transmission and a second subframe at the end of the transmission are jointly scheduled by using control signaling, so that control signaling is saved in the first subframe and the second subframe. This can reduce control signaling load for the first subframe and the second subframe, enable a channel to transmit a larger proportion of valid data, and improve data transmission efficiency. In addition, subframes prepared by a first device may be normally sent in the first subframe and the second subframe, and are not discarded, which facilitates implementation of the first device.

Optionally, based on the embodiment corresponding to FIG. 2, in a first optional embodiment of the data transmission method provided in the embodiments of the present invention, the method may further include:

the first subframe and the second subframe are subframes on an unlicensed carrier; or the first subframe or the second subframe is a subframe on a licensed carrier.

In this embodiment, the first device may send the first subframe and the second subframe on an unlicensed carrier to the second device. The first subframe may be a subframe at a start location in a process in which the first device occupies the unlicensed carrier for transmission, and the second subframe is a subframe at an end location in the process in which the first device occupies the unlicensed carrier for transmission.

Figure 3:
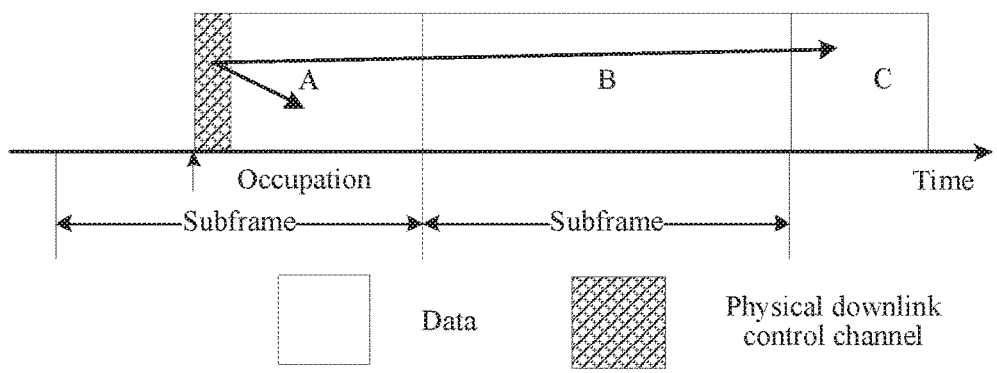
FIG. 3 is a schematic diagram of a solution of jointly scheduling subframes on an unlicensed carrier by using control information according to an embodiment of the present invention.

In this case, the OFDM symbol occupied by the control information may be carried in the first subframe or the second subframe on the unlicensed carrier. Referring to FIG. 3, FIG. 3 is a schematic diagram of a solution of jointly scheduling subframes on an unlicensed carrier by using control information according to an embodiment of the present invention. As shown in the figure, a subframe A is a first subframe, a subframe C is a second subframe, the OFDM symbol occupied by the control information is carried in the first subframe, and the control information is used to jointly schedule the first subframe and the second subframe on the unlicensed carrier. If the end of transmitted data is aligned with a subframe on a licensed carrier in time, there is no incomplete second subframe. In this case, the second subframe does not need to be scheduled by using the control information.

It should be noted that, the control information may be specifically loaded at a start location of the first subframe, or maybe loaded at any location from start to end locations of the first subframe. Therefore, a specific location of the control information in the first subframe is not specifically limited herein.

Figure 4:
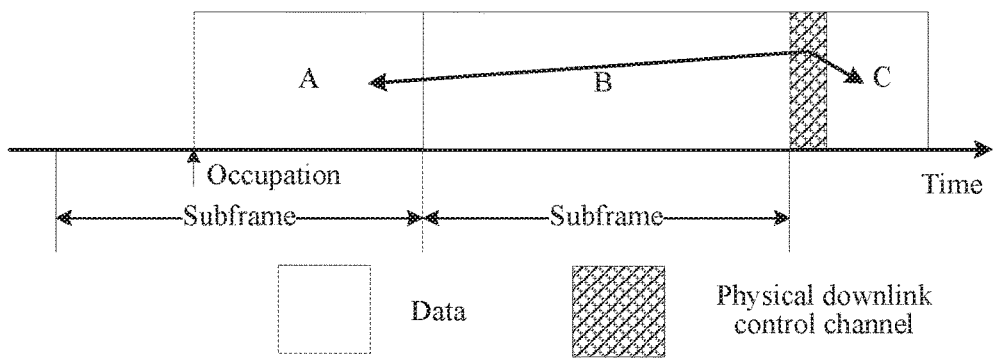
FIG. 4 is a schematic diagram of another solution of jointly scheduling subframes on an unlicensed carrier by using control information according to an embodiment of the present invention.

When a moment at which a channel is preempted is close to a start moment of a complete subframe, that is, the first subframe has only a few OFDM symbols, and the OFDM symbols are not sufficient to load the control information, or cannot be used to load valid data after the control information is loaded, the control information may be loaded in the second subframe having more symbols. Referring to FIG. 4, FIG. 4 is a schematic diagram of another solution of jointly scheduling subframes on an unlicensed carrier by using control information according to an embodiment of the present invention. As shown in the figure, a subframe A is a first subframe, a subframe C is a second subframe, the OFDM symbol occupied by the control information is carried in the second subframe, and the control information is used to jointly schedule the first subframe and the second subframe on the unlicensed carrier. If the start of transmitted data is aligned with a subframe on a licensed carrier in time, there is no incomplete first subframe. In this case, the first subframe does not need to be scheduled by using the control information.

It should be noted that, the control information may be specifically loaded at a start location of the second subframe, or maybe loaded at any location from start to end locations of the second subframe. Therefore, a specific location of the control information in the second subframe is not specifically limited herein.

In this embodiment, the first device may alternatively send the first subframe on a licensed carrier or the second subframe on a licensed carrier to the second device. In this case, the first subframe or the second subframe may be a complete subframe on the licensed carrier.

Figure 5:
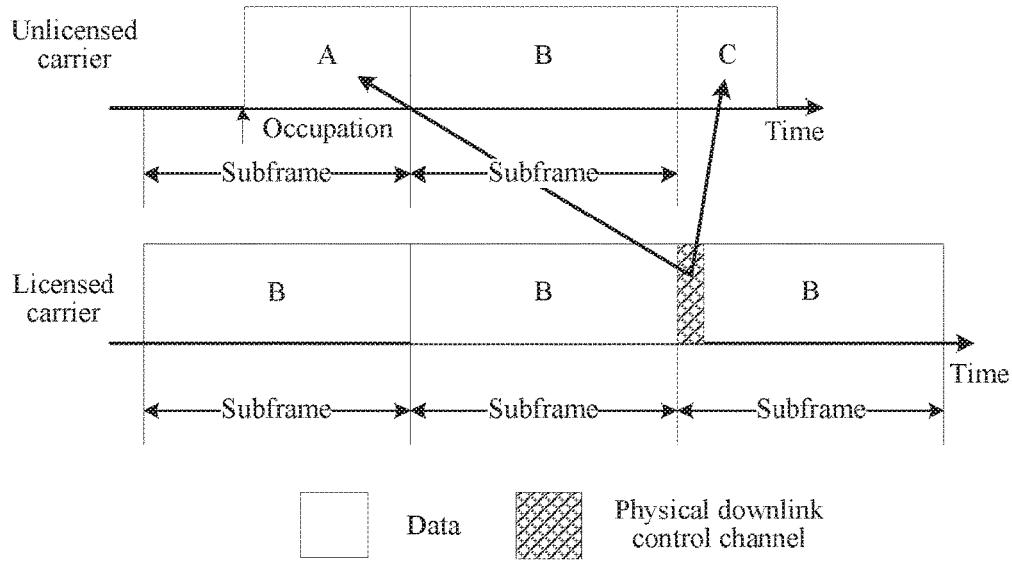
FIG. 5 is a schematic diagram of a solution of jointly scheduling subframes on a licensed carrier by using control information according to an embodiment of the present invention.
Figure 6:
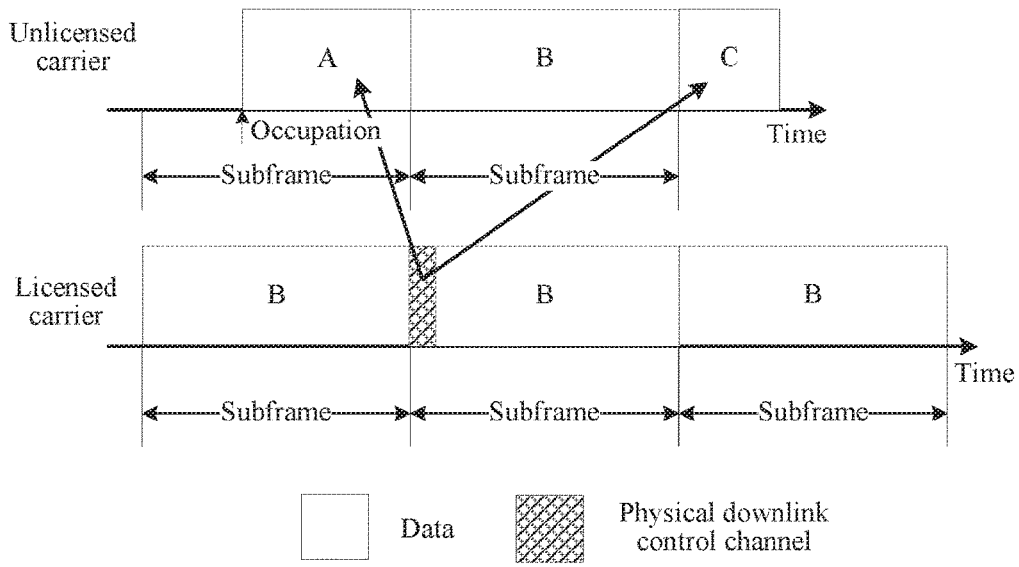
FIG. 6 is a schematic diagram of another solution of jointly scheduling subframes on a licensed carrier by using control information according to an embodiment of the present invention.

The OFDM symbol occupied by the control information may be carried in the first subframe or the second subframe on the licensed carrier. Referring to FIG. 5, FIG. 5 is a schematic diagram of a solution of jointly scheduling subframes on a licensed carrier by using control information according to an embodiment of the present invention. As shown in the figure, a subframe B may be a first subframe or a second subframe, the OFDM symbol occupied by the control information is carried in the first subframe or the second subframe, and the control information is used to jointly schedule the first subframe and the second subframe on an unlicensed carrier. Similarly, the OFDM symbol occupied by the control information may alternatively be carried in another complete subframe on the licensed carrier. For example, referring to FIG. 6, FIG. 6 is a schematic diagram of another solution of jointly scheduling subframes on a licensed carrier by using control information according to an embodiment of the present invention.

It should be noted that, a specific location on the licensed carrier at which the control information is carried is not limited in this embodiment, that is, the control information may be carried in any subframe on the licensed carrier, which is not limited herein. However, the second device needs to learn which subframe instructs subframe scheduling. Therefore, the first device and the second device need to negotiate and agree on a specific location, or the first device notifies the second device of a specific location of the control information on the licensed carrier or the unlicensed carrier.

A licensed spectrum is a frequency resource dedicated to some operators. An unlicensed spectrum is a common frequency resource in a wireless communications network.

In this embodiment of the present invention, the control information may be downlink control information (DCI, Downlink Control Information), the DCI is carried on a PDCCH, and the DCI sent by the base station to user equipment includes downlink resource allocation, a hybrid automatic repeat request (HARQ, Hybrid Automatic Repeat Request), power control, and the like.

In this embodiment of the present invention, the control information may alternatively be uplink control information (UCI, Uplink Control Information), the UCI is carried on a PUCCH, and the UCI sent by user equipment to the base station includes uplink resource allocation, a hybrid automatic repeat request (HARQ, Hybrid Automatic Repeat Request), power control, and the like.

The DCI or the UCI may be used to indicate modulation and coding parameters of a data part in the N OFDM symbols. The modulation and coding parameters include a modulation and coding scheme (MCS, Modulation and Coding Scheme) level of the data part in the N OFDM symbols, a quantity of physical resource blocks (PRB, Physical Resource Block) of the data part in the N OFDM symbols and locations of the PRBs, and a hybrid HARQ process number of the data part in the N OFDM symbols.

In Long Term Evolution (LTE, Long Term Evolution), a rate is configured by using an MCS index value. According to an MCS, a concerned factor affecting a communication rate is used as a column of an index table, and an MSC value is used as a row of the index table, to form a rate index table. Therefore, each MCS index actually corresponds to a physical transmission rate corresponding to a set of parameters.

A PRB and a virtual resource block (VRB, Virtual Resource Block) are two parts of a resource block (RB, Resource Block). A Media Access Control (MAC, Media Access Control) layer allocates a resource based on a VRB, and then maps the VRB to a PRB. There are two manners for mapping a VRB to a PRB: a distributed manner and a centralized manner. In the centralized manner, a VRB is in a one-to-one correspondence with a PRB. In the distributed manner, interleaving first needs to be performed, and then a VRB is mapped to an actual PRB according to a mapping rule.

HARQ is a technology combining forward error correction (FEC, Forward Error Correction) and an automatic repeat request (ARQ, Automatic Repeat Request). The HARQ technology is introduced at a physical layer, may combine retransmitted data to bring a combination gain, and has relatively high retransmission efficiency and a relatively low latency. Usually, the HARQ technology is introduced for three purposes: first, precisely match a channel status, second, further improve adaptive modulation and coding (AMC, Adaptive Modulation and Coding) performance, and third, obtain a power gain.

Then, in this embodiment of the present invention, a manner in which control information is carried on an unlicensed carrier or a licensed carrier is provided, to meet a requirement that the control information needs to be loaded at different locations in different cases. In addition, this can reduce space occupied in a subframe by the control information, enable a channel to transmit a larger proportion of valid data, improve data transmission efficiency, and enhance practicability and flexibility of the solution.

Optionally, based on the first optional embodiment corresponding to FIG. 2, in a second optional embodiment of the data transmission method provided in the embodiments of the present invention, the method may further include:

when M is not less than a first preset threshold, the first subframe carries the control information; or when M is less than the first preset threshold, the second subframe carries the control information; or when K is not less than a second preset threshold, the second subframe carries the control information; or when K is less than the second preset threshold, the first subframe carries the control information.

In this embodiment, the first device transmits M OFDM symbols in the first subframe. M is a non-negative integer. When M is greater than or equal to a first preset threshold, the control information may be transmitted in the first subframe. When M is less than the first preset threshold, the control information is transmitted in the second subframe. When M is less than the first preset threshold, the control information cannot be completely transmitted in the first subframe. Accordingly, the control information may be loaded in the second subframe for transmission, to prevent the control information from being partitioned into multiple parts for sending, and avoid affecting a data transmission effect.

When and only when a value of M is 0, that is, the first subframe has no OFDM symbol, the control information is surely not loaded in the first subframe.

It should be noted that, the first device may set the first preset threshold in advance, and notify the second device of the first preset threshold. The first preset threshold may be set to 3 or another proper value, which is not limited herein.

In this embodiment, the first device transmits K OFDM symbols in the second subframe. K is a non-negative integer. When K is greater than or equal to a second preset threshold, the control information may be transmitted in the second subframe. When K is less than the second preset threshold, the control information is transmitted in the first subframe. When K is less than the second preset threshold, the control information cannot be completely transmitted in the second subframe. Accordingly, the control information may be loaded in the first subframe for transmission, to prevent the control information from being partitioned into multiple parts for sending, and avoid affecting a data transmission effect.

When and only when a value of K is 0, that is, the second subframe has no OFDM symbol, the control information is surely not loaded in the second subframe.

It should be noted that, the first device may set the second preset threshold in advance, and notify the second device of the second preset threshold. The second preset threshold may be set to 3 or another proper value, which is not limited herein.

Moreover, in this embodiment of the present invention, two cases are set. One is: When a first subframe does not have sufficient OFDM symbols to load control information, the control information may be loaded in a second subframe. The other is: When the second subframe does not have sufficient OFDM symbols to load the control information, the control information may be loaded in the first subframe. For the cases, a first preset threshold or a second preset threshold is set on a first device side, and a specific threshold is set according to an actual situation. In this way, the solution has better operability during actual application, and flexibility of a first device in scheduling is enhanced.

Optionally, based on any embodiment of the embodiment corresponding to FIG. 2, the first optional embodiment corresponding to FIG. 2, or the second optional embodiment corresponding to FIG. 2, in a third optional embodiment of the data transmission method provided in the embodiments of the present invention, the method may further include:

sending, by the first device, an identifier of an unlicensed carrier occupied by the first device to the second device, where the identifier is used to indicate a start location from which the first device occupies the unlicensed carrier and an occupation duration, or used to indicate a quantity of OFDM symbols included in the first subframe and/or the second subframe and locations of the OFDM symbols.

In this embodiment, the first device sends an identifier of an unlicensed carrier occupied by the first device to the second device. The identifier is used to indicate a start location from which the first device occupies the unlicensed carrier and an occupation duration, or may be used to indicate a quantity of OFDM symbols included in the first subframe and/or the second subframe and locations of the OFDM symbols.

For the first subframe, according to a time at which an unlicensed channel starts to be preempted and a time at which a next complete subframe appears, a time from the preempting moment to the time at which the next complete subframe appears may be calculated. A complete subframe has a duration of 1 millisecond (ms). Therefore, a quantity of symbols of the first subframe may be calculated.

For the second subframe, if the second device has learned the duration within which the first device occupies the channel, the second device may calculate a quantity of OFDM symbols included in the second subframe and locations of the OFDM symbols. The first device may send the channel occupation duration. The first device occupies the channel based on a maximum channel occupation duration by default. For example, the maximum channel occupation duration is 4 ms in Japan, and is 10 ms or 13 ms in other countries. The first device may obtain the quantity of the symbols of the second subframe and the locations of the OFDM symbols by subtracting a total channel occupation duration by a duration within which the first subframe occupies the channel and a duration within which all other complete subframes occupy the channel.

If the second device does not learn the duration within which the first device occupies the channel, for example, the first device does not occupy the channel based on the maximum channel occupation duration, or channel occupation needs to be ended during sending and the channel is switched from "enabled" to "disabled", the quantity of the symbols of the second subframe and the locations of the OFDM symbols need to be indicated on an unlicensed carrier or a licensed carrier.

It may be understood that, if the first subframe plus the second subframe is equal to a length of a complete subframe, the second device may calculate a length of the second subframe according to a length of the first subframe. In this case, only the location of the second subframe needs to be indicated, that is, a subframe in which the second subframe appears is indicated.

Figure 7:
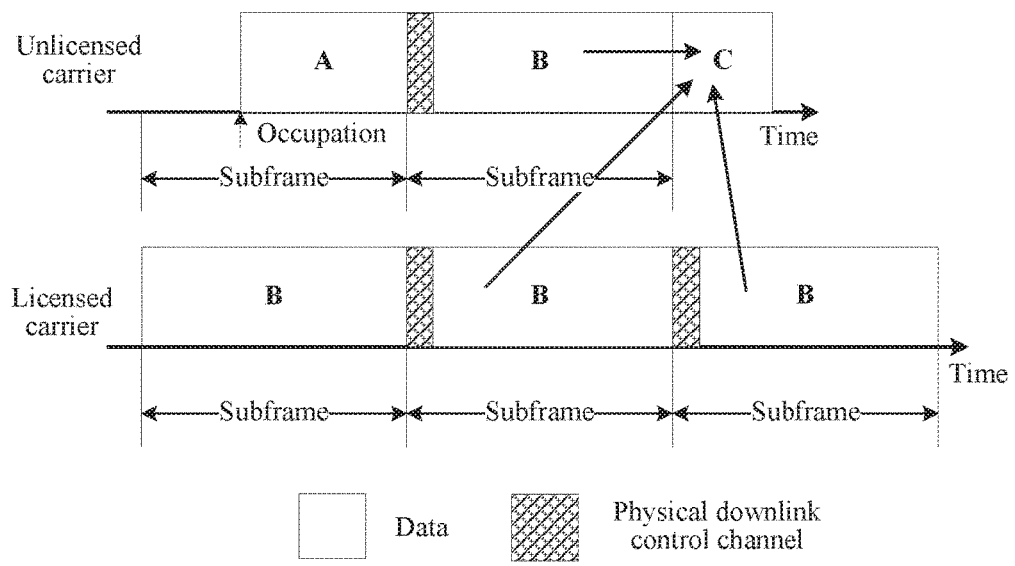
FIG. 7 is a schematic diagram of several manners for indicating a location and a length of a second subframe according to an embodiment of the present invention.

Referring to FIG. 7, FIG. 7 provides a schematic diagram of several manners for indicating a location and a length of a second subframe. As shown in the figure, a subframe C is a second subframe, a subframe A is a first subframe, and the location and the length of the second subframe may be indicated in a complete subframe on an unlicensed carrier, or may be indicated in any complete subframe on a licensed carrier. The several methods shown in the figure for indicating the location and the length of the second subframe are feasible, but the present invention is not limited thereto.

Further, in this embodiment, regardless of whether a second device has learned a duration of channel occupation by a transmit node, the second device may obtain a location and a symbol quantity of an incomplete subframe at the end. Therefore, different solutions may be used according to different situations during actual application, thereby enhancing flexibility of the solution.

Optionally, based on any corresponding embodiment of the embodiment corresponding to FIG. 2 or the first to the third optional embodiments corresponding to FIG. 2, in a fourth optional embodiment of the data transmission method provided in the embodiments of the present invention, the method may further include:

receiving, by the first device, feedback information sent by the second device, where the feedback information is used to indicate whether the first subframe and the second subframe are correctly received.

In this embodiment, after sending a first subframe and a second subframe to a second device, a first device may receive first feedback information sent by the second device. The information is used to indicate whether the second device correctly receives the first subframe and the second subframe. In this way, reception statuses of two subframes may be indicated by using one piece of feedback information.

It should be noted that the first feedback information may be HARQ information or other information, which is not limited herein.

Furthermore, in this embodiment, a second device may send first feedback information to a first device according to whether a first subframe and a second subframe are correctly received, so that the first device may learn whether the first subframe and the second subframe need to be retransmitted, enhancing feasibility of the solution.

Figure 8:
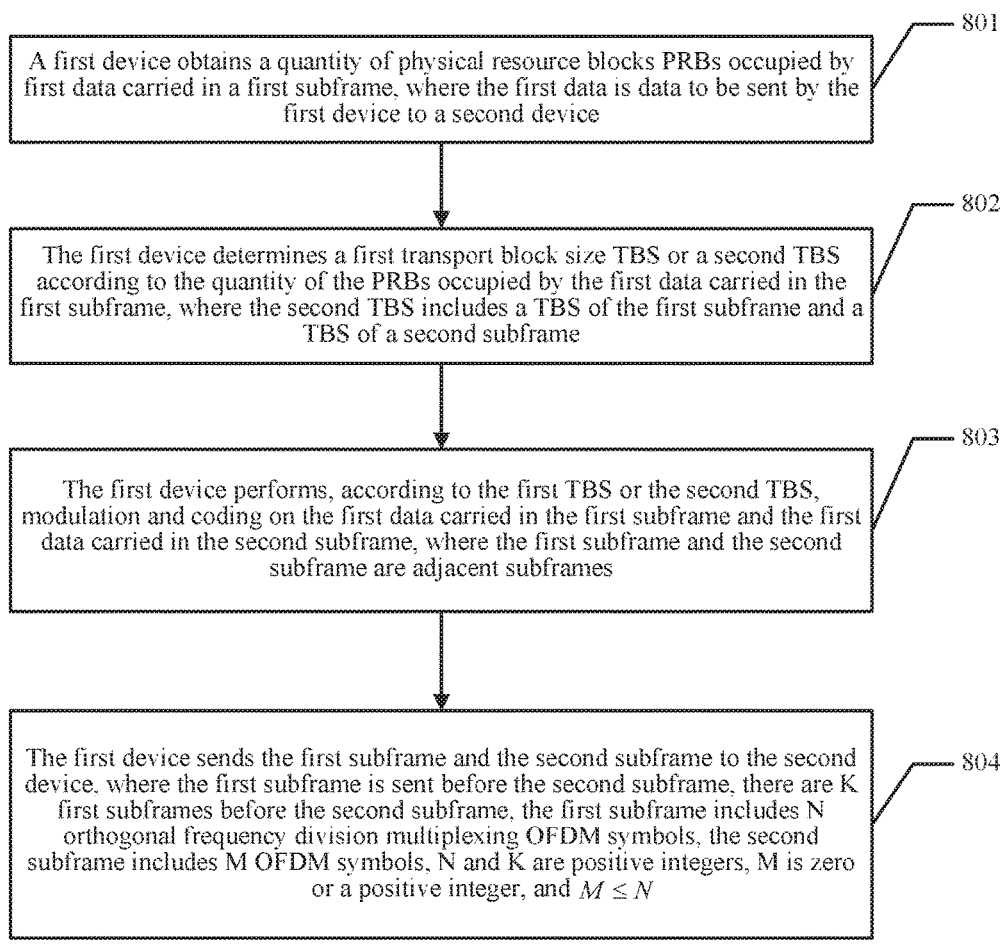
FIG. 8 is a schematic diagram of another embodiment of a data transmission method according to the embodiments of the present invention.

The foregoing embodiments describe a data transmission method, and the following describes another data transmission method. Referring to FIG. 8, FIG. 8 is a schematic diagram of another embodiment of the data transmission method according to the embodiments of the present invention. The data transmission method may include the following steps.

801: A first device obtains a quantity of physical resource blocks PRBs occupied by first data carried in a first subframe, where the first data is data to be sent by the first device to a second device.

In this embodiment, the first device obtains the quantity of physical resource blocks (PRB, Physical Resource Block) occupied by the first data carried in the first subframe. The first data is the data to be sent by the first device to the second device. The data of the PRBs occupied by the first data carried in the first subframe and locations of the PRBs may be configured in advance, and are determined by the first device or the second device.

802: The first device determines a first transport block size TBS or a second TBS according to the quantity of the PRBs occupied by the first data carried in the first subframe, where the second TBS includes a TBS of the first subframe and a TBS of a second subframe.

In this embodiment, the first device determines the first transport block size (TBS, Transport Block Size) or the second transport block size according to the quantity of the PRBs occupied by the first data carried in the first subframe.

The first TBS is a TBS obtained by combining the first data carried in the first subframe and the first data carried in the second subframe as a whole, and the second TBS includes a TBS of the first subframe and a TBS of the second subframe.

803: The first device performs, according to the first TBS or the second TBS, modulation and coding on the first data carried in the first subframe and the first data carried in the second subframe, where the first subframe and the second subframe are adjacent subframes.

In this embodiment, the first device jointly performs modulation and coding on the first data carried in the first subframe and the first data carried in the second subframe according to the first TBS, or the first device separately performs modulation and coding on the first data carried in the first subframe and the first data carried in the second subframe according to the second TBS. The first subframe and the second subframe are adjacent subframes.

It may be understood that, the first subframe is a subframe on an unlicensed carrier, a next subframe of the first subframe is the second subframe on the unlicensed carrier, that is, the second subframe may be an incomplete subframe, and the first subframe is a complete subframe. It should be noted that, the second subframe may alternatively be a blank subframe.

804: The first device sends the first subframe and the second subframe to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

In this embodiment, the first device sends the first subframe and the second subframe to the second device. The first subframe is sent before the second subframe, there are K first subframes before the second subframe, the first subframe includes N OFDM symbols, the second subframe includes M OFDM symbols, N and K are positive integers, M is zero or a positive integer, and M≤N;

The N OFDM symbols include an OFDM symbol occupied by control information. The control information may be carried on a PDCCH or a PUCCH, and usually needs to occupy one to three OFDM symbols. The PDCCH and the PUCCH each are a set of physical resource elements, and respectively carry downlink and uplink control information. Information carried on the PDCCH and that carried on the PUCCH may be classified into common control information and dedicated control information because they are functioning in different scopes.

It should be noted that, a sum of the quantity of the OFDM symbols of the first subframe and the quantity of the OFDM symbols of the second subframe may be equal to, greater than, or less than a quantity of OFDM symbols of a complete subframe, which is not limited herein. It may be understood that, a complete subframe has 12 or 14 OFDM symbols. When a normal cyclic prefix (NCP, Normal Cyclic Prefix) is used for the subframes, a subframe includes 14 OFDM symbols. When an extended cyclic prefix (ECP, Extended Cyclic Prefix) is used for the subframes, a subframe includes 12 OFDM symbols.

In this embodiment of the present invention, a first device obtains a quantity of PRBs occupied by first data carried in a first subframe, determines a first TBS or a second TBS according to the quantity of the PRBs occupied by the first data carried in the first subframe, performs, according to the first TBS or the second TBS, modulation and coding on the first data carried in the first subframe and the first data carried in a second subframe, and sends the first subframe and the second subframe to a second device. This resolves a problem in the prior art that modulation and coding and data transmission cannot be performed based on an incomplete subframe, and saves a channel resource and improves data transmission efficiency.

Optionally, based on the embodiment corresponding to FIG. 8, in a first optional embodiment of the data transmission method provided in the embodiments of the present invention, when K is equal to 1, the method may further include:

determining, by the first device, a third TBS according to the quantity of the PRBs occupied by the first data carried in the first subframe, where the third TBS includes the TBS of the first subframe, the TBS of the second subframe, and a TBS of a third subframe;

performing, by the first device according to the third TBS, modulation and coding on the first data carried in the first subframe, the first data carried in the second subframe, and the first data carried in the third subframe, where the first subframe and the third subframe are adjacent subframes, and the first subframe and the second subframe are adjacent subframes; and sending, by the first device, the first subframe, the second subframe, and the third subframe to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

In this embodiment, the first device determines a third TBS according to the data of the PRBs occupied by the first data carried in the first subframe. The third TBS is a TBS obtained by combining the first data carried in the first subframe, the first data carried in the second subframe, and the first data carried in the third subframe as a whole. The first device jointly performs, according to the third TBS, modulation and coding on the first data carried in the first subframe, the first data carried in the second subframe, and the first data carried in the third subframe. The first subframe and the third subframe are adjacent subframes, and the first subframe and the second subframe are adjacent subframes. The first device sends the first subframe, the second subframe, and the third subframe to the second device. The third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

It may be understood that the foregoing case occurs when K is equal to 1, that is, there are one complete subframe and two incomplete subframes on an unlicensed carrier.

It should be noted that, a trellis coded modulation technology may be used. Coding and modulation are considered as a whole rather than as mutually independent processes. This avoids an information loss caused when a demodulator on a receive end makes a hard decision, has an advantage of obtaining an apparent coding gain without increasing channel bandwidth and reducing a rate of transmitting valid information, and optimizes system band and power utilization.

Then, in this embodiment of the present invention, a solution is provided, that is, when a first device sends a first subframe, a second subframe, and a third subframe to a second device, when the third subframe is sent before the first subframe and the second subframe is sent after the first subframe, modulation and coding may be jointly performed on the three subframes, enhancing practicability of the solution.

The following describes manners for calculating the first TBS, the second TBS, and the third TBS. It should be noted that, the following methods are described as examples, and it does not mean that the present invention is limited thereto.

1. First manner for calculating the first TBS

Optionally, based on the embodiment corresponding to FIG. 8, in a second optional embodiment of the data transmission method provided in the embodiments of the present invention, the determining, by the first device, a first TBS according to the quantity of the PRBs occupied by the first data carried in the first subframe may include:

determining, by the first device according to a first formula S=F(s×a), a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and determining, by the first device, the first transport block size TBS according to the quantity of the physical resource blocks PRBs occupied by both of the first data carried in the first subframe and the first data carried in the second subframe.

In this embodiment, the first device determines, according to a first formula S=F(s×a), a quantity S of PRBs occupied by both of the first data carried in the first subframe and the first data carried in the second subframe. s is the quantity of the PRBs occupied by the first data carried in the first subframe, the function F( ) is a round-up, round-down, or round-off function, and a is a real number not less than 1. In this case, a is $(M_1+M_2)/M_2$. $M_1$ is used to indicate a quantity of PRBs or symbols occupied by the first data and/or control information carried in the second subframe, and $M_2$ is used to indicate a quantity of PRBs or OFDM symbols occupied by the first data and/or control information carried in the first subframe.

The first device determines the first TBS according to the quantity of the PRBs occupied by both of the first data carried in the first subframe and the first data carried in the second subframe, and jointly performs, according to the first TBS, modulation and coding on the first data carried in the first subframe and the first data carried in the second subframe.

The first device may determine the first TBS by querying Table 1. The first device determines the first TBS according to a transport block size index ($I_{TBS}$, Index of Transport Block Size) and a physical resource block quantity ($N_{PRB}$, Physical Resource Block Number). $I_{TBS}$ corresponds to a modulation and coding scheme (MCS, Modulation and Coding Scheme) level, and $N_{PRB}$ corresponds to the quantity of the PRBs occupied by both of the first data carried in the first subframe and the first data carried in the second subframe.

TABLE 1

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3122 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4775 | 4776 | 4968 | 4968 | 5160 | 5160 | 5352 |
| 6 | 5352 | 5352 | 5544 | 5736 | 5736 | 5992 | 5992 | 5992 | 6200 | 6200 |

Referring to Table 1, for example, when an MCS level is 1, $I_{TBS}$ is 1. If it is calculated that $N_{PRB}$ is 51, it may be determined from the table that the first TBS is 1864.

Optionally, based on the embodiment corresponding to FIG. 8, in a third optional embodiment of the data transmission method provided in the embodiments of the present invention, the determining, by the first device, a first transport block size TBS according to the quantity of the physical resource blocks PRBs occupied by the first data carried in the first subframe may include:

determining, by the first device, a first transport block size TBS T according to a second formula T=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

In this embodiment, the first device determines a first TBS T according to a second formula T=F(t×a), and jointly performs, according to the first TBS, modulation and coding on the first data carried in the first subframe and the first data carried in the second subframe. t is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1.

For example, referring to Table 1, when it is calculated that a TBS corresponding to the joint scheduling on the first subframe and the second subframe is 2152, 2280 that is closest to 2152 when $N_{PRB}$ is 51 may be used as the TBS corresponding to the joint scheduling on the first subframe and the second subframe.

Optionally, based on the second optional embodiment or the third optional embodiment corresponding to FIG. 8, in a fourth optional embodiment of the data transmission method provided in the embodiments of the present invention, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

In this embodiment, a is a proportional factor $(M_1+M_2)/M_2$, and is a real number not less than 1. $M_1$ is used to indicate a quantity of physical resource blocks PRBs or orthogonal frequency division multiplexing OFDM symbols occupied by the first data and/or control information carried in the second subframe, and $M_2$ is used to indicate a quantity of PRBs or OFDM symbols occupied by the first data and/or control information carried in the first subframe. When a is equal to 1, the second subframe carries zero OFDM symbol, that is, the second subframe is a blank subframe.

Moreover, in this embodiment of the present invention, multiple manners for calculating a first TBS are provided, and two different formulas may be separately used for calculation. This enhances feasibility of the solution during actual application. In addition, provision of the two calculation formulas may further enhance flexibility of the solution.

1. Second Manner for Calculating the Second TBS

Optionally, based on the embodiment corresponding to FIG. 8, in a fifth optional embodiment of the data transmission method provided in the embodiments of the present invention, the determining, by the first device, a second TBS according to the quantity of the PRBs occupied by the first data carried in the first subframe may include:

determining, by the first device according to a third formula L=F(l×a), a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

determining, by the first device, the transport block size TBS of the second subframe according to the quantity of the physical resource blocks PRBs occupied by the first data carried in the second subframe; and determining, by the first device, the transport block size TBS of the first subframe according to the quantity of the physical resource blocks PRBs occupied by the first data carried in the first subframe.

In this embodiment, the first device separately performs, according to the second TBS, modulation and coding on the first data carried in the first subframe and the first data carried in the second subframe. In this case, the first device performs, according to the TBS of the first subframe, modulation and coding on the first data carried in the first subframe, and performs, according to the TBS of the second subframe, modulation and coding on the first data carried in the second subframe. The TBS of the first subframe is a TBS corresponding to the quantity of the PRBs occupied by the first data carried in the first subframe. The TBS of the second subframe is a TBS corresponding to a quantity of PRBs occupied by the first data carried in the second subframe.

The first device determines, according to a third formula L=F(l×a), the quantity L of the physical resource blocks PRBs occupied by the first data carried in the second subframe. l is the quantity of the physical resource blocks PRBs occupied by the first data carried in the first subframe, the function F( ) is a round-up, round-down, or round-off function, and a is a positive real number not greater than 1.

The first device determines the TBS of the second subframe according to the quantity of the PRBs occupied by the first data carried in the second subframe.

The first device determines the TBS of the first subframe according to the quantity of the PRBs occupied by the first data carried in the first subframe.

Optionally, based on the embodiment corresponding to FIG. 8, in a sixth optional embodiment of the data transmission method provided in the embodiments of the present invention, the determining, by the first device, a second TBS according to the quantity of the PRBs occupied by the first data carried in the first subframe includes:

determining, by the first device, a transport block size TBS P of the second subframe according to a fourth formula $P=F(p\times a)$, where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

In this embodiment, the first device determines, according to a fourth formula $P=F(p\times a)$, a TBS P of the second subframe. p is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1.

Optionally, based on the fifth optional embodiment or the sixth optional embodiment corresponding to FIG. 8, in a seventh optional embodiment of the data transmission method provided in the embodiments of the present invention, a is $M_1/M_2$, is $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

In this embodiment, in this case, a is $M_1/M_2$, and is a positive real number not greater than 1. $M_1$ is used to indicate a quantity of PRBs or OFDM symbols occupied by the first data and/or control information carried in the second subframe, and $M_2$ is used to indicate a quantity of PRBs or OFDM symbols occupied by the first data and/or control information carried in the first subframe. When a is equal to 1, the second subframe is a complete subframe.

With reference to the first implementation, after the third formula or the fourth formula is used for calculation, the TBS of the first subframe and the TBS of the second subframe may be determined by querying Table 1. A query manner is the same as the manner described in the above-mentioned first implementation, and details are not described herein again.

Further, in this embodiment of the present invention, multiple manners for calculating a second TBS are provided, and two different formulas may be separately used for calculation. This enhances feasibility of the solution during actual application. In addition, provision of the two calculation formulas may further enhance flexibility of the solution.

1. Third Manner for Calculating the Third TBS

Optionally, based on the first optional embodiment corresponding to FIG. 8, in an eighth optional embodiment of the data transmission method provided in the embodiments of the present invention, the determining, by the first device, a third TBS according to the quantity of the PRBs occupied by the first data carried in the first subframe may include:

determining, by the first device according to a fifth formula $W=F(s\times a)$, a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and determining, by the first device, the third transport block size TBS according to the quantity of the physical resource blocks PRBs occupied by all of the first data carried in the first subframe, the first data carried in the second subframe, and the first data carried in the third subframe.

In this embodiment, the third TBS is calculated by using the first data carried in the first subframe, the first data carried in the second subframe, and the first data carried in the third subframe as a whole, that is, the third TBS is a whole.

In this embodiment, the first device determines, according to a fifth formula $W=F(s\times a)$, a quantity W of physical resource blocks PRBs occupied by all of the first data carried in the first subframe, the first data carried in the second subframe, and the first data carried in the third subframe. s is the quantity of the physical resource blocks PRBs occupied by the first data carried in the first subframe, the function F( ) is a round-up, round-down, or round-off function, and a is a real number not less than 1. In this case, a is $(M_1+M_2+M_3)/M_2$. $M_1$ is used to indicate a quantity of PRBs or symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

The first device determines the third TBS according to the quantity of the PRBs occupied by all of the first data carried in the first subframe, the first data carried in the second subframe, and the first data carried in the third subframe, and jointly performs, according to the third TBS, modulation and coding on the first data carried in the first subframe, the first data carried in the second subframe, and the first data carried in the third subframe.

Optionally, based on the first optional embodiment corresponding to FIG. 8, in a ninth optional embodiment of the data transmission method provided in the embodiments of the present invention, the determining, by the first device, a third TBS according to the quantity of the PRBs occupied by the first data carried in the first subframe may include:

determining, by the first device, a third transport block size TBS V according to a sixth formula $V=F(t\times a)$, where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

In this embodiment, the first device determines a third TBS V according to a sixth formula V=F(t×a), and jointly performs, according to the third TBS, modulation and coding on the first data carried in the first subframe, the first data carried in the second subframe, and the first data carried in the third subframe. t is the TBS of the first subframe, the TBS of the first subframe is a TBS corresponding to the quantity of the PRBs occupied by the first data carried in the first subframe, and the function F( ) is a round-up, round-down, or round-off function. In this case, a is $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe. a is a real number not less than 1.

Optionally, based on the eighth optional embodiment or the ninth optional embodiment corresponding to FIG. 8, in a tenth optional embodiment of the data transmission method provided in the embodiments of the present invention, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

It may be understood that, with reference to the first implementation, after the first formula or the second formula is used for calculation, the TBS of the first subframe, the TBS of the second subframe, and the TBS of the third subframe may be determined by querying Table 1. A query manner is the same as the manner described in the above-mentioned first implementation, and details are not described herein again.

Furthermore, in this embodiment of the present invention, multiple manners for calculating a third TBS are provided, and the third TBS may be calculated in different scenarios according to an actual requirement. This enhances feasibility of the solution during actual application, and further enhances flexibility of the solution.

Optionally, based on any embodiment of the embodiment corresponding to FIG. 8 to the tenth optional embodiment corresponding to FIG. 8, in an eleventh optional embodiment of the data transmission method provided in the embodiments of the present invention, the determining, by the first device, a first TBS, a second TBS, or a third TBS according to the quantity of the physical resource blocks PRBs occupied by the first data carried in the first subframe includes:

creating, by the first device, a first list for the transport block size TBS of the first subframe and the transport block size TBS of the second subframe according to a, or creating, by the first device, a first list for the transport block size TBS of the first subframe and the first transport block size TBS according to a, or creating, by the first device, a first list for the transport block size TBS of the first subframe and the third transport block size TBS according to a, or creating, by the first device according to a, a first list for the quantity of the physical resource blocks PRBs occupied by the first data carried in the first subframe and the quantity of the physical resource blocks PRBs occupied by the first data carried in the second subframe, or creating, by the first device according to a, a first list for the quantity of the physical resource blocks PRBs occupied by the first data carried in the first subframe and the quantity of the physical resource blocks PRBs occupied by both of the first data carried in the first subframe and the first data carried in the second subframe, or creating, by the first device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and determining, by the first device, the first TBS, the second TBS, or the third TBS according to the first list.

In this embodiment, the first list may include at least one of a layer 1 TBS table, a layer 2 TBS table, a layer 3 TBS table, or a layer 4 TBS table in a Long Term Evolution (LTE, Long Term Evolution) system, or a preset list defines a corresponding TBS when a PRB quantity exceeds 110, or a preset list defines a corresponding TBS when a TBS goes beyond a range of a prior-art list, ensuring that a corresponding first TBS can still be found in the preset list even though a calculated TBS goes beyond the prior-art list.

In this case, a is $(M_1+M_2)/M_2$, $M_1/M_2$, or $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

It may be understood that, the first device may further send a is $(M_1+M_2)/M_2$, $M_1/M_2$, or $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe. Alternatively, $M_1$ and $M_2$ may be quantities of PRBs or sampling time intervals. Herein, $M_1$ and $M_2$ need to indicate only quantities of physical resources occupied by information that is sent to the second device in the first subframe and the second subframe. Alternatively, the first device and the second device may pre-define a proportional factor generation rule, the first device and the second device generate a proportional factor both according to the rule, and the first device does not need to send the proportional factor.

Still further, in this embodiment of the present invention, an appropriate grouping method is provided, so that the solution has better performance during actual application. In addition, because a solution is further proposed for a case of going beyond a list, flexibility of the solution is further enhanced.

Optionally, based on any corresponding embodiment of the embodiment corresponding to FIG. 8 to the eleventh optional embodiment corresponding to FIG. 8, in a twelfth optional embodiment of the data transmission method provided in the embodiments of the present invention, the method may further include:

receiving, by the first device, feedback information sent by the second device, where the feedback information is used to indicate whether the second device correctly receives the first subframe and the second subframe, or the feedback information is used to indicate whether the second device correctly receives the first subframe, the second subframe, and the third subframe.

In this embodiment, after sending the first subframe and the second subframe to the second device, the first device may receive first feedback information sent by the second device. The first feedback information is used to indicate whether the second device correctly receives the first subframe and the second subframe. In this way, reception statuses of two subframes are indicated by using one piece of feedback information. Preferably, the first feedback information may be hybrid automatic repeat request (HARQ, Hybrid Automatic Repeat Request) information.

In addition, in this embodiment, after sending the first subframe, the second subframe, and the third subframe to the second device, the first device may further receive first feedback information sent by the second device. The first feedback information is used to indicate whether the second device correctly receives the first subframe, the second subframe, and the third subframe. In this way, reception statuses of three subframes are indicated by using one piece of feedback information. Preferably, the first feedback information may be HARQ information.

It should be noted that, the first feedback information may be HARQ information or other information, which is not limited herein.

Yet further, in this embodiment, a second device may send first feedback information to a first device according to whether a first subframe and a second subframe are correctly received or whether a first subframe, a second subframe, and a third subframe are correctly received, so that the first device may learn whether the first subframe and the second subframe need to be retransmitted or whether the first subframe, the second subframe, and the third subframe need to be retransmitted, enhancing feasibility of the solution.

Figure 9:
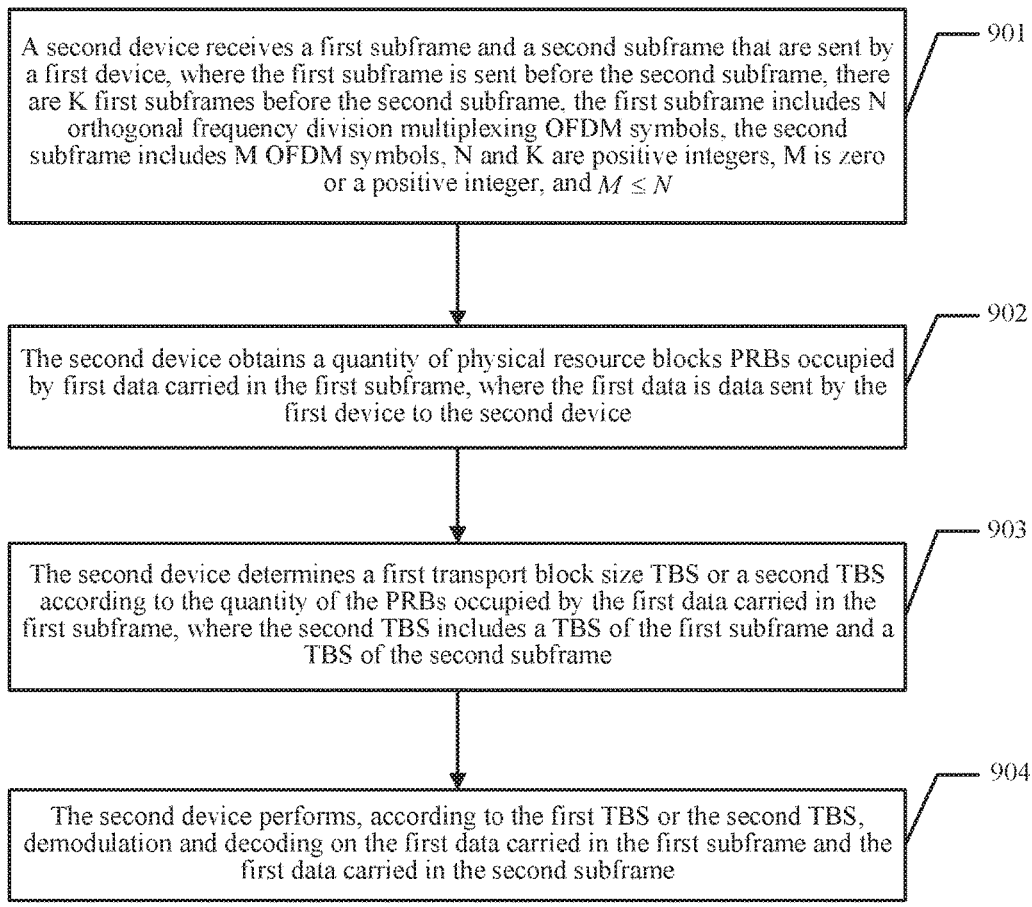
FIG. 9 is a schematic diagram of another embodiment of a data transmission method according to the embodiments of the present invention.

The foregoing method is described from the perspective of a first device, and the following describes the embodiments of the present invention from the perspective of a second device. Referring to FIG. 9, FIG. 9 is a schematic diagram of another embodiment of the data transmission method according to the embodiments of the present invention. The data transmission method may include the following steps.

901: A second device receives a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

In this embodiment, the second device receives the first subframe and the second subframe that are sent by the first device. The first subframe is sent before the second subframe, there are the K first subframes before the second subframe, the first subframe includes the N OFDM symbols, the second subframe includes the M OFDM symbols, N and K are positive integers, M is zero or a positive integer, and M≤N.

The N OFDM symbols include an OFDM symbol occupied by control information. The control information may be carried on a PDCCH or a PUCCH, and usually needs to occupy one to three OFDM symbols. The PDCCH and the PUCCH each are a set of physical resource elements, and respectively carry downlink and uplink control information. Information carried on the PDCCH and that carried on the PUCCH may be classified into common control information and dedicated control information because they are functioning in different scopes.

It may be understood that, a sum of the quantity of the OFDM symbols of the first subframe and the quantity of the OFDM symbols of the second subframe may be equal to, greater than, or less than a quantity of OFDM symbols of a complete subframe, which is not limited herein. A complete subframe may have 12 or 14 OFDM symbols. When an NCP is used for the subframes, a subframe includes 14 OFDM symbols. When an ECP is used for the subframes, a subframe includes 12 OFDM symbols.

902: The second device obtains a quantity of physical resource blocks PRBs occupied by first data carried in the first subframe, where the first data is data sent by the first device to the second device.

In this embodiment, the second device obtains the data of physical resource blocks PRBs occupied by the first data carried in the first subframe. The first data is the data sent by the first device to the second device. The quantity of the PRBs occupied by the first data carried in the first subframe and locations of the PRBs may be configured in advance, and are determined by the first device or the second device.

903: The second device determines a first transport block size TBS or a second TBS according to the quantity of the PRBs occupied by the first data carried in the first subframe, where the second TBS includes a TBS of the first subframe and a TBS of the second subframe.

In this embodiment, the second device determines the first TBS or the second TBS according to the data of the PRBs occupied by the first data carried in the first subframe. The first TBS is a TBS obtained by combining the first data carried in the first subframe and the first data carried in the second subframe as a whole, and the second TBS includes the TBS of the first subframe and the TBS of the second subframe.

904: The second device performs, according to the first TBS or the second TBS, demodulation and decoding on the first data carried in the first subframe and the first data carried in the second subframe.

In this embodiment, the second device jointly performs modulation and coding on the first data carried in the first subframe and the first data carried in the second subframe according to the first TBS, or the second device separately performs modulation and coding on the first data carried in the first subframe and the first data carried in the second subframe according to the second TBS. The first subframe and the second subframe are adjacent subframes.

It may be understood that, the first subframe is a subframe on an unlicensed carrier, a next subframe of the first subframe is the second subframe on the unlicensed carrier, that is, the second subframe may be an incomplete subframe, and the first subframe is a complete subframe. It should be noted that, the second subframe may alternatively be a blank subframe.

In this embodiment of the present invention, a second device side may receive a first subframe and a second subframe that are sent by a first device, determine a first TBS or a second TBS according to a quantity of PRBs occupied by first data carried in the first subframe, and perform, according to the first TBS or the second TBS, demodulation and decoding on the first data carried in first subframe and the first data carried in the second subframe. This resolves a problem in the prior art that demodulation and decoding and data transmission cannot be performed based on an incomplete subframe, and saves a channel resource and improves data transmission efficiency.

Optionally, based on the embodiment corresponding to FIG. 9, in a first optional embodiment of the data transmission method provided in the embodiments of the present invention, when K is equal to 1, the method may further include:

receiving, by the second device, the first subframe, the second subframe, and a third subframe that are sent by the first device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N;

determining, by the second device, a third TBS according to the quantity of the PRBs occupied by the first data carried in the first subframe, where the third TBS includes the TBS of the first subframe, the TBS of the second subframe, and a TBS of the third subframe; and performing, by the second device according to the third TBS, demodulation and decoding on the first data carried in the first subframe, the first data carried in the second subframe, and the first data carried in the third subframe, where the first subframe and the third subframe are adjacent subframes, and the first subframe and the second subframe are adjacent subframes.

In this embodiment, the second device receives the first subframe, the second subframe, and a third subframe that are sent by the first device. The third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N. The second device determines a third TBS according to the quantity of the PRBs occupied by the first data carried in the first subframe. The third TBS is a TBS obtained by combining the first data carried in the first subframe, the first data carried in the second subframe, and the first data carried in the third subframe as a whole. The second device jointly performs, according to the third TBS, demodulation and decoding on the first data carried in the first subframe, the first data carried in the second subframe, and the first data carried in the third subframe. The first subframe and the third subframe are adjacent subframes, and the first subframe and the second subframe are adjacent subframes.

It may be understood that the foregoing case occurs when K is equal to 1, that is, there are one complete subframe and two incomplete subframes on an unlicensed carrier.

Then, in this embodiment of the present invention, a solution is provided, that is, when there is one complete subframe and two incomplete subframes, when a first device sends a first subframe, a second subframe, and a third subframe to a second device, and the third subframe is sent before the first subframe and the second subframe is sent after the first subframe, modulation and coding may be jointly performed on the three subframes, enhancing practicability of the solution.

The following describes manners for calculating the first TBS, the second TBS, and the third TBS. It should be noted that, the following methods are described as examples, and it does not mean that the present invention is limited thereto.

1. First Manner for Calculating the First TBS

Optionally, based on the embodiment corresponding to FIG. 9, in a second optional embodiment of the data transmission method provided in the embodiments of the present invention, the determining, by the second device, a first TBS according to the quantity of the PRBs occupied by the first data carried in the first subframe may include:

determining, by the second device according to a first formula S=F(s×a), a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and determining, by the second device, the first transport block size TBS according to the quantity of the physical resource blocks PRBs occupied by both of the first data carried in the first subframe and the first data carried in the second subframe.

In this embodiment, the second device determines, according to a first formula S=F(s×a), a quantity S of PRBs occupied by both of the first data carried in the first subframe and the first data carried in the second subframe. s is the quantity of the PRBs occupied by the first data carried in the first subframe, the function F( ) is a round-up, round-down, or round-off function, and a is a real number not less than 1. In this case, a is $(M_1+M_2)/M_2$. $M_1$ is used to indicate a quantity of PRBs or symbols occupied by the first data and/or control information carried in the second subframe, and $M_2$ is used to indicate a quantity of PRBs or OFDM symbols occupied by the first data and/or control information carried in the first subframe.

The second device determines the first TBS according to the quantity of the PRBs occupied by both of the first data carried in the first subframe and the first data carried in the second subframe, and jointly performs, according to the first TBS, demodulation and decoding on the first data carried in the first subframe and the first data carried in the second subframe.

Optionally, based on the embodiment corresponding to FIG. 9, in a third optional embodiment of the data transmission method provided in the embodiments of the present invention, the determining, by the second device, a first TBS according to the quantity of the PRBs occupied by the first data carried in the first subframe may include:

determining, by the second device, a first transport block size TBS T according to a second formula T=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

In this embodiment, the second device determines a first TBS T according to a second formula T=F(t×a), and jointly performs, according to the first TBS, modulation and coding on the first data carried in the first subframe and the first data carried in the second subframe. t is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1. In this case, a is $(M_1+M_2)/M_2$. $M_1$ is used to indicate a quantity of PRBs or OFDM symbols occupied by the first data and/or control information carried in the second subframe, and $M_2$ is used to indicate a quantity of PRBs or OFDM symbols occupied by the first data and/or control information carried in the first subframe.

Optionally, based on the second optional embodiment or the third optional embodiment corresponding to FIG. 9, in a fourth optional embodiment of the data transmission method provided in the embodiments of the present invention, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

In this embodiment, a is a proportional factor $(M_1+M_2)/M_2$, and is a real number not less than 1. $M_1$ is used to indicate a quantity of physical resource blocks PRBs or orthogonal frequency division multiplexing OFDM symbols occupied by the first data and/or control information carried in the second subframe, and $M_2$ is used to indicate a quantity of PRBs or OFDM symbols occupied by the first data and/or control information carried in the first subframe. When a is equal to 1, the second subframe carries zero OFDM symbol, that is, the second subframe is a blank subframe.

With reference to the second optional implementation corresponding to FIG. 8, after the first formula or the second formula is used for calculation, the TBS of the first subframe and the TBS of the second subframe may be determined by querying Table 1. A query manner is the same as the manner described in the above-mentioned first implementation, and details are not described herein again.

Moreover, in this embodiment of the present invention, multiple manners for calculating a first TBS are provided, and two different formulas may be separately used for calculation. This enhances feasibility of the solution during actual application. In addition, provision of the two calculation formulas may further enhance flexibility of the solution.

1. Second Manner for Calculating the Second TBS

Optionally, based on the embodiment corresponding to FIG. 9, in a fifth optional embodiment of the data transmission method provided in the embodiments of the present invention, the determining, by the second device, a second TBS according to the quantity of the PRBs occupied by the first data carried in the first subframe may include:

determining, by the second device according to a third formula $L=F(l \times a)$, a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

determining, by the second device, the transport block size TBS of the second subframe according to the quantity of the physical resource blocks PRBs occupied by the first data carried in the second subframe; and determining, by the second device, the transport block size TBS of the first subframe according to the quantity of the physical resource blocks PRBs occupied by the first data carried in the first subframe.

In this embodiment, the second device separately performs, according to the second TBS, modulation and coding on the first data carried in the first subframe and the first data carried in the second subframe. In this case, the second device performs, according to the TBS of the first subframe, modulation and coding on the first data carried in the first subframe, and performs, according to the TBS of the second subframe, modulation and coding on the first data carried in the second subframe. The TBS of the first subframe is a TBS corresponding to the quantity of the PRBs occupied by the first data carried in the first subframe. The TBS of the second subframe is a TBS corresponding to a quantity of PRBs occupied by the first data carried in the second subframe.

The second device determines, according to a third formula $L=F(l \times a)$, the quantity L of the physical resource blocks PRBs occupied by the first data carried in the second subframe. l is the quantity of the physical resource blocks PRBs occupied by the first data carried in the first subframe, the function F( ) is a round-up, round-down, or round-off function, and a is a positive real number not greater than 1.

The second device determines the TBS of the second subframe according to the quantity of the PRBs occupied by the first data carried in the second subframe.

The second device determines the TBS of the first subframe according to the quantity of the PRBs occupied by the first data carried in the first subframe.

Optionally, based on the embodiment corresponding to FIG. 9, in a sixth optional embodiment of the data transmission method provided in the embodiments of the present invention, the determining, by the second device, a second TBS according to the quantity of the PRBs occupied by the first data carried in the first subframe may include:

determining, by the second device, a transport block size TBS P of the second subframe according to a fourth formula $P=F(p \times a)$, where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

In this embodiment, the second device determines, according to a fourth formula $P=F(p \times a)$, a TBS P of the second subframe. p is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1.

Optionally, based on the fifth optional embodiment or the sixth optional embodiment corresponding to FIG. 9, in a seventh optional embodiment of the data transmission method provided in the embodiments of the present invention, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

In this embodiment, in this case, a is $M_1/M_2$, and is a positive real number not greater than 1. $M_1$ is used to indicate a quantity of PRBs or OFDM symbols occupied by the first data and/or control information carried in the second subframe, and $M_2$ is used to indicate a quantity of PRBs or OFDM symbols occupied by the first data and/or control information carried in the first subframe. When a is equal to 1, the second subframe is a complete subframe.

With reference to the second optional implementation corresponding to FIG. 8, after the third formula or the fourth formula is used for calculation, the TBS of the first subframe and the TBS of the second subframe may be determined by querying Table 1. A query manner is the same as the manner described in the above-mentioned first implementation, and details are not described herein again.

Further, in this embodiment of the present invention, multiple manners for calculating a second TBS are provided, and two different formulas may be separately used for calculation. This enhances feasibility of the solution during actual application. In addition, provision of the two calculation formulas may further enhance flexibility of the solution.

1. Third Manner for Calculating the Third TBS

Optionally, based on the first optional embodiment corresponding to FIG. 9, in an eighth optional embodiment of the data transmission method provided in the embodiments of the present invention, the determining, by the second device, a third TBS according to the quantity of the PRBs occupied by the first data carried in the first subframe may include:

determining, by the second device according to a fifth formula $W=F(s\times a)$, a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function $F(\ )$ is a round-up, round-down, or round-off function, and a is a real number not less than 1; and determining, by the second device, the third transport block size TBS according to the quantity of the physical resource blocks PRBs occupied by all of the first data carried in the first subframe, the first data carried in the second subframe, and the first data carried in the third subframe.

In this embodiment, the third TBS is calculated by using the first data carried in the first subframe, the first data carried in the second subframe, and the first data carried in the third subframe as a whole, that is, the third TBS is a whole.

In this embodiment, the second device determines, according to a fifth formula $W=F(s\times a)$, a quantity W of physical resource blocks PRBs occupied by all of the first data carried in the first subframe, the first data carried in the second subframe, and the first data carried in the third subframe. s is the quantity of the physical resource blocks PRBs occupied by the first data carried in the first subframe, the function $F(\ )$ is a round-up, round-down, or round-off function, and a is a real number not less than 1. In this case, a is $(M_1+M_2+M_3)/M_2$. $M_1$ is used to indicate a quantity of PRBs or symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

The second device determines the third TBS according to the quantity of the PRBs occupied by all of the first data carried in the first subframe, the first data carried in the second subframe, and the first data carried in the third subframe, and jointly performs, according to the third TBS, demodulation and decoding on the first data carried in the first subframe, the first data carried in the second subframe, and the first data carried in the third subframe.

Optionally, based on the first optional embodiment corresponding to FIG. 9, in a ninth optional embodiment of the data transmission method provided in the embodiments of the present invention, the determining, by the second device, a third TBS according to the quantity of the PRBs occupied by the first data carried in the first subframe may include:

determining, by the second device, a third transport block size TBS V according to a sixth formula $V=F(t\times a)$, where t is the transport block size TBS of the first subframe, the transport block size TBS of the first subframe is a transport block size TBS corresponding to the quantity of the physical resource blocks PRBs occupied by the first data carried in the first subframe, the function $F(\ )$ is a round-up, round-down, or round-off function, and a is a real number not less than 1.

In this embodiment, the second device determines a third TBS V according to a sixth formula $V=F(t\times a)$, and jointly performs, according to the third TBS, modulation and coding on the first data carried in the first subframe, the first data carried in the second subframe, and the first data carried in the third subframe. t is the TBS of the first subframe, the TBS of the first subframe is a TBS corresponding to the quantity of the PRBs occupied by the first data carried in the first subframe, and the function $F(\ )$ is a round-up, round-down, or round-off function. In this case, a is $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe. a is a real number not less than 1. Optionally, based on the eighth optional embodiment or the ninth optional embodiment corresponding to FIG. 9, in a tenth optional embodiment of the data transmission method provided in the embodiments of the present invention, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

With reference to the second optional implementation corresponding to FIG. 8, after the first formula or the second formula is used for calculation, the TBS of the first subframe and the TBS of the second subframe may be determined by querying Table 1. A query manner is the same as the manner described in the above-mentioned first implementation, and details are not described herein again.

Furthermore, in this embodiment of the present invention, multiple manners for calculating a third TBS are provided, and the third TBS may be calculated in different scenarios according to an actual requirement. This enhances feasibility of the solution during actual application, and further enhances flexibility of the solution.

Optionally, based on any embodiment of the embodiment corresponding to FIG. 9 to the tenth optional embodiment corresponding to FIG. 9, in an eleventh optional embodiment of the data transmission method provided in the embodiments of the present invention, the determining, by the second device, a first TBS, a second TBS, or a third TBS according to the quantity of the physical resource blocks PRBs occupied by the first data carried in the first subframe may include:

creating, by the second device, a first list for the transport block size TBS of the first subframe and the transport block size TBS of the second subframe according to a, or creating, by the second device, a first list for the transport block size TBS of the first subframe and the first transport block size TBS according to a, or creating, by the second device, a first list for the transport block size TBS of the first subframe and the third transport block size TBS according to a, or creating, by the second device according to a, a first list for the quantity of the physical resource blocks PRBs occupied by the first data carried in the first subframe and the quantity of the physical resource blocks PRBs occupied by the first data carried in the second subframe, or creating, by the second device according to a, a first list for the quantity of the physical resource blocks PRBs occupied by the first data carried in the first subframe and the quantity of the physical resource blocks PRBs occupied by both of the first data carried in the first subframe and the first data carried in the second subframe, or creating, by the second device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and determining, by the second device, the first TBS, the second TBS, or the third TBS according to the first list.

In this embodiment, the first list may include at least one of a layer 1 TBS table, a layer 2 TBS table, a layer 3 TBS table, or a layer 4 TBS table in an LTE system, or a preset list defines a corresponding TBS when a PRB quantity exceeds 110, or a preset list defines a corresponding TBS when a TBS goes beyond a range of a prior-art list, ensuring that a corresponding first TBS can still be found in the preset list even though a calculated TBS goes beyond the prior-art list.

In this case, a is $(M_1+M_2)/M_2$, $M_1/M_2$, or $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

It may be understood that, the second device may further receive a sent by the first device. a is $(M_1+M_2)/M_2$, $M_1/M_2$, or $(M_1+M_2+M_3)/M_2$. $M_1$ is used to indicate a quantity of PRBs or OFDM symbols occupied by the first data and/or control information carried in the second subframe, $M_2$ is used to indicate a quantity of PRBs or OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe. Alternatively, $M_1$ and $M_2$ may be quantities of PRBs or sampling time intervals. Herein, $M_1$ and $M_2$ need to indicate only quantities of physical resources occupied by information that is sent to the second device in the first subframe and the second subframe. Alternatively, the first device and the second device may pre-define a proportional factor generation rule, the first device and the second device generate a proportional factor both according to the rule, and the first device does not need to send the proportional factor.

Still further, in this embodiment of the present invention, an appropriate grouping method is provided, so that the solution has better performance during actual application. In addition, because a solution is further proposed for a case of going beyond a list, flexibility of the solution is further enhanced.

Optionally, based on any corresponding embodiment of the embodiment corresponding to FIG. 9 to the eleventh optional embodiment corresponding to FIG. 9, in a twelfth optional embodiment of the data transmission method provided in the embodiments of the present invention, the method may further include:

sending, by the second device, feedback information to the first device, where the feedback information is used to indicate whether the second device correctly receives the first subframe and the second subframe, or the feedback information is used to indicate whether the second device correctly receives the first subframe, the second subframe, and the third subframe.

In this embodiment, after the first device sends the first subframe and the second subframe to the second device, the second device may send first feedback information to the first device. The first feedback information is used to indicate whether the second device correctly receives the first subframe and the second subframe. In this way, reception statuses of two subframes are indicated by using one piece of feedback information. Preferably, the first feedback information may be hybrid automatic repeat request (HARQ, Hybrid Automatic Repeat Request) information.

In addition, in this embodiment, after sending the first subframe, the second subframe, and the third subframe to the second device, the first device may receive first feedback information sent by the second device. The first feedback information is used to indicate whether the second device correctly receives the first subframe, the second subframe, and the third subframe. In this way, reception statuses of three subframes are indicated by using one piece of feedback information. Preferably, the first feedback information may be HARQ information.

It should be noted that, the first feedback information may be HARQ information or other information, which is not limited herein.

Yet further, in this embodiment, a second device may send first feedback information to a first device according to whether a first subframe and a second subframe are correctly received or whether a first subframe, a second subframe, and a third subframe are correctly received, so that the first device may learn whether the first subframe and the second subframe need to be retransmitted or whether the first subframe, the second subframe, and the third subframe need to be retransmitted, enhancing feasibility of the solution.

For better implementation of the data transmission method provided in the embodiments of the present invention, the embodiments of the present invention further provide a device based on the data transmission method. Nouns have meanings the same as those in the data transmission method. For specific implementation details, refer to descriptions in the method embodiments.

Figure 10:
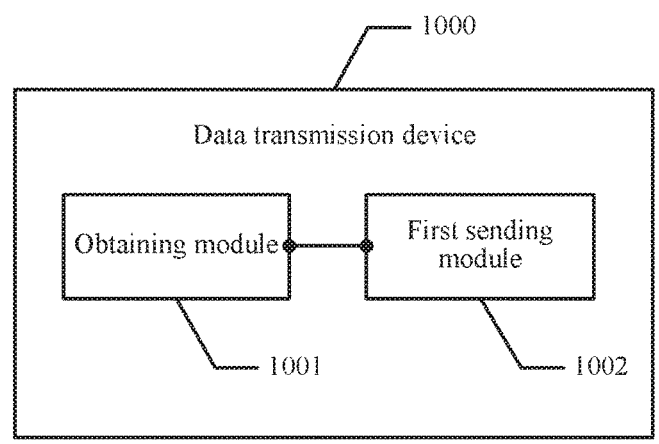
FIG. 10 is a schematic diagram of an embodiment of a data transmission device according to the embodiments of the present invention.

The foregoing describes the data transmission method in the embodiments of the present invention, and the following describes a data transmission device in the embodiments of the present invention. Referring to FIG. 10, an embodiment of the data transmission device in the embodiments of the present invention includes:

an obtaining module 1001, configured to obtain N orthogonal frequency division multiplexing OFDM symbols, where the N OFDM symbols are used to carry control information and data; and a first sending module 1002, configured to send a first subframe and a second subframe to a second device, where the first subframe or the second subframe carries the control information, the first subframe includes M OFDM symbols of the N OFDM symbols obtained by the obtaining module 1001, the second subframe includes K OFDM symbols of the N OFDM symbols obtained by the obtaining module 1001, N is a positive integer, M or K is zero or a positive integer, M is not greater than N, and K is not greater than N.

In this embodiment, the obtaining module 1001 obtains the N orthogonal frequency division multiplexing OFDM symbols. The N OFDM symbols are used to carry the control information and the data. The first sending module 1002, sends the first subframe and the second subframe to the second device. The first subframe or the second subframe carries the control information, the first subframe includes the M OFDM symbols of the N OFDM symbols obtained by the obtaining module, the second subframe includes the K OFDM symbols of the N OFDM symbols obtained by the obtaining module, N is a positive integer, M or K is zero or a positive integer, M is not greater than N, and K is not greater than N.

In this embodiment of the present invention, a first subframe at the start of a transmission and a second subframe at the end of the transmission are jointly scheduled by using control signaling, so that control signaling is saved in the first subframe and the second subframe. This can reduce control signaling load for the first subframe and the second subframe, enable a channel to transmit a larger proportion of valid data, and improve data transmission efficiency. In addition, subframes prepared by the first device may be normally sent in the first subframe and the second subframe, and are not discarded, which facilitates implementation of the first device.

Optionally, based on the embodiment corresponding to FIG. 10, in a first optional embodiment of the data transmission device provided in the embodiments of the present invention, the first subframe and the second subframe are subframes on an unlicensed carrier; or the first subframe or the second subframe is a subframe on a licensed carrier.

Then, in this embodiment of the present invention, a manner in which control information is carried on an unlicensed carrier or a licensed carrier is provided, to meet a requirement that the control information needs to be loaded at different locations in different cases. In addition, this can reduce space occupied in a subframe by the control information, enable a channel to transmit a larger proportion of valid data, improve data transmission efficiency, and enhance practicability and flexibility of the solution.

Optionally, based on the embodiment corresponding to FIG. 10, in a second optional embodiment of the data transmission device provided in the embodiments of the present invention, when M is not less than a first preset threshold, the first subframe carries the control information; or when M is less than the first preset threshold, the second subframe carries the control information; or when K is not less than a second preset threshold, the second subframe carries the control information; or when K is less than the second preset threshold, the first subframe carries the control information.

Moreover, in this embodiment of the present invention, two cases are set. One is: When a first subframe does not have sufficient OFDM symbols to load control information, the control information may be loaded in a second subframe. The other is: When the second subframe does not have sufficient OFDM symbols to load the control information, the control information may be loaded in the first subframe. For the cases, a first preset threshold or a second preset threshold is set on a first device side, and a specific threshold is set according to an actual situation. In this way, the solution has better operability during actual application, and flexibility of the first device in scheduling is enhanced.

Figure 11:
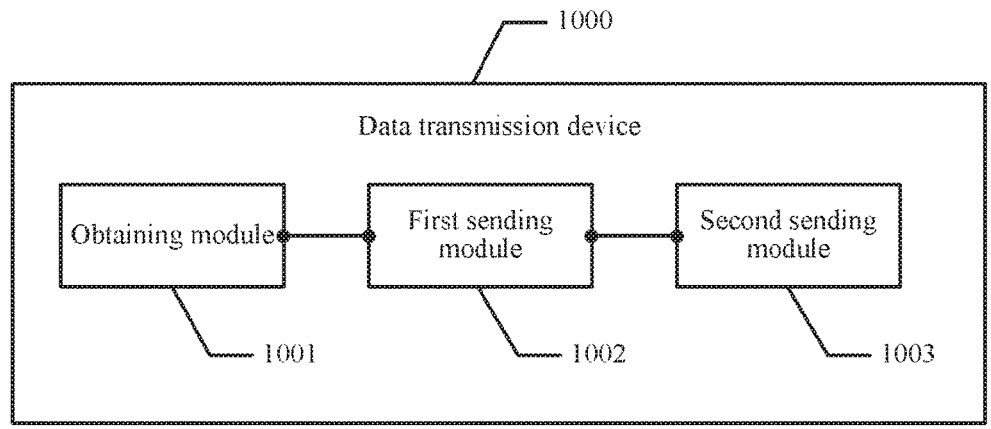
FIG. 11 is a schematic diagram of another embodiment of a data transmission device according to the embodiments of the present invention.
Figure 12:
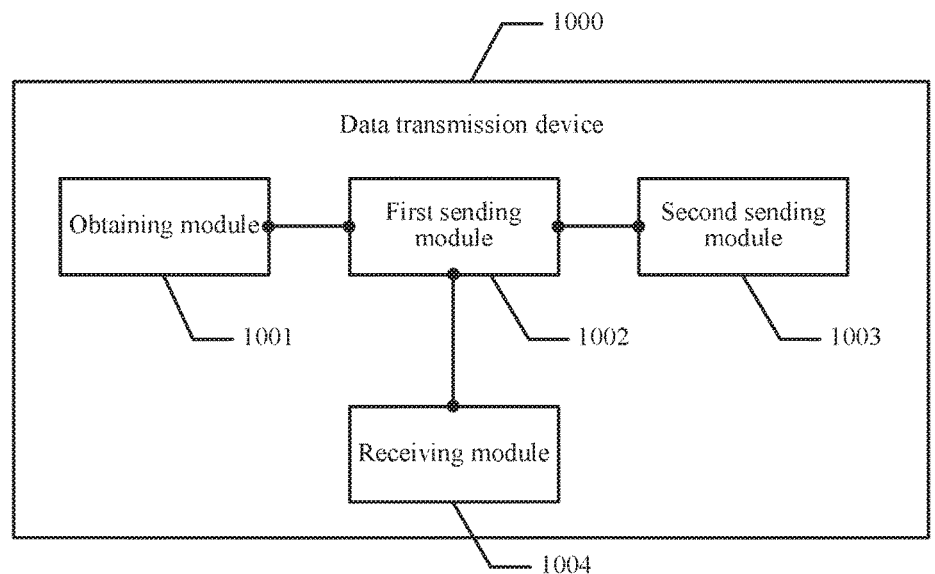
FIG. 12 is a schematic diagram of another embodiment of a data transmission device according to the embodiments of the present invention.

Referring to FIG. 11, another embodiment of the data transmission device in the embodiments of the present invention includes:

an obtaining module 1001, configured to obtain N orthogonal frequency division multiplexing OFDM symbols, where the N OFDM symbols are used to carry control information and data; and a first sending module 1002, configured to send a first subframe and a second subframe to a second device, where the first subframe or the second subframe carries the control information, the first subframe includes M OFDM symbols of the N OFDM symbols obtained by the obtaining module 1001, the second subframe includes K OFDM symbols of the N OFDM symbols obtained by the obtaining module 1001, N is a positive integer, M or K is zero or a positive integer, M is not greater than N, and K is not greater than N; and the data transmission device 1000 may further include:

a second sending module 1003, configured to send an identifier of an unlicensed carrier occupied by the first device to the second device, where the identifier is used to indicate a start location from which the first device occupies the unlicensed carrier and an occupation duration, or used to indicate a quantity of OFDM symbols included in the first subframe and/or the second subframe and locations of the OFDM symbols.

Further, in this embodiment, regardless of whether a second device has learned a duration of channel occupation by a transmit node, the second device may obtain a location and a symbol quantity of an incomplete subframe at the end. Therefore, different solutions may be used according to different situations during actual application, thereby enhancing flexibility of the solution.

Referring to FIG. 11, another embodiment of the data transmission device in the embodiments of the present invention includes:

an obtaining module 1001, configured to obtain N orthogonal frequency division multiplexing OFDM symbols, where the N OFDM symbols are used to carry control information and data;

a first sending module 1002, configured to send a first subframe and a second subframe to a second device, where the first subframe or the second subframe carries the control information, the first subframe includes M OFDM symbols of the N OFDM symbols obtained by the obtaining module 1001, the second subframe includes K OFDM symbols of the N OFDM symbols obtained by the obtaining module 1001, N is a positive integer, M or K is zero or a positive integer, M is not greater than N, and K is not greater than N; and a second sending module 1003, configured to send an identifier of an unlicensed carrier occupied by the first device to the second device, where the identifier is used to indicate a start location from which the first device occupies the unlicensed carrier and an occupation duration, or used to indicate a quantity of OFDM symbols included in the first subframe and/or the second subframe and locations of the OFDM symbols; and the data transmission device 1000 may further include: a receiving module 1004, configured to: after the first sending module 1002,sends the first subframe and the second subframe to the second device, receive feedback information sent by the second device, where the feedback information is used to indicate whether the first subframe and the second subframe are correctly received.

Furthermore, in this embodiment, a second device may send first feedback information to the first device according to whether a first subframe and a second subframe are correctly received, so that the first device may learn whether the first subframe and the second subframe need to be retransmitted, enhancing feasibility of the solution.

Figure 13:
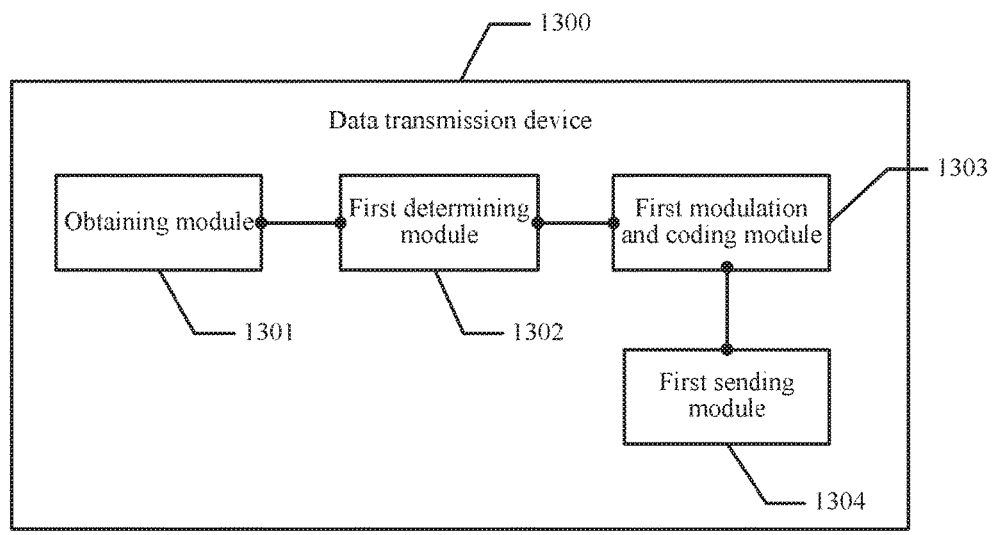
FIG. 13 is a schematic diagram of an embodiment of another data transmission device according to the embodiments of the present invention.

The foregoing embodiments describe a data transmission device, and the following describes another data transmission device. Referring to FIG. 13, FIG. 13 shows an embodiment of the another data transmission device in the embodiments of the present invention, including:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

In this embodiment, the obtaining module 1301 obtains the quantity of physical resource blocks PRBs occupied by the first data carried in the first subframe. The first data is the data to be sent by the first device to the second device. The first determining module 1302 determines the first transport block size TBS or the second TBS according to the quantity, obtained by the obtaining module 1301, of the PRBs occupied by the first data carried in the first subframe. The second TBS includes the TBS of the first subframe and the TBS of the second subframe. The first modulation and coding module 1303 performs, according to the first TBS or the second TBS that is determined by the first determining module 1302, modulation and coding on the first data carried in the first subframe and the first data carried in the second subframe. The first subframe and the second subframe are adjacent subframes. The first sending module 1304 sends the first subframe and the second subframe after the modulation and coding of the first modulation and coding module 1303 to the second device. The first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

In this embodiment of the present invention, the first device obtains a quantity of PRBs occupied by first data carried in a first subframe, determines a first TBS or a second TBS according to the quantity of the PRBs occupied by the first data carried in the first subframe, performs, according to the first TBS or the second TBS, modulation and coding on the first data carried in the first subframe and the first data carried in a second subframe, and sends the first subframe and the second subframe to a second device. This resolves a problem in the prior art that modulation and coding and data transmission cannot be performed based on an incomplete subframe, and saves a channel resource and improves data transmission efficiency.

Figure 14:
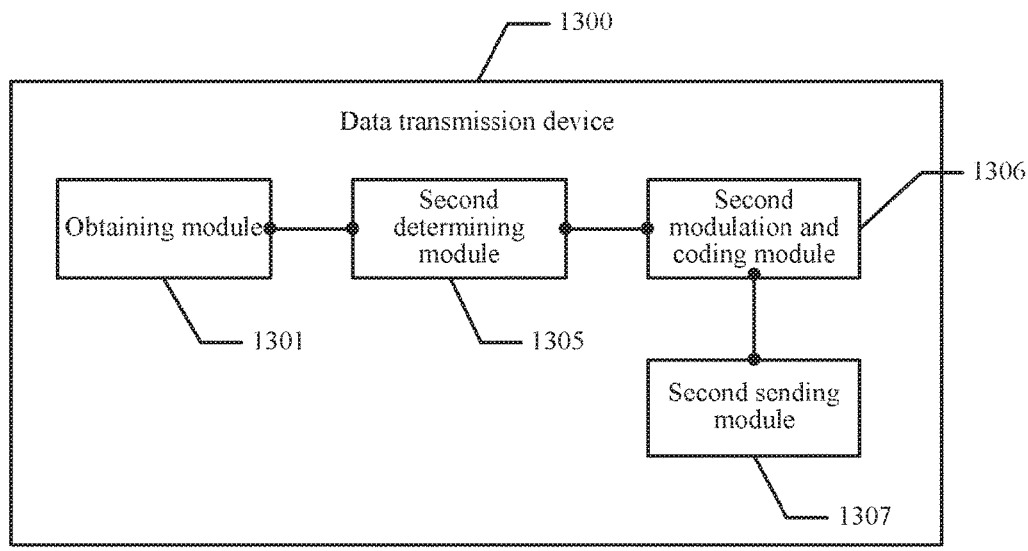
FIG. 14 is a schematic diagram of another embodiment of another data transmission device according to the embodiments of the present invention.

Referring to FIG. 14, when K is equal to 1, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a second determining module 1305, configured to determine a third TBS according to the quantity, obtained by the obtaining module 1301, of the PRBs occupied by the first data carried in the first subframe, where the third TBS includes a TBS of the first subframe, a TBS of a second subframe, and a TBS of the third subframe;

a second modulation and coding module 1306, configured to perform, according to the third TBS determined by the second determining module 1305, modulation and coding on the first data carried in the first subframe, the first data carried in the second subframe, and the first data carried in the third subframe, where the first subframe and the third subframe are adjacent subframes, and the first subframe and the second subframe are adjacent subframes; and a second sending module 1307, configured to send the first subframe, the second subframe, and the third subframe after the modulation and coding of the second modulation and coding module 1306 to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

Then, in this embodiment of the present invention, a solution is provided, that is, when a first device sends a first subframe, a second subframe, and a third subframe to a second device, when the third subframe is sent before the first subframe and the second subframe is sent after the first subframe, modulation and coding may be jointly performed on the three subframes, enhancing practicability of the solution.

Figure 15:
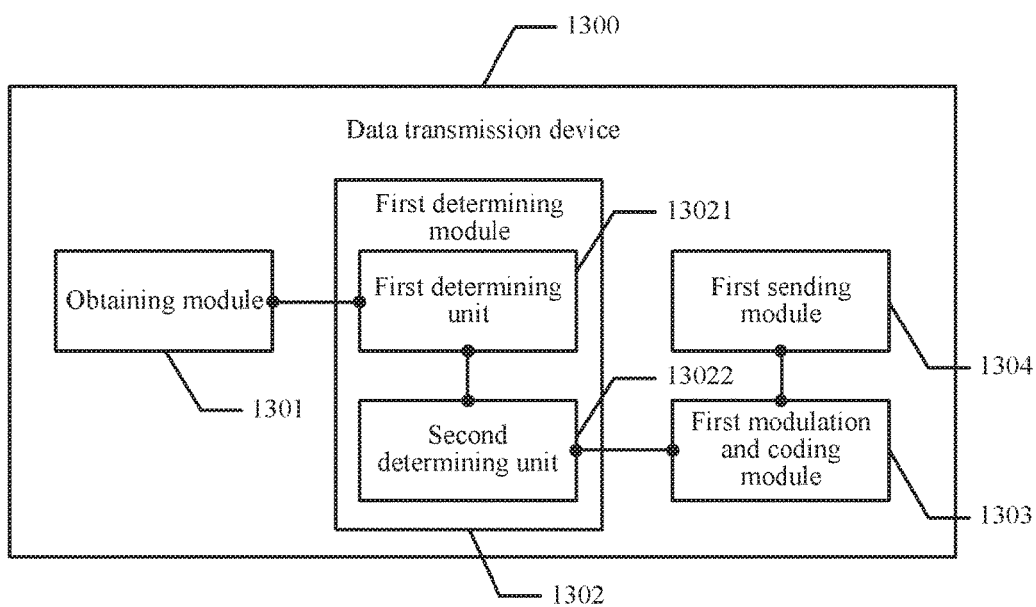
FIG. 15 is a schematic diagram of another embodiment of another data transmission device according to the embodiments of the present invention.

Referring to FIG. 15, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The first determining module 1302 includes:

a first determining unit 13021, configured to determine, according to a first formula S=F(s×a), a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and a second determining unit 13022, configured to determine the first transport block size TBS according to the quantity, determined by the first determining unit 13021, of the physical resource blocks PRBs occupied by both of the first data carried in the first subframe and the first data carried in the second subframe.

Figure 16:
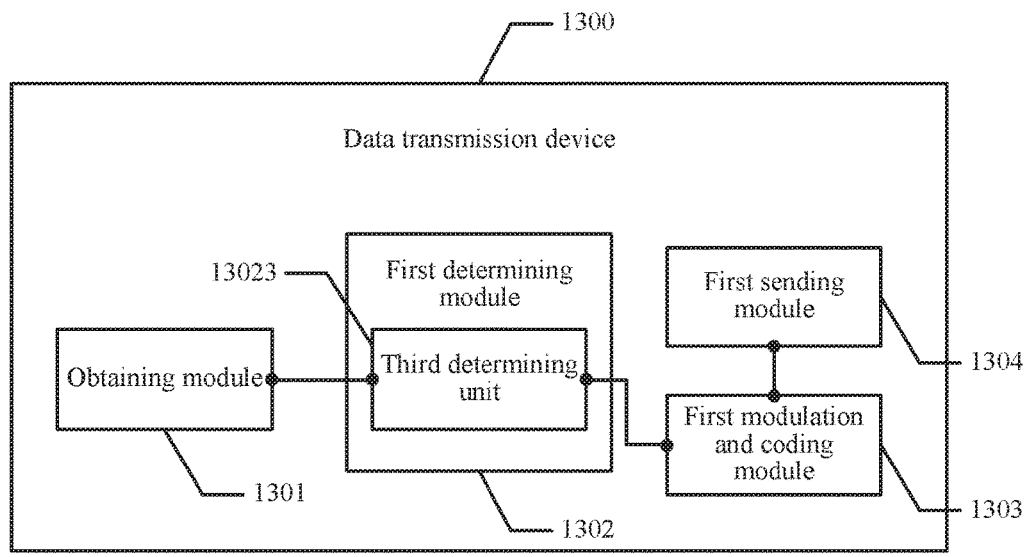
FIG. 16 is a schematic diagram of another embodiment of another data transmission device according to the embodiments of the present invention.

Referring to FIG. 16, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The first determining module 1302 includes:

a third determining unit 13023, configured to determine a first transport block size TBS T according to a second formula T=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 15 or the embodiment corresponding to FIG. 16, in a first optional embodiment of the first data transmission device provided in the embodiments of the present invention, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

Moreover, in this embodiment of the present invention, multiple manners for calculating a first TBS are provided, and two different formulas may be separately used for calculation. This enhances feasibility of the solution during actual application. In addition, provision of the two calculation formulas may further enhance flexibility of the solution.

Figure 17:
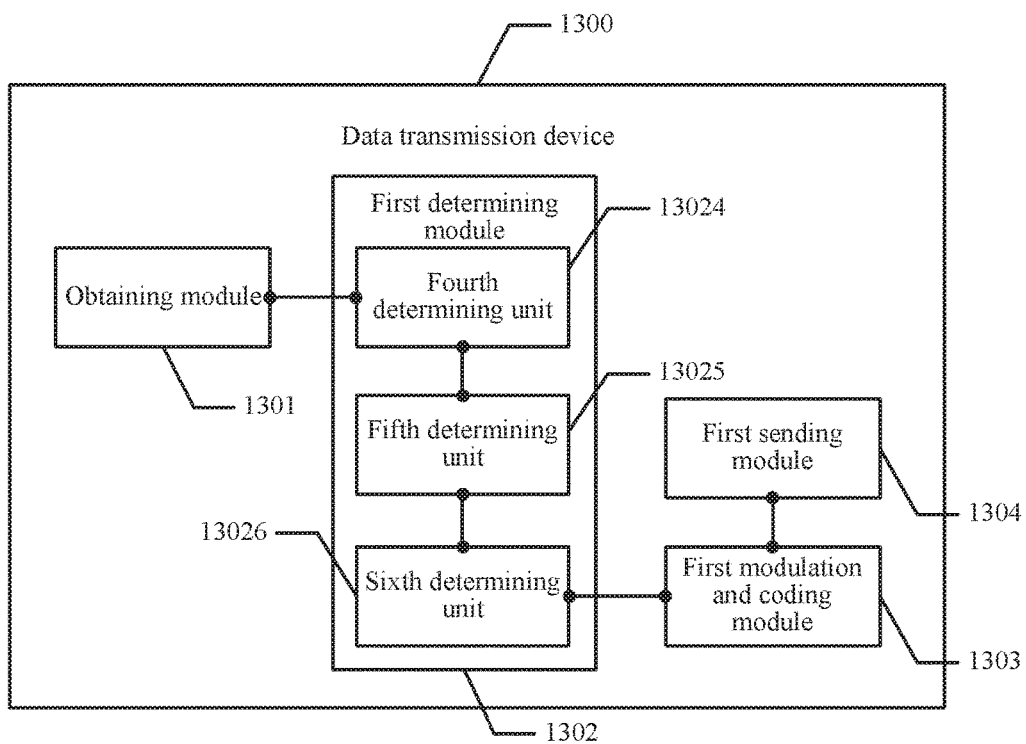
FIG. 17 is a schematic diagram of another embodiment of another data transmission device according to the embodiments of the present invention.

Referring to FIG. 17, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The first determining module 1302 includes:

a fourth determining unit 13024, configured to determine, according to a third formula L=F(l×a), a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

a fifth determining unit 13025, configured to determine the transport block size TBS of the second subframe according to the quantity, determined by the fourth determining unit 13024, of the physical resource blocks PRBs occupied by the first data carried in the second subframe; and a sixth determining unit 13026, configured to determine the transport block size TBS of the first subframe according to the quantity, determined by the fourth determining unit 13024, of the physical resource blocks PRBs occupied by the first data carried in the first subframe.

Figure 18:
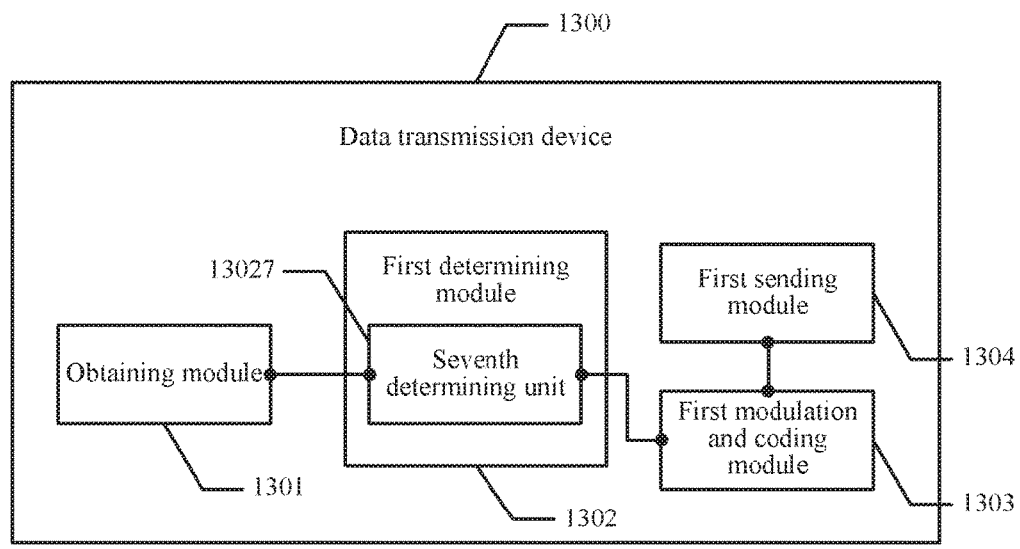
FIG. 18 is a schematic diagram of another embodiment of another data transmission device according to the embodiments of the present invention.

Referring to FIG. 18, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The first determining module 1302 includes:

a seventh determining unit, configured to determine a transport block size TBS P of the second subframe according to a fourth formula P=F(p×a), where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 17 or the embodiment corresponding to FIG. 18, in a second optional embodiment of the data transmission device in the embodiments of the present invention, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

Further, in this embodiment of the present invention, multiple manners for calculating a second TBS are provided, and two different formulas may be separately used for calculation. This enhances feasibility of the solution during actual application. In addition, provision of the two calculation formulas may further enhance flexibility of the solution.

Figure 19:
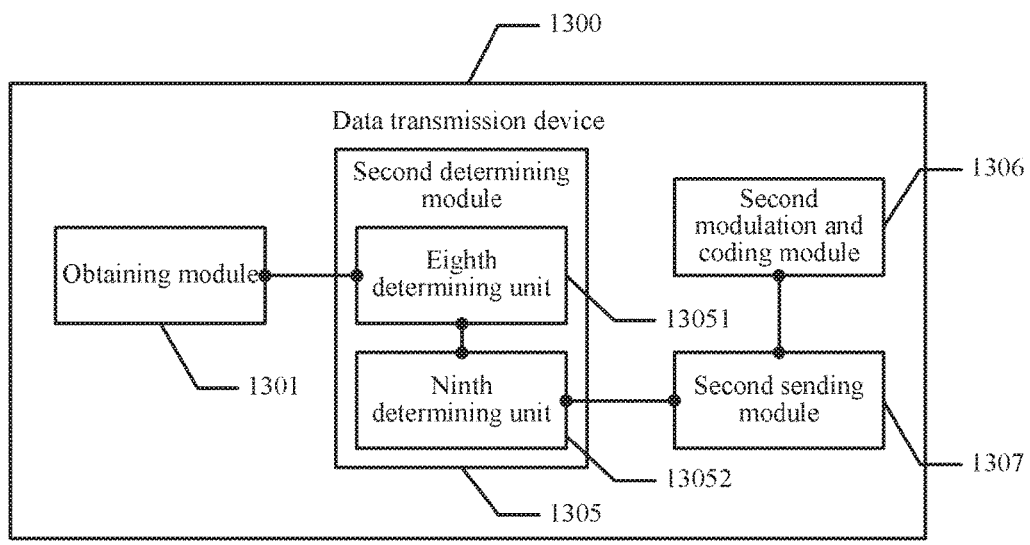
FIG. 19 is a schematic diagram of another embodiment of another data transmission device according to the embodiments of the present invention.

Referring to FIG. 19, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a second determining module 1305, configured to determine a third TBS according to the quantity, obtained by the obtaining module 1301, of the PRBs occupied by the first data carried in the first subframe, where the third TBS includes a TBS of the first subframe, a TBS of a second subframe, and a TBS of the third subframe;

a second modulation and coding module 1306, configured to perform, according to the third TBS determined by the second determining module 1305, modulation and coding on the first data carried in the first subframe, the first data carried in the second subframe, and the first data carried in the third subframe, where the first subframe and the third subframe are adjacent subframes, and the first subframe and the second subframe are adjacent subframes; and a second sending module 1307, configured to send the first subframe, the second subframe, and the third subframe after the modulation and coding of the second modulation and coding module 1306 to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

The second determining module 1305 includes:

an eighth determining unit 13051, configured to determine, according to a fifth formula W=F(s×a), a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and a ninth determining unit 13052, configured to determine the third transport block size TBS according to the quantity, determined by the eighth determining unit 13051, of the physical resource blocks PRBs occupied by all of the first data carried in the first subframe, the first data carried in the second subframe, and the first data carried in the third subframe.

Figure 20:
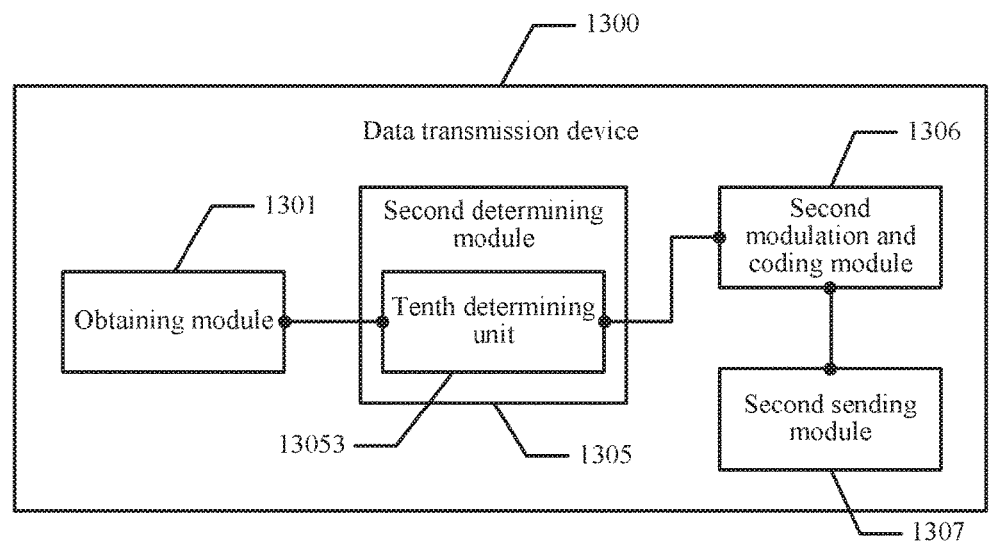
FIG. 20 is a schematic diagram of another embodiment of another data transmission device according to the embodiments of the present invention.

Referring to FIG. 20, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a second determining module 1305, configured to determine a third TBS according to the quantity, obtained by the obtaining module 1301, of the PRBs occupied by the first data carried in the first subframe, where the third TBS includes a TBS of the first subframe, a TBS of a second subframe, and a TBS of the third subframe;

a second modulation and coding module 1306, configured to perform, according to the third TBS determined by the second determining module 1305, modulation and coding on the first data carried in the first subframe, the first data carried in the second subframe, and the first data carried in the third subframe, where the first subframe and the third subframe are adjacent subframes, and the first subframe and the second subframe are adjacent subframes; and a second sending module 1307, configured to send the first subframe, the second subframe, and the third subframe after the modulation and coding of the second modulation and coding module 1306 to the second device, where the third subframe is sent before the first subframe, the second subframe is sent after the first subframe, the first subframe includes N OFDM symbols, the second subframe includes M OFDM symbols, the third subframe includes P OFDM symbols, N is a positive integer, M and P are zero or positive integers, P≤N, and M≤N.

The second determining module 1305 includes:

a tenth determining unit 13053, configured to determine a third transport block size TBS V according to a sixth formula V=F(t×a), where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 19 or the embodiment corresponding to FIG. 20, in a third optional embodiment of the first data transmission device provided in the embodiments of the present invention, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

Furthermore, in this embodiment of the present invention, multiple manners for calculating a third TBS are provided, and the third TBS may be calculated in different scenarios according to an actual requirement. This enhances feasibility of the solution during actual application, and further enhances flexibility of the solution.

Figure 21:
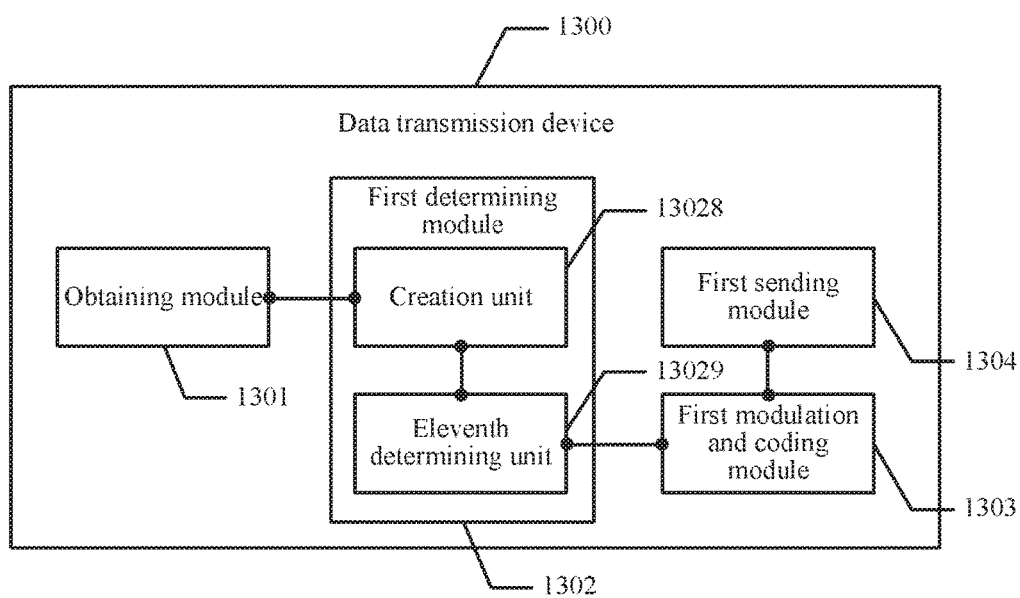
FIG. 21 is a schematic diagram of another embodiment of another data transmission device according to the embodiments of the present invention.

Referring to FIG. 21, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes; and a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The first determining module 1302 includes:

a creation unit 13028, configured to create a first list for the transport block size TBS of the first subframe and the transport block size TBS of the second subframe according to a, or create a first list for the transport block size TBS of the first subframe and the first transport block size TBS according to a, or create a first list for the transport block size TBS of the first subframe and the third transport block size TBS according to a, or create, according to a, a first list for the quantity of the physical resource blocks PRBs occupied by the first data carried in the first subframe and the quantity of the physical resource blocks PRBs occupied by the first data carried in the second subframe, or create, according to a, a first list for the quantity of the physical resource blocks PRBs occupied by the first data carried in the first subframe and the quantity of the physical resource blocks PRBs occupied by both of the first data carried in the first subframe and the first data carried in the second subframe, or create, according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and an eleventh determining unit 13029, configured to determine the first TBS, the second TBS, or the third TBS according to the first list created by the creation unit 13028.

Still further, in this embodiment of the present invention, an appropriate grouping method is provided, so that the solution has better performance during actual application. In addition, because a solution is further proposed for a case of going beyond a list, flexibility of the solution is further enhanced.

Figure 22:
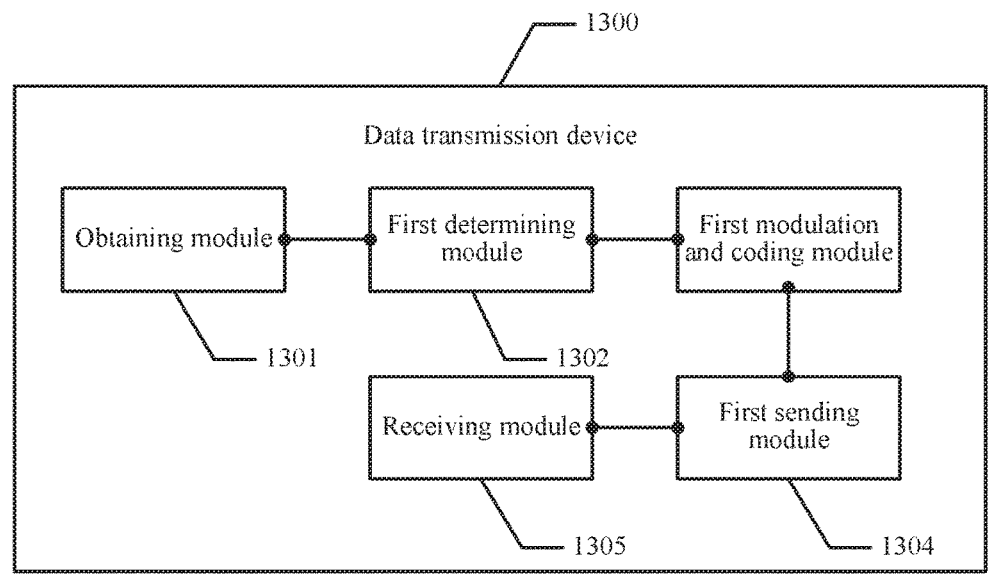
FIG. 22 is a schematic diagram of another embodiment of another data transmission device according to the embodiments of the present invention.

Referring to FIG. 22, another embodiment of the another data transmission device in the embodiments of the present invention includes:

an obtaining module 1301, configured to obtain a quantity of physical resource blocks PRBs occupied by first data carried in a first subframe, where the first data is data to be sent by the first device to a second device;

a first determining module 1302, configured to determine a first transport block size TBS or a second TBS according to the quantity, obtained by the obtaining module 1301, of the PRBs occupied by the first data carried in the first subframe, where the second TBS includes a TBS of the first subframe and a TBS of a second subframe;

a first modulation and coding module 1303, configured to perform, according to the first TBS or the second TBS that is determined by the first determining module 1302, modulation and coding on the first data carried in the first subframe and the first data carried in the second subframe, where the first subframe and the second subframe are adjacent subframes;

a first sending module 1304, configured to send the first subframe and the second subframe after the modulation and coding of the first modulation and coding module 1303 to the second device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N; and a receiving module 1305, configured to: after the first sending module 1304 sends the first subframe and the second subframe after the modulation and coding of the first modulation and coding module to the second device, receive feedback information sent by the second device, where the feedback information is used to indicate whether the second device correctly receives the first subframe and the second subframe, or the feedback information is used to indicate whether the second device correctly receives the first subframe, the second subframe, and the third subframe.

Yet further, in this embodiment, a second device may send first feedback information to the first device according to whether a first subframe and a second subframe are correctly received or whether a first subframe, a second subframe, and a third subframe are correctly received, so that the first device may learn whether the first subframe and the second subframe need to be retransmitted or whether the first subframe, the second subframe, and the third subframe need to be retransmitted, enhancing feasibility of the solution.

Figure 23:
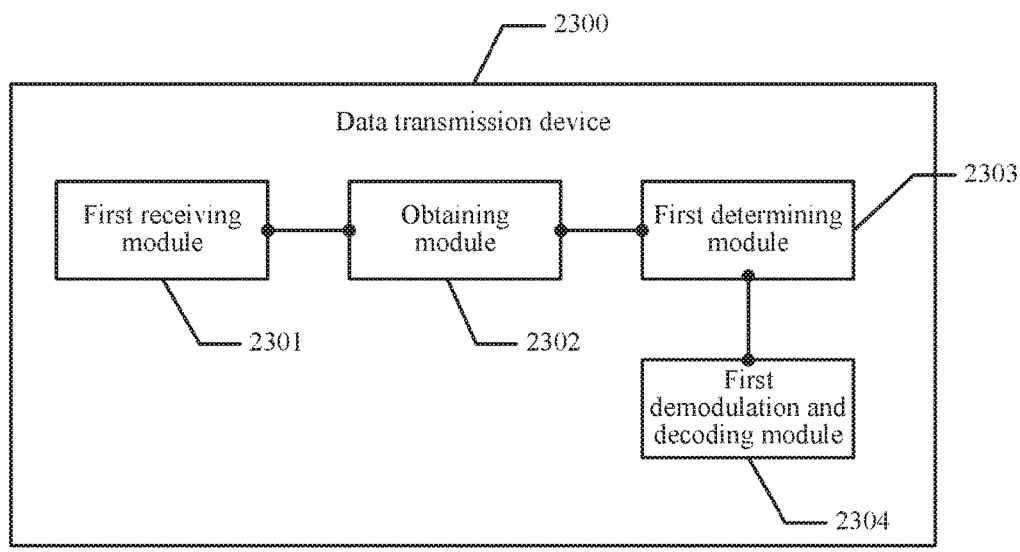
FIG. 23 is a schematic diagram of an embodiment of another data transmission device according to the embodiments of the present invention.

The foregoing device is described from the perspective of a first device, and the following describes the embodiments of the present invention from the perspective of a second device. Referring to FIG. 23, FIG. 23 shows an embodiment of another data transmission device in the embodiments of the present invention, including:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

In this embodiment, the first receiving module 2301 receives the first subframe and the second subframe that are sent by the first device. The first subframe is sent before the second subframe, there are the K first subframes before the second subframe, the first subframe includes the N orthogonal frequency division multiplexing OFDM symbols, the second subframe includes the M OFDM symbols, N and K are positive integers, M is zero or a positive integer, and M≤N; The obtaining module 2302 obtains the quantity of physical resource blocks PRBs occupied by first data carried in the first subframe received by the first receiving module 2301. The first data is the data sent by the first device to the second device. The first determining module 2303 determines the first transport block size TBS or the second TBS according to the quantity, obtained by the obtaining module 2302, of the PRBs occupied by the first data carried in the first subframe. The second TBS includes the TBS of the first subframe and the TBS of the second subframe. The first demodulation and decoding module 2304 performs, according to the first TBS or the second TBS that is determined by the first determining module 2303, demodulation and decoding on the first data carried in the first subframe and the first data carried in the second subframe.

In this embodiment of the present invention, a second device side may receive a first subframe and a second subframe that are sent by a first device, determine a first TBS or a second TBS according to a quantity of PRBs occupied by first data carried in the first subframe, and perform, according to the first TBS or the second TBS, demodulation and decoding on the first data carried in first subframe and the first data carried in the second subframe. This resolves a problem in the prior art that demodulation and decoding and data transmission cannot be performed based on an incomplete subframe, and saves a channel resource and improves data transmission efficiency.

Figure 24:
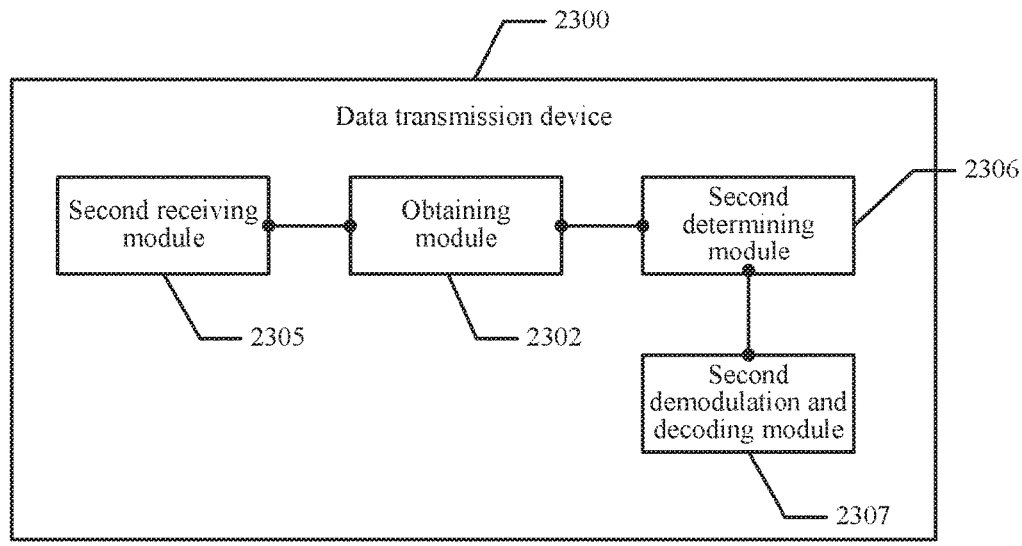
FIG. 24 is a schematic diagram of another embodiment of another data transmission device according to the embodiments of the present invention.

Referring to FIG. 24, when K is equal to 1, another embodiment of the another data transmission device in the embodiments of the present invention includes:

a second receiving module 2305, configured to receive a first subframe, a second subframe, and a third subframe that are sent by a first device, where the third subframe is sent before the first subframe, the second subframe is sent after the first subframe, the first subframe and the third subframe are adjacent subframes, the first subframe and the second subframe are adjacent subframes, the first subframe includes N OFDM symbols, the second subframe includes M OFDM symbols, the third subframe includes P OFDM symbols, N is a positive integer, M and P are zero or positive integers, P≤N, and M≤N;

an obtaining module 2302, configured to obtain a quantity of physical resource blocks PRBs occupied by first data carried in the first subframe received by the second receiving module 2305, where the first data is data sent by the first device to the second device;

a second determining module 2306, configured to determine a third TBS according to the quantity, obtained by the obtaining module 2302, of the PRBs occupied by the first data carried in the first subframe, where the third TBS includes a TBS of the first subframe, a TBS of the second subframe, and a TBS of the third subframe; and a second demodulation and decoding module 2307, configured to perform, according to the third TBS determined by the second determining module 2306, demodulation and decoding on the first data carried in the first subframe, the first data carried in the second subframe, and the first data carried in the third subframe.

Then, in this embodiment of the present invention, a solution is provided, that is, when there is one complete subframe and two incomplete subframes, when a first device sends a first subframe, a second subframe, and a third subframe to the second device, and the third subframe is sent before the first subframe and the second subframe is sent after the first subframe, modulation and coding may be jointly performed on the three subframes, enhancing practicability of the solution.

Figure 25:
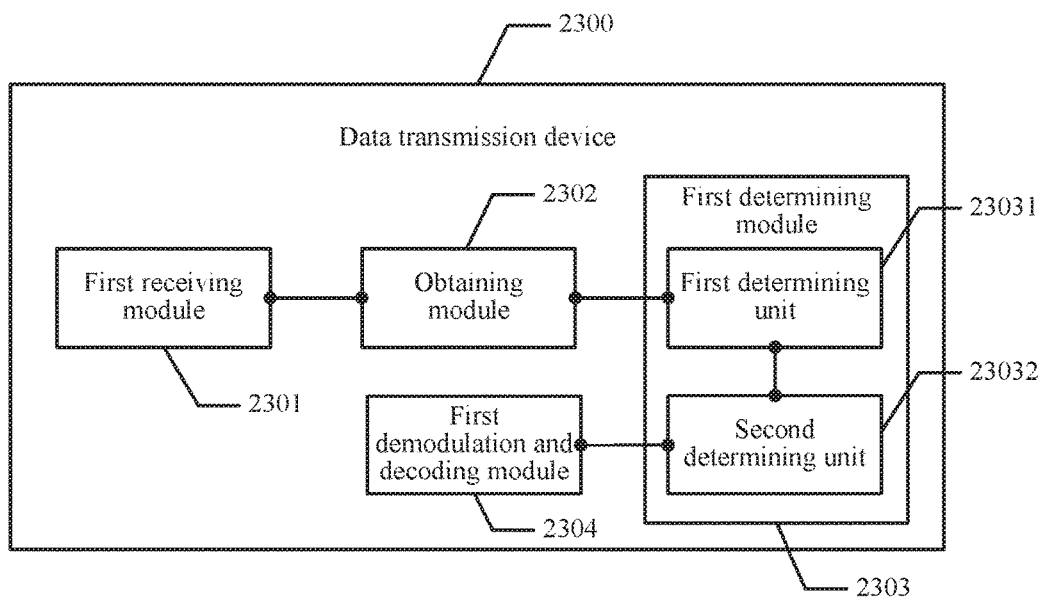
FIG. 25 is a schematic diagram of another embodiment of another data transmission device according to the embodiments of the present invention.

Referring to FIG. 25, FIG. 25 shows an embodiment of the another data transmission device in the embodiments of the present invention, including:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

The first determining module 2303 includes:

a first determining unit 23031, configured to determine, according to a first formula $S=F(s\times a)$, a quantity S of physical resource blocks PRBs occupied by both of the first data carried in the first subframe and the first data carried in the second subframe, where s is the quantity of the physical resource blocks PRBs occupied by the first data carried in the first subframe, the function F( ) is a round-up, round-down, or round-off function, and a is a real number not less than 1; and a second determining unit 23032, configured to determine the first transport block size TBS according to the quantity, determined by the first determining unit 23031, of the physical resource blocks PRBs occupied by both of the first data carried in the first subframe and the first data carried in the second subframe.

Figure 26:
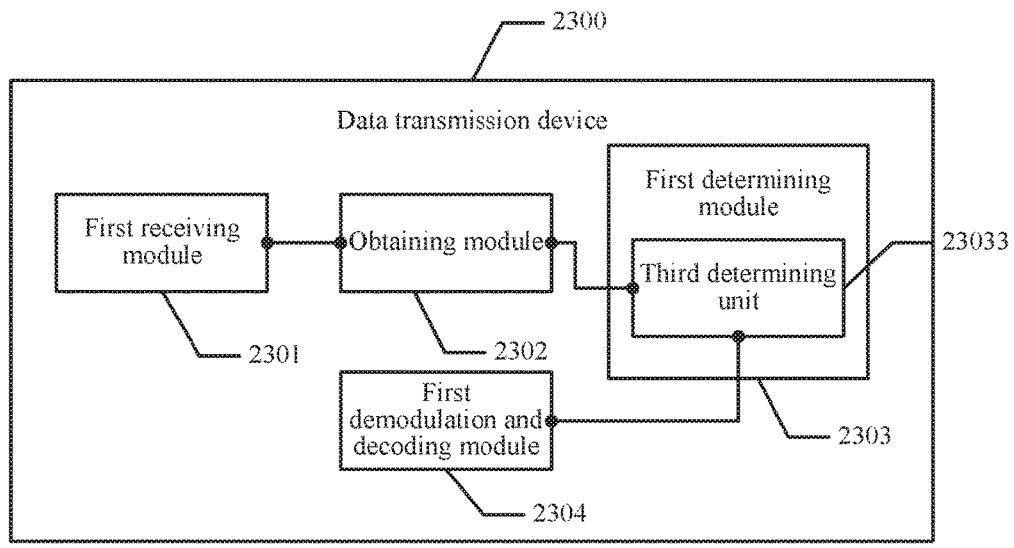
FIG. 26 is a schematic diagram of another embodiment of another data transmission device according to the embodiments of the present invention.

Referring to FIG. 26, another embodiment of the another data transmission device in the embodiments of the present invention includes:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

The first determining module 2303 includes:

a third determining unit 23033, configured to determine a first transport block size TBS T according to a second formula $T=F(t\times a)$, where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 25 or the embodiment corresponding to FIG. 26, in a first optional embodiment of the second data transmission device provided in the embodiments of the present invention, a is $(M_1+M_2)/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

Moreover, in this embodiment of the present invention, multiple manners for calculating a first TBS are provided, and two different formulas may be separately used for calculation. This enhances feasibility of the solution during actual application. In addition, provision of the two calculation formulas may further enhance flexibility of the solution.

Figure 27:
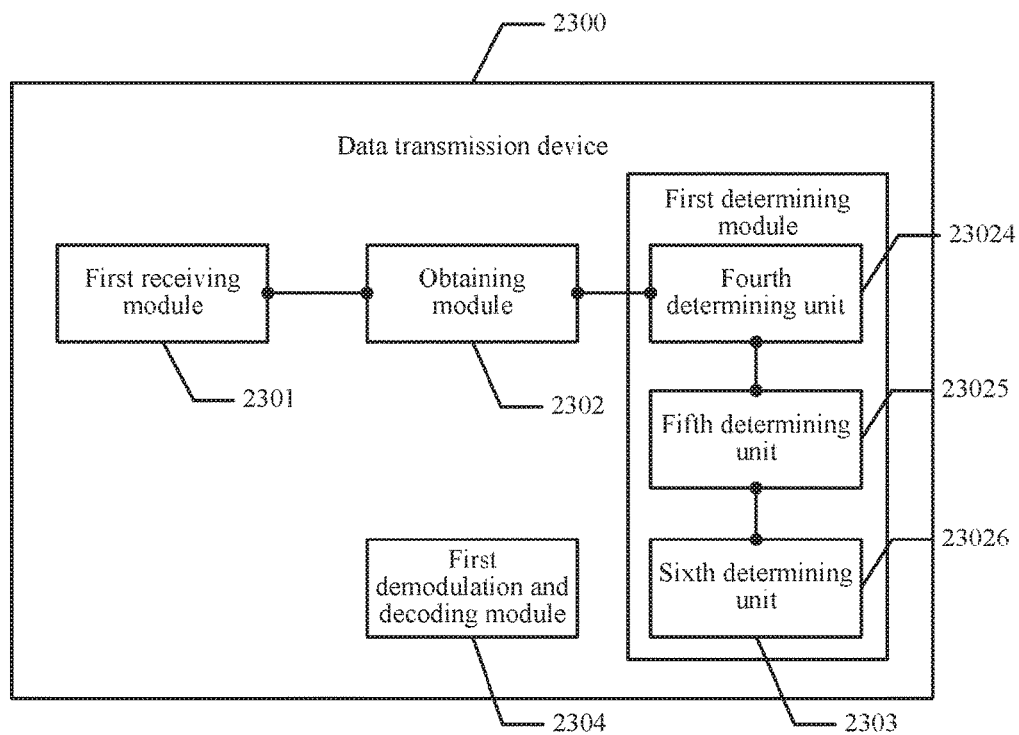
FIG. 27 is a schematic diagram of another embodiment of another data transmission device according to the embodiments of the present invention.

Referring to FIG. 27, another embodiment of the another data transmission device in the embodiments of the present invention includes:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

The first determining module 2303 includes:

a fourth determining unit 23034, configured to determine, according to a third formula $L=F(l \times a)$, a quantity L of physical resource blocks PRBs occupied by the first data carried in the second subframe, where l is the quantity of the physical resource blocks PRBs occupied by the first data carried in the first subframe, the function F( ) is a round-up, round-down, or round-off function, and a is a positive real number not greater than 1;

a fifth determining unit 23035, configured to determine the transport block size TBS of the second subframe according to the quantity, determined by the fourth determining unit 23034, of the physical resource blocks PRBs occupied by the first data carried in the second subframe; and a sixth determining unit 23036, configured to determine the transport block size TBS of the first subframe according to the quantity, determined by the fourth determining unit 23034, of the physical resource blocks PRBs occupied by the first data carried in the first subframe.

Figure 28:
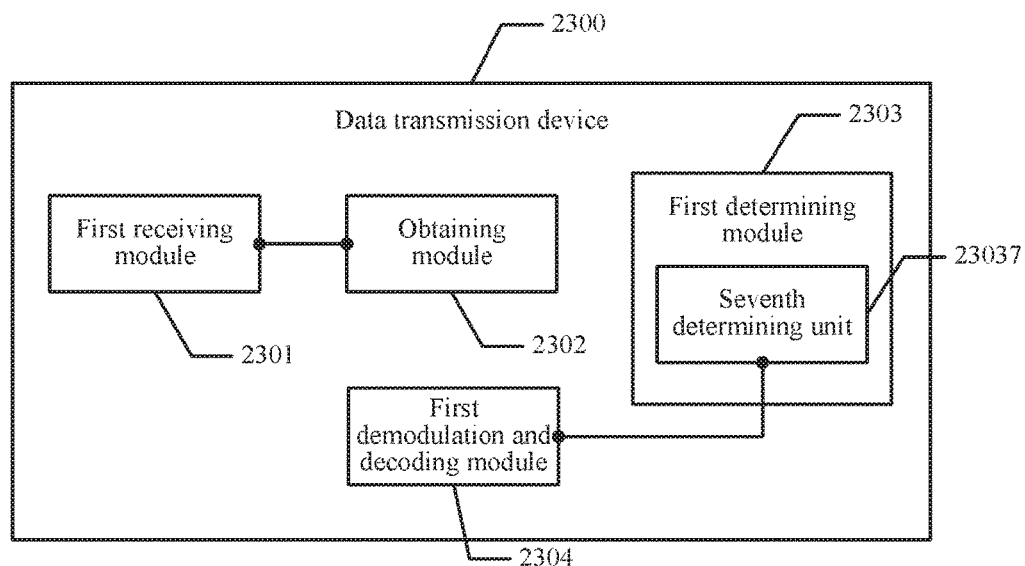
FIG. 28 is a schematic diagram of another embodiment of another data transmission device according to the embodiments of the present invention.

Referring to FIG. 28, another embodiment of the another data transmission device in the embodiments of the present invention includes:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

The first determining module 2303 includes:

a seventh determining unit 2307, configured to determine a transport block size TBS P of the second subframe according to a fourth formula $P=F(p \times a)$, where p is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 27 or the embodiment corresponding to FIG. 28, in a second optional embodiment of the data transmission device in the embodiments of the present invention, a is $M_1/M_2$, $M_1$ is used to indicate a quantity of physical resource blocks PRBs or orthogonal frequency division multiplexing OFDM symbols occupied by the first data and/or control information carried in the second subframe, and $M_2$ is used to indicate a quantity of physical resource blocks PRBs or orthogonal frequency division multiplexing OFDM symbols occupied by the first data and/or control information carried in the first subframe.

Further, in this embodiment of the present invention, multiple manners for calculating a second TBS are provided, and two different formulas may be separately used for calculation. This enhances feasibility of the solution during actual application. In addition, provision of the two calculation formulas may further enhance flexibility of the solution.

Figure 29:
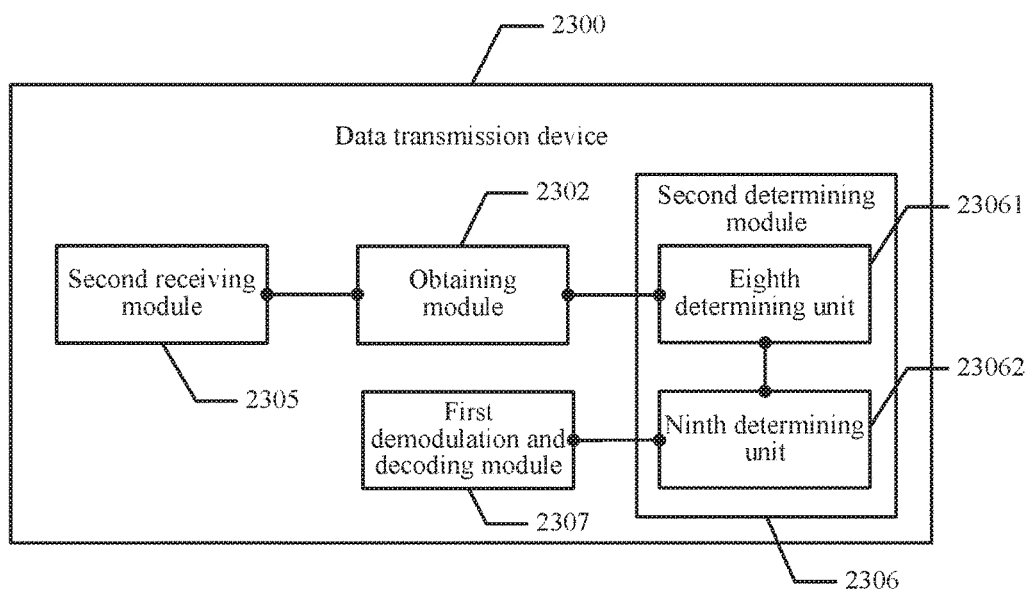
FIG. 29 is a schematic diagram of another embodiment of another data transmission device according to the embodiments of the present invention.

Referring to FIG. 29, when K is equal to 1, another embodiment of the another data transmission device in the embodiments of the present invention includes:

a second receiving module 2305, configured to receive a first subframe, a second subframe, and a third subframe that are sent by a first device, where the third subframe is sent before the first subframe, the second subframe is sent after the first subframe, the first subframe and the third subframe are adjacent subframes, the first subframe and the second subframe are adjacent subframes, the first subframe includes N OFDM symbols, the second subframe includes M OFDM symbols, the third subframe includes P OFDM symbols, N is a positive integer, M and P are zero or positive integers, P≤N, and M≤N;

an obtaining module 2302, configured to obtain a quantity of physical resource blocks PRBs occupied by first data carried in the first subframe received by the second receiving module 2305, where the first data is data sent by the first device to the second device;

a second determining module 2306, configured to determine a third TBS according to the quantity, obtained by the obtaining module 2302, of the PRBs occupied by the first data carried in the first subframe, where the third TBS includes a TBS of the first subframe, a TBS of the second subframe, and a TBS of the third subframe; and a second demodulation and decoding module 2307, configured to perform, according to the third TBS determined by the second determining module 2306, demodulation and decoding on the first data carried in the first subframe, the first data carried in the second subframe, and the first data carried in the third subframe.

The second determining module 2306 includes:

an eighth determining unit 23061, configured to determine, according to a fifth formula $W=F(s \times a)$, a quantity W of physical resource blocks PRBs occupied by all of the first data carried in the first subframe, the first data carried in the second subframe, and the first data carried in the third subframe, where s is the quantity of the physical resource blocks PRBs occupied by the first data carried in the first subframe, the function F( ) is a round-up, round-down, or round-off function, and a is a real number not less than 1; and a ninth determining unit 23062, configured to determine the third transport block size TBS according to the quantity, determined by the eighth determining unit 23061, of the physical resource blocks PRBs occupied by all of the first data carried in the first subframe, the first data carried in the second subframe, and the first data carried in the third subframe.

Figure 30:
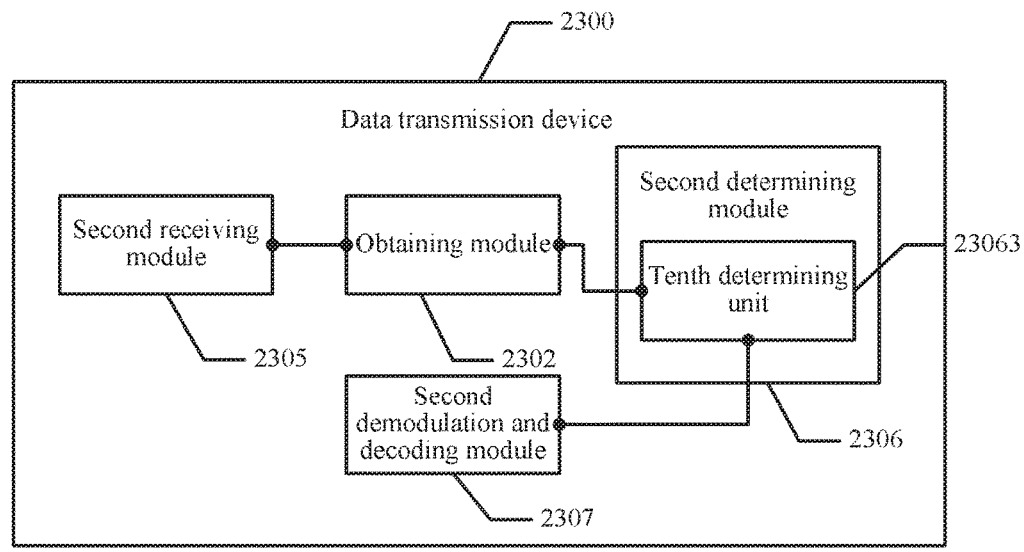
FIG. 30 is a schematic diagram of another embodiment of another data transmission device according to the embodiments of the present invention.

Referring to FIG. 30, another embodiment of the another data transmission device in the embodiments of the present invention includes:

a second receiving module 2305, configured to receive a first subframe, a second subframe, and a third subframe that are sent by a first device, where the third subframe is sent before the first subframe, the second subframe is sent after the first subframe, the first subframe and the third subframe are adjacent subframes, the first subframe and the second subframe are adjacent subframes, the first subframe includes N OFDM symbols, the second subframe includes M OFDM symbols, the third subframe includes P OFDM symbols, N is a positive integer, M and P are zero or positive integers, $P \leq N$, and $M \leq N$;

an obtaining module 2302, configured to obtain a quantity of physical resource blocks PRBs occupied by first data carried in the first subframe received by the second receiving module 2305, where the first data is data sent by the first device to the second device;

a second determining module 2306, configured to determine a third TBS according to the quantity, obtained by the obtaining module 2302, of the PRBs occupied by the first data carried in the first subframe, where the third TBS includes a TBS of the first subframe, a TBS of the second subframe, and a TBS of the third subframe; and a second demodulation and decoding module 2307, configured to perform, according to the third TBS determined by the second determining module 2306, demodulation and decoding on the first data carried in the first subframe, the first data carried in the second subframe, and the first data carried in the third subframe.

The second determining module 2306 includes:

a tenth determining unit 23063, configured to determine a third transport block size TBS V according to a sixth formula $V=F(t \times a)$, where t is the transport block size TBS of the first subframe, the transport block size TBS of the first subframe is a transport block size TBS corresponding to the quantity of the physical resource blocks PRBs occupied by the first data carried in the first subframe, the function F( ) is a round-up, round-down, or round-off function, and a is a real number not less than 1.

Optionally, based on the embodiment corresponding to FIG. 29 or the embodiment corresponding to FIG. 30, in a third optional embodiment of the second data transmission device provided in the embodiments of the present invention, a is $(M_1+M_2+M_3)/M_2$, $M_1$ is used to indicate a quantity of physical resource blocks PRBs or orthogonal frequency division multiplexing OFDM symbols occupied by the first data and/or control information carried in the second subframe, $M_2$ is used to indicate a quantity of physical resource blocks PRBs or orthogonal frequency division multiplexing OFDM symbols occupied by the first data and/or control information carried in the first subframe, and $M_3$ is used to indicate a quantity of physical resource blocks PRBs or orthogonal frequency division multiplexing OFDM symbols occupied by the first data and/or control information carried in the third subframe.

Furthermore, in this embodiment of the present invention, multiple manners for calculating a third TBS are provided, and the third TBS may be calculated in different scenarios according to an actual requirement. This enhances feasibility of the solution during actual application, and further enhances flexibility of the solution.

Figure 31:
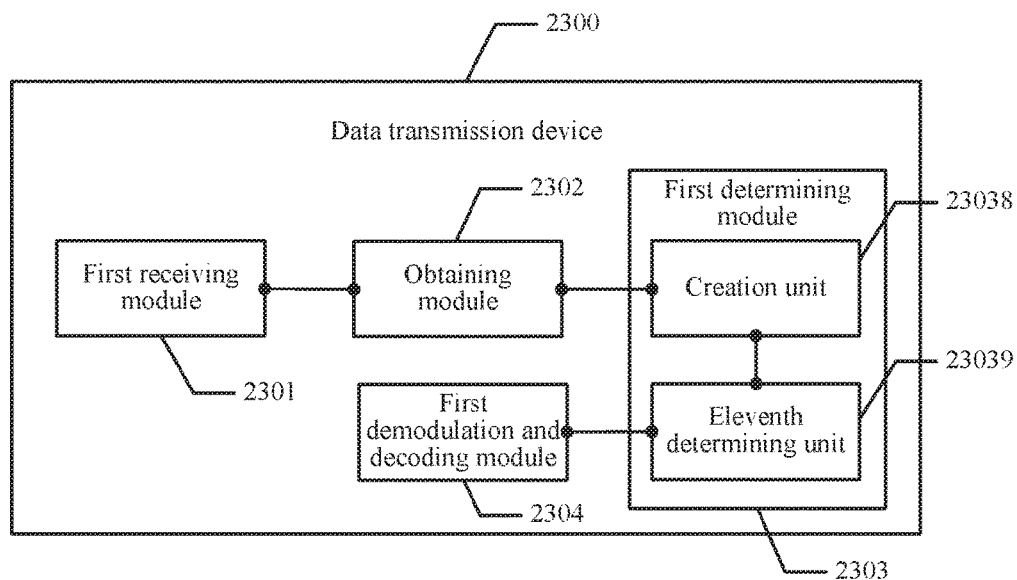
FIG. 31 is a schematic diagram of another embodiment of another data transmission device according to the embodiments of the present invention.

Referring to FIG. 31, another embodiment of the another data transmission device in the embodiments of the present invention includes:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and $M \leq N$;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe; and a first demodulation and decoding module 2304, configured to perform, according to the first TBS or the second TBS that is determined by the first determining module 2303, demodulation and decoding on the first data carried in the first subframe and the first data carried in the second subframe.

The first determining module 2303 includes:

a creation unit 23038, configured to create a first list for the transport block size TBS of the first subframe and the transport block size TBS of the second subframe according to a, or create a first list for the transport block size TBS of the first subframe and the first transport block size TBS according to a, or create a first list for the transport block size TBS of the first subframe and the third transport block size TBS according to a, or create, according to a, a first list for the quantity of the physical resource blocks PRBs occupied by the first data carried in the first subframe and the quantity of the physical resource blocks PRBs occupied by the first data carried in the second subframe, or create, according to a, a first list for the quantity of the physical resource blocks PRBs occupied by the first data carried in the first subframe and the quantity of the physical resource blocks PRBs occupied by both of the first data carried in the first subframe and the first data carried in the second subframe, or create, by the second device according to a, a first list for the quantity of the physical resource blocks PRBs occupied by the first data carried in the first subframe and the quantity of the physical resource blocks PRBs occupied by all of the first data carried in the first subframe, the first data carried in the second subframe, and the first data carried in the third subframe; and an eleventh determining unit 23039, configured to determine the first TBS, the second TBS, or the third TBS according to the first list created by the creation unit 23038.

Still further, in this embodiment of the present invention, an appropriate grouping method is provided, so that the solution has better performance during actual application. In addition, because a solution is further proposed for a case of going beyond a list, flexibility of the solution is further enhanced.

Figure 32:
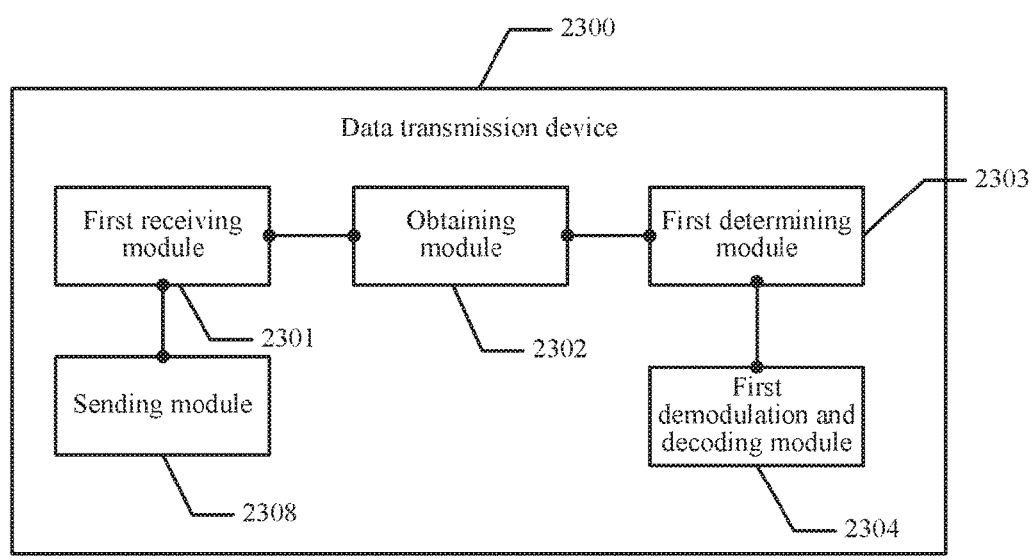
FIG. 32 is a schematic diagram of another embodiment of another data transmission device according to the embodiments of the present invention.

Referring to FIG. 32, another embodiment of the another data transmission device in the embodiments of the present invention includes:

a first receiving module 2301, configured to receive a first subframe and a second subframe that are sent by a first device, where the first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N;

an obtaining module 2302, configured to obtain a quantity of physical resource blocks PRBs occupied by first data carried in the first subframe received by the first receiving module 2301, where the first data is data sent by the first device to the second device;

a first determining module 2303, configured to determine a first transport block size TBS or a second TBS according to the quantity, obtained by the obtaining module 2302, of the PRBs occupied by the first data carried in the first subframe, where the second TBS includes a TBS of the first subframe and a TBS of the second subframe;

a first demodulation and decoding module 2304, configured to perform, according to the first TBS or the second TBS that is determined by the first determining module 2303, demodulation and decoding on the first data carried in the first subframe and the first data carried in the second subframe; and a sending module 2308, configured to: after the first receiving module 2301 receives the first subframe and the second subframe that are sent by the first device, send, by the second device, feedback information to the first device, where the feedback information is used to indicate whether the second device correctly receives the first subframe and the second subframe, or the feedback information is used to indicate whether the second device correctly receives the first subframe, the second subframe, and the third subframe.

Yet further, in this embodiment, the second device may send first feedback information to a first device according to whether a first subframe and a second subframe are correctly received or whether a first subframe, a second subframe, and a third subframe are correctly received, so that the first device may learn whether the first subframe and the second subframe need to be retransmitted or whether the first subframe, the second subframe, and the third subframe need to be retransmitted, enhancing feasibility of the solution.

Figure 33:
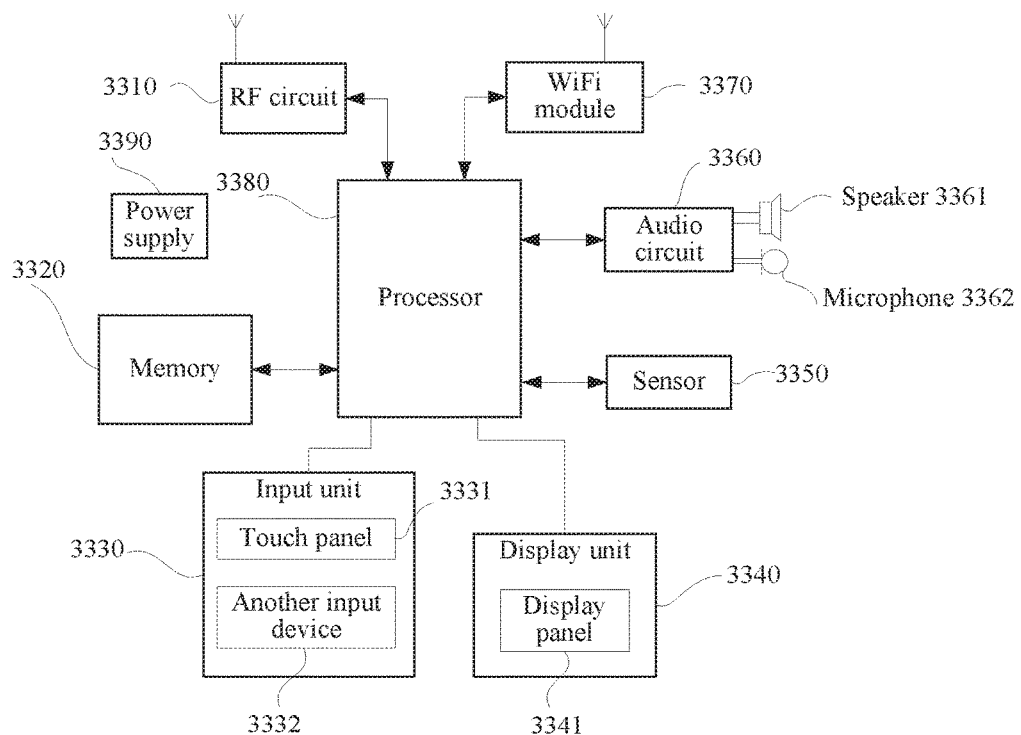
FIG. 33 is a schematic structural diagram of a user terminal according to an embodiment of the present invention.

An embodiment of the present invention further provides a user terminal device. As shown in FIG. 33, for ease of description, only parts related to the embodiments of the present invention are shown. For specific technical details that are not disclosed, refer to the method part of the embodiments of the present invention. The terminal maybe any terminal device, including a mobile phone, a table computer, a PDA (Personal Digital Assistant, personal digital assistant), a POS (Point of Sales, point of sales), and an in-vehicle computer. For example, the terminal is a mobile phone:

FIG. 33 is a block diagram of a structure of apart of a mobile phone related to a terminal according to an embodiment of the present invention. Referring to FIG. 33, the mobile phone includes: components such as a radio frequency (Radio Frequency, RF) circuit 3310, a memory 3320, an input unit 3330, a display unit 3340, a sensor 3350, an audio circuit 3360, a wireless fidelity (wireless fidelity, WiFi) module 3370, a processor 3380, and a power supply 3390. A person skilled in the art may understand that the structure of the mobile phone shown in FIG. 33 does not constitute a limitation to the mobile phone, and the mobile phone may include more or fewer components than those shown in the figure, or some components may be combined, or a different component deployment may be used.

The following specifically describes the components of the mobile phone with reference to FIG. 33.

The RF circuit 3310 may be configured to receive and send signals during an information receiving and sending process or a call process. Particularly, the RF circuit 1110 receives downlink information from a base station, then delivers the downlink information to the processor 3380 for processing, and sends related uplink data to the base station. Usually, the RF circuit 3310 includes, but is not limited to, an antenna, at least one amplifier, a transceiver, a coupler, a low noise amplifier (Low Noise Amplifier, LNA), a duplexer, and the like. In addition, the RF circuit 3310 may also communicate with a network and another device by means of wireless communication. The wireless communication may use any communications standard or protocol, which includes, but is not limited to, Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

The memory 3320 may be configured to store a software program and module. The processor 3380 runs the software program and module stored in the memory 3320, to implement various functional applications and data processing of the mobile phone. The memory 3320 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 3320 may include a high speed random access memory, and may also include a non-volatile memory such as at least one magnetic disk storage device, a flash memory, or another volatile solid-state storage device.

The input unit 3330 may be configured to receive input digit or character information, and generate keyboard signal input related to a user setting and function control of the mobile phone. Specifically, the input unit 3330 may include a touch panel 3331 and another input device 3332. The touch panel 3331, which may also be referred to as a touchscreen, may collect a touch operation of a user on or near the touch panel (such as an operation of a user on or near the touch panel 3331 by using any suitable object or accessory such as a finger or a stylus), and drive a corresponding connection apparatus according to a preset program. Optionally, the touch panel 3331 may include two parts: a touch detection device and a touch controller. The touch detection device detects a touch position of the user, detects a signal generated by the touch operation, and transfers the signal to the touch controller. The touch controller receives the touch information from the touch detection device, converts the touch information into touch point coordinates, and sends the touch point coordinates to the processor 3380. Moreover, the touch controller can receive and execute a command sent from the processor 980. In addition, the touch panel 3331 may be a resistive, capacitive, infrared, or surface sound wave type touch panel. In addition to the touch panel 3331, the input unit 3330 may further include the another input device 3332. Specifically, the another input device 3332 may include, but is not limited to: one or more of a physical keyboard, a functional key (such as a volume control key or a switch key), a trackball, a mouse, and a joystick.

Optionally, the input unit 3330 may be configured to receive a first subframe and a second subframe that are sent by a first device. The first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The display unit 3340 may be configured to display information input by the user or information provided for the user, and various menus of the mobile phone. The display unit 3340 may include a display panel 3341. Optionally, the display panel 3341 may be configured by using a liquid crystal display (Liquid Crystal Display, LCD), an organic light-emitting diode (Organic Light-Emitting Diode, OLED), or the like. Further, the touch panel 3331 may cover the display panel 3341. After detecting a touch operation on or near the touch panel 3331, the touch panel 431 transfers the touch operation to the processor 3380, so as to determine a type of a touch event. The processor 3380 then provides a corresponding visual output on the display panel 441 according to the type of the touch event. Although, in FIG. 33, the touch panel 3331 and the display panel 3341 are used as two separate parts to implement input and output functions of the mobile phone, in some embodiments, the touch panel 3331 and the display panel 3341 may be integrated to implement the input and output functions of the mobile phone.

The mobile phone may further include at least one sensor 3350 such as an optical sensor, a motion sensor, and other sensors. Specifically, the optical sensor may include an ambient light sensor and a proximity sensor. The ambient light sensor may adjust luminance of the display panel 3341 according to brightness of ambient light. The proximity sensor may switch off the display panel 3341 and/or backlight when the mobile phone is moved to the ear. As one type of motion sensor, an acceleration sensor may detect magnitude of accelerations in various directions (generally on three axes), may detect magnitude and a direction of the gravity when static, and may be configured to identify an application of the mobile phone gesture (such as switchover between horizontal and vertical screens, a related game, and gesture calibration of a magnetometer), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

An audio circuit 3360, a speaker 3361, and a microphone 3362 may provide an audio interface between the user and the mobile phone. The audio circuit 3360 may convert received audio data into an electric signal and transmit the electric signal to the speaker 3361. The speaker 3361 converts the electric signal into a sound signal for output. On the other hand, the microphone 3362 converts a collected sound signal into an electric signal. The audio circuit 3360 receives the electric signal and converts the electric signal into audio data, and outputs the audio data to the processor 3380 for processing. Then, the processor 580 sends the audio data to, for example, another apparatus by using the RF circuit 3310, or outputs the audio data to the memory 3320 for further processing.

Optionally, the output device may include the audio circuit 3360, the speaker 3361, and the microphone 3362. The output device is configured to send the first subframe and the second subframe to the second device. The first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

Optionally, the output device may be further configured to send a first subframe and a second subframe to the second device. The first subframe or the second subframe carries the control information, the first subframe includes M OFDM symbols of the N OFDM symbols, the second subframe includes K OFDM symbols of the N OFDM symbols, N is a positive integer, M or K is zero or a positive integer, M is not greater than N, and K is not greater than N.

WiFi belongs to a short distance wireless transmission technology. The mobile phone may help, by using the WiFi module 3370, the user to receive and send emails, browse a web page, access streaming media, and so on, which provides wireless broadband Internet access for the user. Although FIG. 33 shows the WiFi module 3370, it maybe understood that the WiFi module is not a necessary component of the mobile phone, and when required, the WiFi module maybe omitted as long as the scope of the essence of the present invention is not changed.

The processor 3380 is the control center of the mobile phone, and is connected to various parts of the mobile phone by using various interfaces and lines. By running or executing the software program and/or module stored in the memory 3320, and invoking data stored in the memory 3320, the processor 3380 performs various functions and data processing of the mobile phone, thereby performing overall monitoring on the mobile phone. Optionally, the processor 3380 may include one or more processing units. Preferably, the processor 3380 maybe integrated with an application processor and a modem processor. The application processor mainly processes an operating system, a user interface, an application program, and the like. The modem processor mainly processes wireless communication. It may be understood that the foregoing modem processor may not be integrated into the processor 3380.

Optionally, the processor 3380 may be configured to obtain the N orthogonal frequency division multiplexing OFDM symbols. The N OFDM symbols are used to carry the control information and data.

Optionally, the processor 3380 may be further configured to obtain a quantity of physical resource blocks PRBs occupied by first data carried in the first subframe, where the first data is data to be sent by the first device to the second device;

determine a first transport block size TBS or a second TBS according to the quantity of the PRBs occupied by the first data carried in the first subframe, where the second TBS includes a TBS of the first subframe and a TBS of the second subframe; and perform, according to the first TBS or the second TBS, modulation and coding on the first data carried in the first subframe and the first data carried in the second subframe, where the first subframe and the second subframe are adjacent subframes.

Optionally, the processor 3380 may be further configured to obtain a quantity of physical resource blocks PRBs occupied by first data carried in the first subframe, where the first data is data to be sent by the first device to the second device;

determine a first transport block size TBS or a second TBS according to the quantity of the PRBs occupied by the first data carried in the first subframe, where the second TBS includes a TBS of the first subframe and a TBS of the second subframe; and perform, according to the first TBS or the second TBS, demodulation and decoding on the first data carried in the first subframe and the first data carried in the second subframe.

The mobile phone further includes the power supply 3390 (such as a battery) for supplying power to the components. Preferably, the power supply may be logically connected to the processor 3380 by using a power management system, thereby implementing functions such as charging, discharging and power consumption management by using the power management system.

Although not shown in the figure, the mobile phone may further include a camera, a Bluetooth module, and the like, which are not further described herein.

Figure 34:
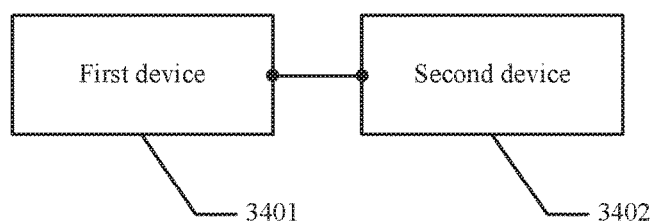
FIG. 34 is a schematic diagram of an embodiment of a data transmission system according to the embodiments of the present invention.

The following describes a data transmission system in an embodiment of the present invention. Referring to FIG. 34, the data transmission system in this embodiment of the present invention includes:

a first device 3401 and a second device 3402.

The first device 3401 obtains a quantity of physical resource blocks PRBs occupied by first data carried in a first subframe. The first data is data to be sent by the first device 3401 to the second device 3402.

The first device 3401 determines a first transport block size TBS or a second TBS according to the quantity of the PRBs occupied by the first data carried in the first subframe. The second TBS includes a TBS of the first subframe and a TBS of a second subframe.

The first device 3401 performs, according to the first TBS or the second TBS, modulation and coding on the first data carried in the first subframe and the first data carried in the second subframe. The first subframe and the second subframe are adjacent subframes.

The first device 3401 sends the first subframe and the second subframe to the second device 3402. The first subframe is sent before the second subframe, there are K first subframes before the second subframe, the first subframe includes N orthogonal frequency division multiplexing OFDM symbols, the second subframe includes M OFDM symbols, N and K are positive integers, M is zero or a positive integer, and M≤N.

The second device 3402 receives the first subframe and the second subframe that are sent by the first device 3401. The first subframe is sent before the second subframe, there are the K first subframes before the second subframe, the first subframe includes the N orthogonal frequency division multiplexing OFDM symbols, the second subframe includes the M OFDM symbols, N and K are positive integers, M is zero or a positive integer, and M≤N.

The second device 3402 obtains the quantity of the physical resource blocks PRBs occupied by the first data carried in the first subframe. The first data is the data sent by the first device 3402 to the second device 3401.

The second device 3402 determines the first transport block size TBS or the second TBS according to the quantity of the PRBs occupied by the first data carried in the first subframe. The second TBS includes the TBS of the first subframe and the TBS of the second subframe.

The second device 3402 performs, according to the first TBS or the second TBS, demodulation and decoding on the first data carried in the first subframe and the first data carried in the second subframe.

In this embodiment of the present invention, a first subframe at the start of a transmission and a second subframe at the end of the transmission are jointly scheduled by using control signaling, so that control signaling is saved in the first subframe and the second subframe. This can reduce control signaling load for the first subframe and the second subframe, enable a channel to transmit a larger proportion of valid data, and improve data transmission efficiency. In addition, subframes prepared by a first device may be normally sent in the first subframe and the second subframe, and are not discarded, which facilitates implementation of the first device.

In addition, a computer readable medium (or medium) is further provided, including a computer readable instruction for performing the following operations when being executed: performing operations of 201 and 202, 801 to 804, or 901 to 904 of the methods in the foregoing embodiments.

In addition, a computer program product is further provided, including the foregoing computer readable medium.

It should be noted that, the signaling mentioned herein includes, but is not limited to, an indication, information, a signal, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the foregoing embodiments, the description of each embodiment has respective focuses. For a part that is not described in detail in an embodiment, reference may be made to related descriptions in other embodiments.

In the several embodiments provided in the present application, it should be understood that the disclosed system, device, and method maybe implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units maybe selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The data transmission method and device provided in the present invention are described in detail above. The principle and implementation of the present invention are described herein by using specific examples. The description about the embodiments of the present invention is merely provided to help understand the method and core ideas of the embodiments of the present invention. In addition, persons skilled in the art can make variations and modifications to the present invention in terms of the specific implementations and application scopes according to the ideas of the present invention. Therefore, the content of specification shall not be construed as a limit to the present invention.

What is claimed is:

1. A data transmission method, comprising:
   obtaining, by a first device, a quantity of physical resource blocks (PRBs) occupied by first data carried in a first subframe, wherein the first data is data to be sent by the first device to a second device;
   determining, by the first device, a first transport block size (TBS) or a second TBS according to the quantity of the PRBs occupied by the first data carried in the first subframe, wherein the second TBS comprises a TBS of the first subframe and a TBS of a second subframe;
   performing, by the first device according to the first TBS or the second TBS, modulation and coding on the first data carried in the first subframe and the first data carried in the second subframe, wherein the first subframe and the second subframe are adjacent subframes; and
   sending, by the first device, the first subframe and the second subframe to the second device, wherein the first subframe is sent before the second subframe, there are K first subframes before the second subframe, the first subframe comprises N orthogonal frequency division multiplexing (OFDM) symbols, the second subframe comprises M OFDM symbols, N and K are positive integers, M is zero or a positive integer, and M≤N.

2. The method according to claim 1, wherein when K is equal to 1, the method further comprises:
   determining, by the first device, a third TBS according to the quantity of the PRBs occupied by the first data carried in the first subframe, wherein the third TBS comprises the TBS of the first subframe, the TBS of the second subframe, and a TBS of a third subframe;
   performing, by the first device according to the third TBS, modulation and coding on the first data carried in the first subframe, the first data carried in the second subframe, and the first data carried in the third subframe, wherein the first subframe and the third subframe are adjacent subframes, and the first subframe and the second subframe are adjacent subframes; and
   sending, by the first device, the first subframe, the second subframe, and the third subframe to the second device, wherein the third subframe is sent before the first subframe, the second subframe is sent after the first subframe, the first subframe comprises N OFDM symbols, the second subframe comprises M OFDM symbols, the third subframe comprises P OFDM symbols, N is a positive integer, M and P are zero or positive integers, P≤N, and M≤N.

3. The method according to claim 1, wherein determining, by the first device, a first TBS according to the quantity of the PRBs occupied by the first data carried in the first subframe comprises:
   determining, by the first device according to a first formula S=F(s×a), a quantity S of PRBs occupied by both of the first data carried in the first subframe and the first data carried in the second subframe, wherein s is the quantity of the PRBs occupied by the first data carried in the first subframe, the function F( ) is a round-up, round-down, or round-off function, and a is a real number not less than 1; and
   determining, by the first device, the first TBS according to the quantity of the PRBs occupied by both of the first data carried in the first subframe and the first data carried in the second subframe.

4. The method according to claim 3, wherein:
   a is ( $M_1+M_2$)/$M_2$ is used to indicate at least one of a quantity of PRBs or OFDM symbols occupied by the first data or control information carried in the second subframe, and $M_2$ is used to indicate at least one of a quantity of PRBs or OFDM symbols occupied by the first data or control information carried in the first subframe.

5. The method according to claim 1, wherein determining, by the first device, a first TBS according to the quantity of the PRBs occupied by the first data carried in the first subframe comprises:
   determining, by the first device, a first TBS T according to a second formula T=F(t×a), wherein t is the TBS of the first subframe, the transport block size TBS of the first subframe is a TBS corresponding to the quantity of the PRBs occupied by the first data carried in the first subframe, the function F( ) is a round-up, round-down, or round-off function, and a is a real number not less than 1.

6. The method according to claim 1, wherein determining, by the first device, a second TBS according to the quantity of the PRBs occupied by the first data carried in the first subframe comprises:
determining, by the first device according to a third formula L=F(l×a), a quantity L of PRBs occupied by the first data carried in the second subframe, wherein l is the quantity of the PRBs occupied by the first data carried in the first subframe, the function F ( ) is a round-up, round-down, or round-off function, and a is a positive real number not greater than 1;
determining, by the first device, the TBS of the second subframe according to the quantity of the PRBs occupied by the first data carried in the second subframe; and
determining, by the first device, the TBS of the first subframe according to the quantity of the PRBs occupied by the first data carried in the first subframe.

7. A data transmission device, comprising:
an input device;
a processor configured to:
obtain a quantity of physical resource blocks (PRBs) occupied by first data carried in a first subframe, wherein the first data is data to be sent by the data transmission device to a second device;
determine a first transport block size (TBS) or a second TBS according to the quantity of the PRBs occupied by the first data carried in the first subframe, wherein the second TBS comprises a TBS of the first subframe and a TBS of a second subframe; and
perform, according to the first TBS or the second TBS, modulation and coding on the first data carried in the first subframe and the first data carried in the second subframe, wherein the first subframe and the second subframe are adjacent subframes; and
an output device configured to:
send the first subframe and the second subframe to the second device, wherein the first subframe is sent before the second subframe, there are K first subframes before the second subframe, the first subframe comprises N orthogonal frequency division multiplexing (OFDM) symbols, the second subframe comprises M OFDM symbols, N and K are positive integers, M is zero or a positive integer, and M≤N.

8. The device according to claim 7, wherein:
K is equal to 1;
the processor is configured to:
determine a third TBS according to the quantity of the PRBs occupied by the first data carried in the first subframe, wherein the third TBS comprises the TBS of the first subframe, the TBS of the second subframe, and a TBS of a third subframe, and
perform, according to the determined third TBS, modulation and coding on the first data carried in the first subframe, the first data carried in the second subframe, and the first data carried in the third subframe, wherein the first subframe and the third subframe are adjacent subframes, and the first subframe and the second subframe are adjacent subframes; and
the output device is configured to:
send the first subframe, the second subframe, and the third subframe after the modulation and coding of the second modulation and coding module to the second device, wherein the third subframe is sent before the first subframe, the second subframe is sent after the first subframe, the first subframe comprises N OFDM symbols, the second subframe comprises M OFDM symbols, the third subframe comprises P OFDM symbols, N is a positive integer, M and P are zero or positive integers, P≤N, and M≤N.

9. The device according to claim 7, wherein to determine a first TBS or a second TBS according to the quantity of the PRBs occupied by the first data carried in the first subframe, the processor is configured to:
determine, according to a first formula S=F(s×a), a quantity S of PRBs occupied by both of the first data carried in the first subframe and the first data carried in the second subframe, wherein s is the quantity of the PRBs occupied by the first data carried in the first subframe, the function F( ) is a round-up, round-down, or round-off function, and a is a real number not less than 1; and
determine the first TBS according to the quantity of the PRBs occupied by both of the first data carried in the first subframe and the first data carried in the second subframe.

10. The device according to claim 7, wherein to determine a first TBS or a second TBS according to the quantity of the PRBs occupied by the first data carried in the first subframe, the processor is configured to:
determine a first TBS T according to a second formula T=F( t×a), wherein t is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1.

11. The device according to claim 10, wherein:
a is $(M_1+M_2)/M_2$, $M_1$ is used to indicate at least one of a quantity of PRBs or OFDM symbols occupied by the first data or control information carried in the second subframe, and $M_2$ is used to indicate at least one of a quantity of PRBs or OFDM symbols occupied by the first data or control information carried in the first subframe.

12. The device according to claim 11, wherein:
a is $M_1/M_2$, $M_1$ is used to indicate at least one of a quantity of PRBs or OFDM symbols occupied by the first data or control information carried in the second subframe, and $M_2$ is used to indicate at least one of a quantity of PRBs or OFDM symbols occupied by the first data or control information carried in the first subframe.

13. The device according to claim 7, wherein to determine a first TBS or a second TBS according to the quantity of the PRBs occupied by the first data carried in the first subframe, the processor is configured to:
determine according to a third formula L=F(l×a), a quantity L of PRBs occupied by the first data carried in the second subframe, wherein l is the quantity of the PRBs occupied by the first data carried in the first subframe, the function F( ) is a round-up, round-down, or round-off function, and a is a positive real number not greater than 1;
determine the TBS of the second subframe according to the quantity of the PRBs occupied by the first data carried in the second subframe; and determine the TBS of the first subframe according to the quantity of the PRBs occupied by the first data carried in the first subframe.

14. The device according to claim 7, wherein to determine a first TBS or a second TBS according to the quantity of the PRBs occupied by the first data carried in the first subframe, the processor is configured to:
 determine a TBS P of the second subframe according to a fourth formula P=F(p×a), wherein p is the TBS of the first subframe, the TBS of the first subframe is a TBS corresponding to the quantity of the PRBs occupied by the first data carried in the first subframe, the function F( ) is a round-up, round-down, or round-off function, and a is a real number not less than 1.

15. A data transmission device, comprising:
 an input device configured to:
  receive a first subframe and a second subframe that are sent by a first device, wherein the first subframe is sent before the second subframe, there are K first subframes before the second subframe, the first subframe comprises N orthogonal frequency division multiplexing (OFDM) symbols, the second subframe comprises M OFDM symbols, N and K are positive integers, M is zero or a positive integer, and M≤N ;
 a processor configured to:
  obtain a quantity of physical resource blocks (PRBs) occupied by first data carried in the first subframe, wherein the first data is data sent by the first device to the second device,
  determine a first transport block size (TBS) or a second TBS according to the quantity of the PRBs occupied by the first data carried in the first subframe, wherein the second TBS comprises a TBS of the first subframe and a TBS of the second subframe, and
  performing perform, according to the first TBS or the second TBS, demodulation and decoding on the first data carried in the first subframe and the first data carried in the second subframe; and
 an output device.

16. The device according to claim 15, wherein:
 K is equal to 1;
 the input device is configured to:
  receive the first subframe, the second subframe, and a third subframe that are sent by the first device, wherein the third subframe is sent before the first subframe, the second subframe is sent after the first subframe, the first subframe and the third subframe are adjacent subframes, the first subframe and the second subframe are adjacent subframes, the first subframe comprises N OFDM symbols, the second subframe comprises M OFDM symbols, the third subframe comprises P OFDM symbols, N is a positive integer, M and P are zero or positive integers, P≤N, and M≤N; and
 the processor is configured to:
  determine a third TBS according to the quantity of the PRBs occupied by the first data carried in the first subframe, wherein the third TBS comprises the TBS of the first subframe, the TBS of the second subframe, and a TBS of the third subframe, and
  perform, according to the third TBS, demodulation and decoding on the first data carried in the first subframe, the first data carried in the second subframe, and the first data carried in the third subframe.

17. The device according to claim 15, wherein the processor is further configured to:
 determine, according to a first formula S=F(s×a), a quantity S of PRBs occupied by both of the first data carried in the first subframe and the first data carried in the second subframe, wherein s is the quantity of the PRBs occupied by the first data carried in the first subframe, the function F( )is a round-up, round-down, or round-off function, and a is a real number not less than 1; and
 determine the first TBS according to the quantity of the PRBs occupied by both of the first data carried in the first subframe and the first data carried in the second subframe.

18. The device according to claim 17, wherein:
 a is $(M_1+M_2)/M_2$, $M_1$ is used to indicate at least one of a quantity of PRBs or OFDM symbols occupied by the first data or control information carried in the second subframe, and $M_2$ is used to indicate at least one of a quantity of PRBs or OFDM symbols occupied by the first data or control information carried in the first subframe.

19. The device according to claim 15, wherein to determine a first TBS or a second TBS according to the quantity of the PRBs occupied by the first data carried in the first subframe, the processor is configured to:
 determine a first TBS T according to a second formula T=F(t×a), wherein t is the TBS of the first subframe, the TBS of the first subframe is a TBS corresponding to the quantity of the PRBs occupied by the first data carried in the first subframe, the function F( )is a round-up, round-down, or round-off function, and a is a real number not less than 1.

20. The device according to claim 15, wherein to determine a first TBS or a second TBS according to the quantity of the PRBs occupied by the first data carried in the first subframe, the processor is configured to:
 determine according to a third formula L=F(l×a), a quantity L of PRBs occupied by the first data carried in the second subframe, wherein l is the quantity of the PRBs occupied by the first data carried in the first subframe, the function F( )is a round-up, round-down, or round-off function, and a is a positive real number not greater than 1;
 determine the TBS of the second subframe according to the quantity of the PRBs occupied by the first data carried in the second subframe; and
 determine the TBS of the first subframe according to the quantity of the PRBs occupied by the first data carried in the first subframe.

\* \* \* \* \*